United States Patent
Gettings et al.

(10) Patent No.: US 8,544,573 B2
(45) Date of Patent: *Oct. 1, 2013

(54) ROBOTIC SYSTEM AND METHODS OF USE

(75) Inventors: Nathan D. Gettings, Palo Alto, CA (US); Adam M. Gettings, Palo Alto, CA (US); Taylor J. Penn, Palo Alto, CA (US); Edward J. Siler, III, Palo Alto, CA (US); Andrew G. Stevens, Palo Alto, CA (US)

(73) Assignee: RoboteX Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,655

(22) Filed: Feb. 28, 2012

(65) Prior Publication Data

US 2012/0152626 A1  Jun. 21, 2012

Related U.S. Application Data

(60) Continuation of application No. 13/233,994, filed on Sep. 15, 2011, which is a division of application No. 12/755,293, filed on Apr. 6, 2010, now Pat. No. 8,157,032, which is a continuation of application No. 12/755,264, filed on Apr. 6, 2010, now Pat. No. 8,100,205.

(51) Int. Cl.
  *B62D 55/00* (2006.01)
(52) U.S. Cl.
  USPC ............................................ 180/9.1; 305/115
(58) Field of Classification Search
  USPC ... 180/9, 9.1, 9.46, 7.1, 8.2, 8.7; 301/37.101, 301/37.102, 37.34, 37.42; 305/100, 1.7, 305/108, 109, 110, 315; 384/489
  See application file for complete search history.

(56) References Cited

U.S. PATENT DOCUMENTS

| 3,250,577 | A | 5/1966 | Olson |
| 4,932,831 | A | 6/1990 | White et al. |
| 5,022,812 | A | 6/1991 | Coughlan et al. |
| 5,515,934 | A | 5/1996 | Davis |
| 6,170,544 | B1 | 1/2001 | Hottebart |
| 6,263,989 | B1 | 7/2001 | Won |
| 6,431,296 | B1 | 8/2002 | Won |
| 6,548,982 | B1 | 4/2003 | Papanikolopoulos et al. |
| 6,668,951 | B2 | 12/2003 | Won |
| 6,860,346 | B2 | 3/2005 | Burt et al. |
| 7,348,747 | B1 | 3/2008 | Theobold et al. |
| 7,546,891 | B2 | 6/2009 | Won |
| 7,556,108 | B2 | 7/2009 | Won |
| 7,559,385 | B1 | 7/2009 | Burt et al. |
| 7,581,605 | B2 | 9/2009 | Caspi et al. |
| 7,597,162 | B2 | 10/2009 | Won |
| 7,600,593 | B2 | 10/2009 | Filippov et al. |
| 7,677,345 | B2 | 3/2010 | Hosoda |
| 7,677,587 | B2 | 3/2010 | Fisk et al. |

(Continued)

FOREIGN PATENT DOCUMENTS

| KR | 100861325 | 9/2008 |
| WO | WO 2011/126582 | 10/2011 |

*Primary Examiner* — Tony Winner
(74) *Attorney, Agent, or Firm* — Levine Bagade Han LLP

(57) ABSTRACT

A robotic system that can have a chassis and a track drive system is described. The track drive system can be configured to move the chassis. The track drive system can have a pulley, a pulley cap having a larger diameter than the pulley, and a track. The pulley cap can be rotationally fixed to the pulley. The track can be engagable and disengagable with the pulley cap. The methods of using and making the robotic system are also described.

23 Claims, 23 Drawing Sheets

(56) References Cited

U.S. PATENT DOCUMENTS

| | | |
|---|---|---|
| 7,743,858 B2 | 6/2010 | Novoplanski et al. |
| 8,100,205 B2 | 1/2012 | Gettings et al. |
| 8,397,842 B2 | 3/2013 | Gettings et al. |
| 2002/0189871 A1 | 12/2002 | Won |
| 2004/0216931 A1 | 11/2004 | Won |
| 2006/0267405 A1 | 11/2006 | Tucker |
| 2007/0107917 A1 | 5/2007 | Doherty et al. |
| 2007/0194540 A1 | 8/2007 | Caspi et al. |
| 2007/0267230 A1 | 11/2007 | Won |
| 2008/0083344 A1 | 4/2008 | Deguire et al. |
| 2008/0143063 A1 | 6/2008 | Won |
| 2008/0143064 A1 | 6/2008 | Won |
| 2008/0236907 A1 | 10/2008 | Won |
| 2009/0065271 A1 | 3/2009 | Won |
| 2009/0107738 A1 | 4/2009 | Won |
| 2009/0173553 A1 | 7/2009 | Won |
| 2010/0059298 A1 | 3/2010 | Pelrine et al. |
| 2011/0240382 A1 | 10/2011 | Gettings et al. |
| 2011/0240383 A1 | 10/2011 | Gettings et al. |

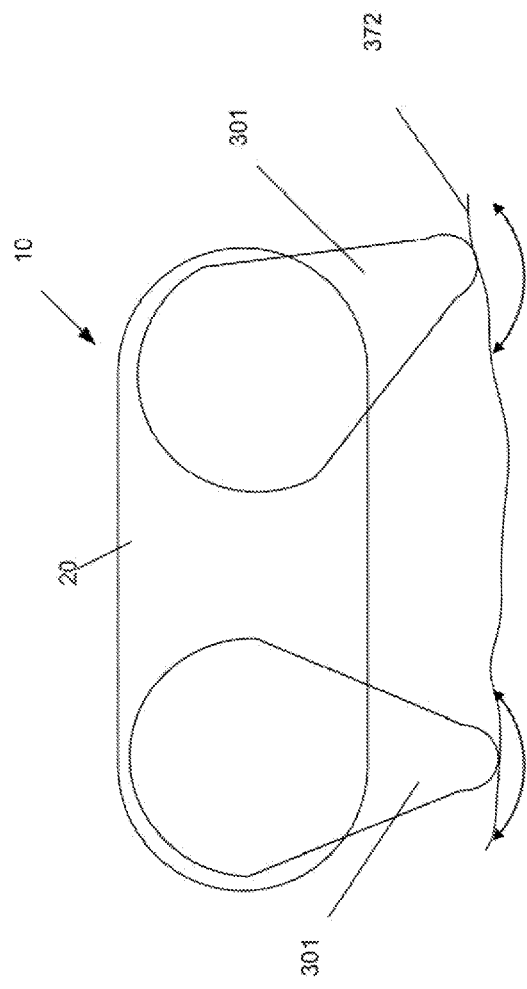
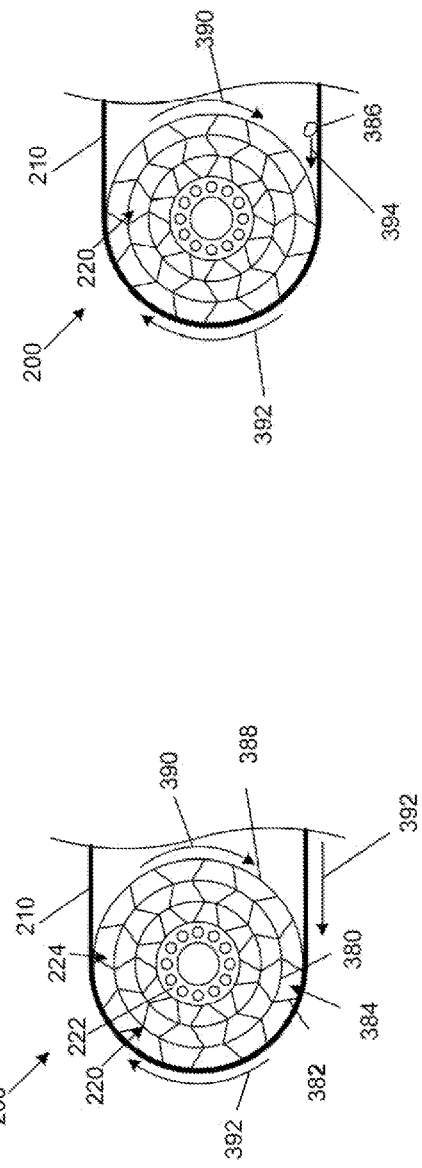

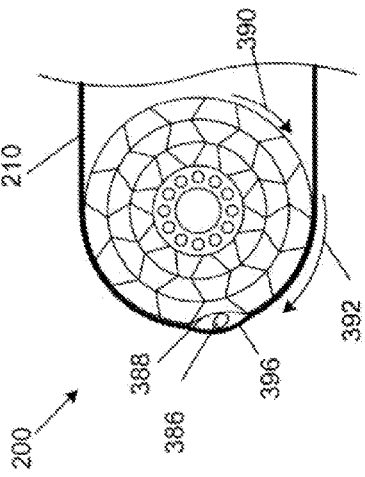
Fig. 30d
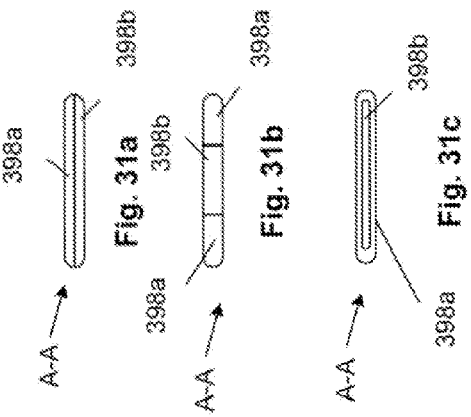
Fig. 31a
Fig. 31b
Fig. 31c
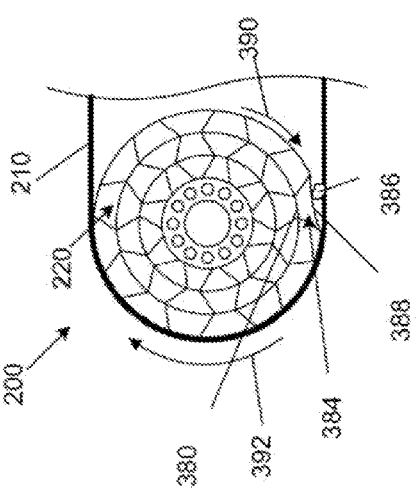
Fig. 30c
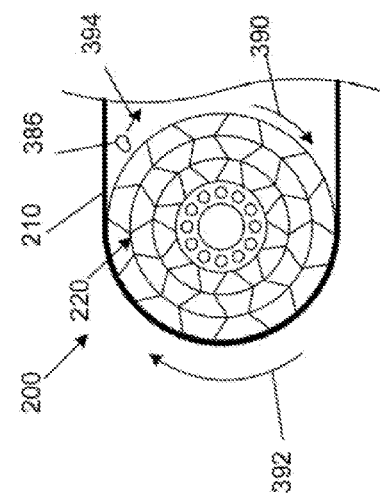
Fig. 30e

ROBOTIC SYSTEM AND METHODS OF USE

CROSS-REFERENCE TO RELATED APPLICATION

This application is a continuation of U.S. application Ser. No. 13/233,994, filed 15 Sep. 2011, which is a divisional of U.S. application Ser. No. 12/755,293, filed Apr. 6, 2010, which is a continuation of U.S. application Ser. No. 12/755,264 filed Apr. 6, 2010, which issued as U.S. Pat. No. 8,100,205 on 24 Jan. 2012, the contents of which are incorporated by reference herewith in their entireties.

BACKGROUND

1. Technical Field

This invention relates generally to the robotics field, and more specifically to a new and useful robotic system in the robotics field.

2. Summary of the Art

Ground-based remote-controlled robotic systems exist for a number of purposes. Unmanned Ground Vehicles (UGV), such as Soldier UGVs (SUGVs) are small, remotely controlled robotic systems, often purposed for military use. The UGVs can provide remote surveillance images and sensed information. UGVs can be tele-operated in an area local to a controlling dismounted soldier, and be transported to the operational area with dismounted soldiers as stowage. The UGVs operate in rural and urban terrain, and often are needed to climb stairs, pass through doorways, operation in subterranean structures, and traverse rubble or other obstacles.

Domestic police, including Special Weapons and Tactics (SWAT) Teams, use UGVs for domestic policing, including performing "hard clears" or other high risk actions when human health or life might be at stake.

Remote control (RC) vehicles are also used for civilian entertainment, such as remote control hobbyist cars and tanks. Such vehicles are often insufficiently robust for purposes other than racing or entertainment, and rarely have tooling or payloads to accomplish task other than mobility.

Industrial robots are used to access hazardous or cramped areas for industrial purposes or scientific research. For example, remote-controlled industrial robots can be used to access and work in areas with extreme pressures, temperatures, radioactive radiation, high voltage, toxic gasses or a lack of breathable air.

All of the aforementioned robotic systems desire improved performance characteristics, for example more stabilized mobility, self-cleaning tracks, increased torque delivery to the ground, reliable control and data collection/transmission, and dimensionally small packaging for transport despite a potentially larger area occupied during mobility of the robot.

SUMMARY OF THE INVENTION

A robotic system and method of using the same are disclosed. The robotic system can have one or more tracks that are driven by track drive pulleys. The track pulleys can be driven by a motor. The robotic system can have track guides, track pulley caps, and flipper pulley caps. The robotic system can have sideplates that are larger (i.e., can extend further) than the track inner diameter and the inner nubs on the tracks.

The tracks can be flexible with or without reinforcing cabling. The track, can be fed over the track drive pulleys. o The track can resiliently expand and/or the pulley can resiliently contract when debris is introduced to the space between the track and the drive pulley. This can squeeze larger debris out of the track. Smaller debris can be carried through the track until the debris reaches the top (or bottom, depending on the direction of the pulley) of the drive pulley, causing the debris to fall out of the space between the track and the pulley and return to the environment. In the case that larger debris cannot be squeezed out from between the track and pulley, the flexible pulley can deform and pass the debris through the space between the track and pulley, and then dump or release the debris when the debris reaches the top (or bottom, depending on the direction of the pulley) of the pulley.

The track and/or pulley can instead or in addition be rollers.

The sideplates and the pulley end caps can retain the track laterally, for example when the trapped debris causes the track to expand to the extent that the track would pop off of the pulley when turning in debris. The lateral ribs on the drive pulley can be long enough to engage the track either directly, or though a layer of debris. The track can not dislodge from the pulley or rollers, for example even when performing a zero turning radius maneuver under heavy load, in a dirty, debris-filled environment. The amount of allowable track expansion (stretching with debris) can be related to the extent to which the end caps and side plates extend beyond the inner diameter of the track as the track rotates around the drive pulleys and rollers, and to the protrusion distance of the drive pulley rib relative to the outer diameter of the drive pulley.

A robotic system that can have a self-cleaning track drive system is disclosed. The system can have a body, and the track drive system configured to move the body. The track drive system can have a one pulley and a track. The pulley can be configured to form at least one pocket between the inner track surface and the outer pulley surface when a foreign object is introduced between the pulley and the track, and wherein the foreign object has a maximum width of greater than about 0.2 cm.

The pulley can have a first radial rib, a second radial rib, and an outer wall. The first length of the outer wall can span between the first radial rib and the second radial rib. The first length of the outer wall can be configured to deform when the foreign object is between the first length and the track.

The track can have a modulus of elasticity from about 2,400 to about 5,600. The pulley can have a radial inner portion and a radially outer portion. The radially outer portion can be configured to deform at a greater rate than the radially inner portion when a force is applied to an outside radial surface of the pulley.

The pulley can have one, two or more support structures. The support structure can have a structural cell having two angular walls and two radial walls. The pulley can have an axis of rotation and a radially outer surface. The support structure can be between the axis of rotation and the radially outer surface of the pulley. At least one portion of the support structure can be configured to deform when a force is applied to the outside of the pulley, for example creating a pocket on the outside of the pulley where the force is applied. The support structure can have a first outer angular wall, a second angular wall, and a third inner angular wall. The second angular wall can be radially beyond the third inner angular wall. The second angular wall can be radially within the first outer angular wall The pulley can have a radially outer wall (e.g., an "angular" wall forming a 360° rotation around the axis of rotation). At least one portion of the radially outer wall can be configured to deform when a force is applied to the outside of the pulley, for example, forming a pocket on the outside of the pulley where the force is applied.

The pulley and the track can be configured so that a foreign object introduced between the pulley and the track is ejected by the force resulting from the resiliency of the pulley and the track. The pulley and the track can be configured so that a foreign object introduced between the pulley and the track can travel within the pocket between the pulley and the track around the circumference until the track and pulley diverge.

A method of using a robotic vehicle system comprising a chassis and a track drive system comprising a pulley and a track, is disclosed. The method can include driving the track with the pulley. The method can include receiving a piece of material between the track and the pulley. The piece of material can be a loose piece of debris, for example, unattached to the track or the pulley. The piece of material can have a maximum width of greater than about 0.2 cm. The method can include moving the piece of material around the pulley to the location at which the track separates from the pulley. The method can include releasing the piece of material from between the track and the pulley.

The method of moving can include holding the piece of material between the track and the pulley. The method of holding can include resiliently deforming the track away from the pulley and against the piece of material. The method of receiving can include resiliently deforming the pulley. The pulley can include a first cell and a second cell adjacent to the first cell. The first cell can be resiliently deformed away from the track and against the piece of material. The second cell can be undeformed.

A robotic vehicle system that can have a body and a track drive system is disclosed. The track drive system can be configured to move the body. The track drive system can have a pulley, a pulley cap, and a track. The pulley cap can be attached to a side of the pulley facing away from the body. The diameter of the pulley cap can be equal to or greater than the diameter of the pulley.

The pulley cap can have a diameter less than the outer diameter of the track when the track is on the pulley. The pulley cap can have a track interface. The track can have a pulley cap interface. The track interface can be configured to releasably engage the pulley cap interface. The pulley cap interface can have a nub extending from the inside of the track. The track interface can have a radial vane. The track can have a first retention element (e.g., inside nubs) extending from the inside surface of the track on a first lateral side of the track. The track can have a second retention element extending from the inside surface of the track on a second lateral side of the track.

A robotic vehicle system that can have a body and a track drive system configured to move the body is disclosed. The track drive system can have at least one pulley, a track, and a pulley cap/ The track can have a first inner nub on at least one lateral side. The inner nub can be mated to an inner edge of the pulley cap. The inner nub can retains the track on the pulley. The body can retain the outside edge of the track on the pulley. The track can have a second inner nub on a second lateral side.

The system can have a track guide or retention structure on the body. The track guide structure can be mated to the outside edge of the second inner nub on the second lateral side. The track guide or retention structure can include vanes on the inside of the pulley. For example, a second wheel cap can be on the chassis-side of the flipper or mobility device pulley, for example, to help keep the track guided.

The track can have a pocket along the inside surface of the track. The pulley can have one or more grooves, nubs or lateral rails extending radially outwardly from the pulley. The nubs or rails of the pulleys can interface with the pockets (e.g., depressions), for example, enabling the pulley to drive the track.

A robotic vehicle system that can have one or more torque-limited safety coupling for unfixing and rotating the mobility assistance devices or flippers with the chassis is disclosed. The robotic vehicle system can have a chassis, a mobility assistance component configured to propel the robotic vehicle system; and a release coupling. The release coupling can attach the chassis to the mobility assistance component. The mobility assistance component can be contractable with respect to the chassis when the release coupling is activated.

The release coupling can be configured to be activated by at least about a 45 Nm torque or at least about a 100 Nm torque applied to the mobility assistance device. The mobility assistance component can be rotatably contractable and rotatably expandable with respect to the chassis when the release coupling is activated.

The system can have a motor and a track on the mobility assistance component. The motor can be configured to drive the track around the mobility assistance component.

A method for using a robotic vehicle system comprising a chassis, a mobility assistance component, and a release coupling attaching the chassis to the mobility assistance component, is disclosed. The method can include activating the release coupling, and contracting the mobility assistance component toward the chassis after activating the release coupling. Activating the release coupling can include applying at least about a 45 Nm torque or at least about a 100 Nm torque to the mobility assistance device.

The contracting of the mobility assistance component can include rotating the mobility assistance component with respect to the chassis. The method can include expanding the mobility assistance component away from the chassis. Expanding the mobility assistance component can include rotating the mobility assistance component with respect to the chassis. The method can include driving a track on the mobility assistance device.

Yet another method is disclosed of using a robotic vehicle system. The method can include delivering a force through a robotic vehicle system powertrain in the robotic vehicle system. The delivering of the force can include generating a force, delivering the force through a first shaft or axle to a first receiver, and delivering the force from the first receiver to a second receiver. The force can be generated with a force generation component (e.g., a motor, engine) in the robotic vehicle system. The first shaft or axle can interface with the first receiver, such as an inner wheel hub. The modulus of elasticity of the first shaft can be no more than about 1000% more and no less than about 90% less than the modulus of elasticity of the first receiver. The modulus of elasticity of the first receiver can be no more than about 1000% more and no less than about 90% less than the modulus of elasticity of the second receiver.

The first receiver can have a radially inner hub of a pulley. The method can include driving a track with the pulley. The force generation component can include an electric motor.

The method can include delivering the force from the second receiver to a third receiver. The modulus of elasticity of the second receiver is no more than about 1000% more and no less than about 90% less than the modulus of elasticity of the third receiver.

For example, the first receiver can be a harder (e.g., relative to the outer wheel and track) inner wheel of a pulley. The second receiver can be a medium-hardness (e.g., relative to the axle, inner wheel and track) outer wheel of the pulley. The third receiver can be a (e.g., relative to the wheel and axle) softer track.

The third receiver can have a radially outer wheel of a pulley. The method can include further comprising driving a track with the pulley. The third receiver can have a track on a radial outer surface of a pulley The first receiver can be concentric about the first shaft. The second receiver can be concentric about the first receiver.

The surface area of contact between the first receiver and the second receiver can be greater than the surface area of contact between the shaft and the first receiver.

A system for delivering a force through a powertrain is disclosed. The system can include a power generator (e.g., motor, engine), a shaft configured to deliver power from the power generator, a first receiver attached to the shaft, and a second receiver attached to the first receiver. The modulus of elasticity of the shaft can be greater than the modulus of elasticity of the first receiver. The modulus of elasticity of the first receiver can be greater than the modulus of elasticity of the second receiver.

The system can have a third receiver attached to the second receiver. The modulus of elasticity of the second receiver can be greater than the modulus of elasticity of the third receiver.

A robotic system that can have a dimensionally small footprint (i.e., area when viewed from above) in a contracted configuration and a dimensionally larger footprint in an expanded configuration during mobility of the system is disclosed. The system can be collapsed or contracted for carrying or storage, and expanded for auto-mobility of the robotic system. The robotic system can contact and expand during auto-mobility.

The robotic vehicle system can have a body, a first mobility assistance device attached to the body, and a second mobility assistance device attached to the body. The first mobility assistance device can have a first configuration of a ready position (e.g., expanded away from the body or lengthened), and a second configuration of a stored position (e.g., contracted toward the body or shortened). The second mobility assistance device can have a first configuration of a ready position (e.g., expanded away from the body or lengthened), and a second configuration of a stored position (e.g., contracted toward the body or shortened). The mobility assistance devices can be flippers, rockets, or other locomotion devices. The mobility assistance devices can be moved into the ready position for motion, and can be moved into the stored position when not in the ready position.

The robotic vehicle system can have a body a first mobility assistance device attached to the body, and a second mobility assistance device attached to the body. The first mobility assistance device can have a first configuration extended from the body and a second configuration contracted toward the body. The second mobility assistance device can have a first configuration extended away from the body and a second configuration contracted toward the body/ The system can have an extended length when the first and second mobility assistance devices are in the first configurations. The system can have a contracted length when the first and second mobility assistance devices are in the second configurations.

The robotic vehicle system can have a third mobility assistance device attached to the body. The third mobility assistance device can have a first configuration extended from the body and a second configuration contracted toward the body. The robotic vehicle system can have a fourth mobility assistance device attached to the body. The fourth mobility assistance device can have a first configuration extended from the body and a second configuration contracted toward the body. The extended length can be when the first, second, third and fourth mobility assistance devices are in the first configurations. The contracted length can be when the first, second, third, and fourth mobility assistance devices are in the second configurations.

The extended or expanded length can be equal to or greater than about 50% of the contracted length, or equal to or greater than about 60% of the contracted length.

A method for using a robotic vehicle system having a body, a first mobility assistance device attached to the body, and a second mobility assistance device attached to the body is disclosed. The method can include configuring the robotic vehicle system in a contracted configuration having a contracted length. The method can include expanding the first mobility assistance device from a contracted configuration to an expanded configuration. The method can include expanding the second mobility assistance device from a contracted configuration to an expanded configuration. The robotic vehicle system can be in an expanded configuring having an expanded length following the expanding of the first, and second mobility assistance devices, and wherein the expanded configuration is greater than about 50% of the contracted length.

The robotic vehicle system can have a third mobility assistance device attached to the body, and a fourth mobility assistance device attached to the body. The method can include expanding the third mobility assistance device from a contracted configuration to an expanded configuration. The method can include expanding the fourth mobility assistance device from a contracted configuration to an expanded configuration. The robotic vehicle system can be in an expanded configuring having an expanded length following the expanding of the first, second, third and fourth mobility assistance devices.

A robotic vehicle system having a body and a first mobility assistance device is disclosed. The body can have a body longitudinal axis. The first mobility assistance device can have a first mobility assistance device longitudinal axis. The first mobility assistance device longitudinal axis can intersect the body longitudinal axis. The robotic vehicle system can have a second mobility assistance device having a second mobility assistance device longitudinal axis. The second mobility assistance device longitudinal axis can intersect the body longitudinal axis.

A robotic vehicle system having a body and a pair of main tracks or mobility devices is disclosed. The main tracks can be angled (i.e., non-parallel) with respect to each other. The robotic vehicle system can have a drive system for driving the pair of main tracks. The main tracks can be toe-in or toe-out with respect to each other. The toe-in or tow-out angle can be from greater than about 0 degrees to about 90 degrees, for example about 10 degrees. The robotic system can have a first mobility assistance device attached to the body, and a second mobility assistance device attached to the body. The angle of the main tracks with respect to each other can be adjusted during use. The tracks can be toe-in for enhanced straight line stability and/or toe-out for enhanced turning sensitivity.

A robotic system is disclosed that can have a body, a mobility assistance device, a drivetrain, and a a release mechanism within the assembly of the mobility assistance device and the drivetrain. The mobility assistance device can be connected to the drivetrain. The drivetrain can actuate the mobility assistance device with respect to the body. The release mechanism can be configured to allow movement of the mobility assistance device without moving at least one element of the drivetrain. The drivetrain can include a motor, shaft and gearing to transmit power from the motor to drive a track on the mobility assistance device. The release mechanism can have a safety release coupling. The release mechanism can allow the mobility assistance device to move relative to the body. The release mechanism can actuate the mobility assistance device from a ready (e.g., expanded) to a stowed or stored (e.g., contracted) position without moving all or part of the drivetrain.

A method for using a robot having a chassis and a drivetrain is disclosed. The method can include activating a release within a drivetrain connected to a mobility assistance device. Activating the release can include moving a mobility assistance device from a first position relative to the chassis to second position relative to the chassis. The first position can be a ready position from which the robot can be operated. The second position can be a stowed position from which the robot can be more easily stored than the ready position and/or still operated. Activating the release can include releasing a safety release coupling or disengaging a clutch between the mobility assistance device and the drivetrain.

Releasing the safety release coupling can include popping the coupling, for example by delivering an impact or impulse to the coupling (e.g., by dropping or throwing the robot to deliver the impulse through the mobility assistance devices and to the safety release coupling. Releasing the safety release coupling can include levering to release the coupling, activating a motor (e.g., a servo motor) a solenoid, or combinations thereof. The release of the safety release coupling can be actuated by a control, such as a button, switch, toggle, or combinations thereof.

The method can include moving the mobility assistance device from a first position to a third position, a second position to a third position, or combinations thereof.

BRIEF DESCRIPTION OF THE FIGURES

FIGS. 12b through 18 are perspective diagrams of a variation of the robotic system.

FIG. 26 through 29 are perspective views of further arrangements of the mobility assistance devices of a variation of the robotic system.

FIGS. 30a through 30e illustrate a method of a variation of the mobility device operating with a piece of debris passing between the pulley and the track.

FIGS. 31a through 31c are variations of cross-section A-A of the track.

DETAILED DESCRIPTION

Figure 1A:
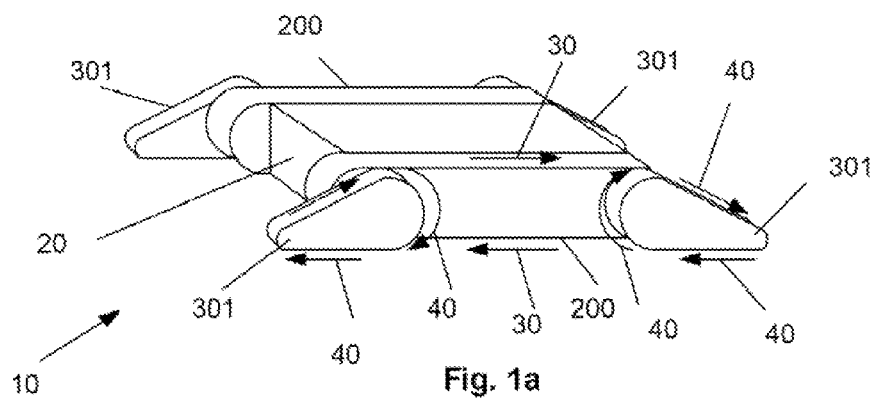
FIGS. 1a and 1b illustrate variations of the robotic system with the flippers in an extended configuration.
Figure 1B:
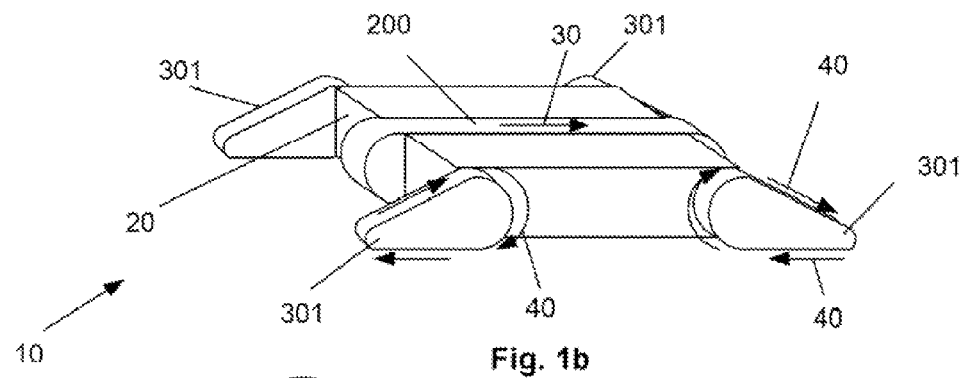

FIGS. 1a and 1b illustrate a robotic system 10 that can be used for remotely transporting a payload and the robotic system itself. The robotic system is configured to traverse a multitude of terrain types including stairs, rubble, water barriers, and to push open and pass through doors. The robotic system can be in an expanded configuration to extend the effective wheelbase and/or track base (i.e., the length from the distal end of the longitudinally outermost wheel or track on a first longitudinal end of the system to distal end of the longitudinally outermost opposite wheel or track on a second longitudinal end of the system).

The robotic system 10 can have a chassis frame 101. The chassis frame 101 can have plates mounted to the chassis frame 101. The chassis frame 101 and plates can form a dust-proof, and/or water-proof body 20 or chassis 100. For example, the plates can form the entire outside surface, be sealed with gaskets and/or caulking and/or sealant, and have no ports or holes, or have holes or ports covered by dust-proof and/or waterproof filters. The chassis 100 or body 20 and the chassis frame 101 can be identical, for example if the system 10 has no side plates or other additional body or chassis components on the chassis frame 101.

The body 20 can be water and/or dust permeable. The body 20 can have vents or holes, for example for cooling, sampling the environment (e.g., video, audio, chemical sensors, and or samplers), tool or weapon access, or combinations thereof.

The body 20 can contain one or more removable or permanently affixed payloads, such as cameras, video displays, microphones, speakers, transceivers (including receivers and/or transmitters), chemical sensors and samplers, weapons, or combinations thereof.

The body 20 can be attached to one or more mobility devices 200. The mobility devices 200 can be a track system, and/or be a set of one or more wheels, skis, skates, propellers, wings, sails, blades, balloons, floats, paddles, oars, flippers, turbines, propellers, corkscrews, winches, pressure tanks, rockets, a hover system or combinations thereof. FIG. 1a illustrates that the body can have one, two or more mobility devices 200 located on each lateral side of the body 20. FIG. 1b illustrates that the body 20 can have one or more mobility devices 200 located laterally within the body. The mobility devices 200 can be laterally central to the body 20.

The track system can have mobility device tracks 210 mounted onto mobility device track drive pulleys and a mobility device track guide. The mobility device track can be driven, as shown by arrows 30, by the mobility device track drive pulleys along the mobility device track guide. The mobility device track device pulleys can be actively powered by one or more motors, and optionally transmissions, in one direction or controllably reversible directions, and/or passively free-spinning, and/or attached to a full-time engaged, or engageable and releasable clutch to prevent rotation in a first direction while allowing rotation in a second direction (e.g., to prevent backing up or sliding downhill, for example when carrying a payload or towing a load). The mobility device track can engage with the ground surface and propel the system 10.

One or both of the mobility devices 200 can have a mobility device dummy track. For example, the mobility device dummy track can be located where some or all of the mobility device track 210 would have been located. The mobility device dummy track can be a single, plastic molding that has an appearance similar to the track, or a part of the track that is not driven. The mobility device dummy track can be not in contact with the ground surface. For example, the mobility device dummy track can perhaps not extend to the bottom of the mobility device 200. The mobility device dummy track can drag or slide along the ground surface when the system is moved. The mobility device dummy track can be a chain cover that covers a drive chain for driving one or both flippers.

The body 20 can be attached to one, two, three, four or more mobility assistance devices 300, such as flippers 301, wheels, skis, skates, propellers, wings, sails, blades, balloons, floats, paddles, oars, flippers, turbines, propellers, corkscrews, winches, pressure tanks, rockets, a hover system, a floating device such as a foam or gas-inflated (e.g., air or carbon dioxide) bladder, or combinations thereof. The mobility assistance devices 300 can have a mobility assistance device track that can driven, as shown by arrows 40, and guided by one or more mobility assistance device pulleys, and guided by a mobility assistance device track guide.

The flipper tracks can all be driven in the same direction. Any one, two, three, or four flipper tracks can be driven in a first direction while the remaining flipper tracks can be driven in a second direction, opposite to the first direction, locked in place (e.g., via a clutch or brake), allowed to slide freely along the mobility assistance device pulleys and mobility assistance track guide, or combinations thereof.

For example, the flipper tracks on a first lateral side of the body 20 can be driven in a first direction while the flipper tracks on the laterally opposite side of the body 20 can be driven in the second direction, opposite to the first direction, locked in place (e.g., via a clutch or brake), allowed to slide freely along the mobility assistance device pulleys and mobility assistance track guide, or combinations thereof (e.g., to turn the body). The flipper tracks on a first lateral side of the body 20 can be driven in opposite directions to each other while the flipper tracks on the laterally opposite side of the body 20 can be driven in directions similar to or opposite to the direction driven by either of the tracks on the first lateral side of the body 20, locked in place (e.g., via a clutch or brake), allowed to slide freely along the mobility assistance device pulleys and mobility assistance track guide, or combinations thereof (e.g., to turn the body).

The flipper tracks on a first longitudinal side of the body 20 (e.g., the front or back) can be driven in a first direction while the flipper tracks on the longitudinally opposite side of the body 20 can be driven in the second direction, opposite to the first direction, locked in place (e.g., via a clutch or brake), allowed to slide freely along the mobility assistance device pulleys and mobility assistance track guide, or combinations thereof (e.g., to churn or rub the ground surface with the tracks). The flipper tracks on a first longitudinal side of the body 20 can be driven in opposite directions to each other (e.g., to churn or rub the ground surface with the tracks) while the flipper tracks on the second, longitudinally opposite side of the body 20 can be driven in directions similar to or opposite to the direction driven by either of the tracks on the first longitudinal side of the body 20, be locked in place (e.g., via a clutch or brake), allowed to slide freely along the mobility assistance device pulleys and mobility assistance track guide, or combinations thereof.

The flipper tracks on diametrically opposite sides of the body 20 can be driven in a first direction while the flipper tracks on the diametrically opposite side of the body 20 can be driven in the second direction, opposite to the first direction, locked in place (e.g., via a clutch or brake), allowed to slide freely along the mobility assistance device pulleys and mobility assistance track guide, or combinations thereof (e.g., to intentionally churn or rub the ground surface with the tracks). The flipper tracks on diametrically opposite sides of the body 20 can be driven in opposite directions to each other (e.g., to rotate the body 20) while the remaining flipper tracks (e.g., those on the other diametrically opposite corners of the body 20) can be driven in directions similar to or opposite to the direction driven by either of the tracks on the first longitudinal side of the body 20, be locked in place (e.g., via a clutch or brake), allowed to slide freely along the mobility assistance device pulleys and mobility assistance track guide, or combinations thereof.

Four flippers 301 can be located at the laterally and longitudinally opposite corners of the body or main track, as shown. Two flippers 301 can be at a single longitudinal end (e.g., front or back) of the body 200 with no flippers at the opposite longitudinal end. Two flippers 301 can be on a single lateral side of the body 20, with no flippers 301 on the opposite lateral side. Two flippers 301 can be placed at diametrically opposite corners of the body 20 with the remaining corners having no flippers 301.

The driven mobility assistance device tracks can be driven in the same and/or opposite directions to the driven mobility device tracks. For example, all the driven in the same direction as the driven mobility device tracks. The mobility assistance device tracks on a first lateral side can be driven in the same first direction as the driven mobility device track on the first lateral side when the mobility device track and the mobility assistance device tracks on the second, opposite lateral side is driven in a second direction, opposite the first direction, for example to rotate the system 10 (e.g., without translating the system away from the current location of the system 10).

When the flippers 301 are in an extended configuration, as shown in FIGS. 1a and 1b, the longitudinally distal ends of the flippers 301 can extend past the longitudinally distal ends of the chassis, body 20 and/or the mobility device 200.

Figure 2:
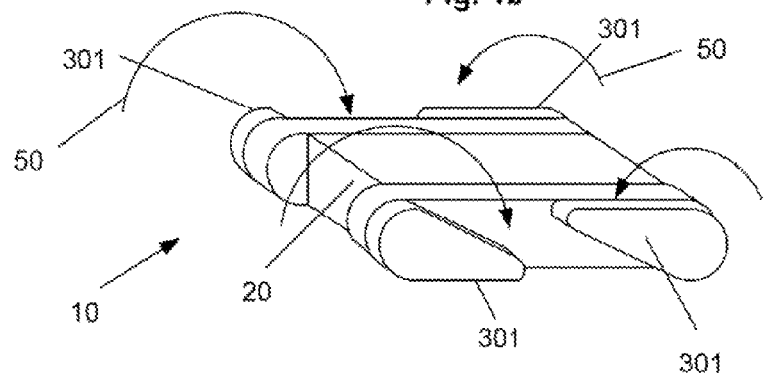
FIG. 2 illustrates the robotic system of FIG. 1 with the flippers in a retracted configuration.

FIG. 2 illustrates that the mobility assistance devices can be longitudinally contracted or retracted toward the longitudinal center of the body 20. For example, the flippers 301 can individually, in lateral, longitudinal, or diametrically opposite pairs, and/or concurrently rotate, as shown by arrows 50, toward the longitudinal center of the body 20. The flippers 301 can be positioned to not exceed the top or bottom height of the body 20. For example, the flippers 301 can be within the side-view footprint of the body 20.

The robotic system can be in a retracted or contracted configuration to minimize the effective wheelbase and/or track base, for example for storage, carrying, maneuvering smaller clearances while driving the system 10, throwing the robotic system 10 (e.g., through a window into an unsecure building or room), or combinations thereof.

Figure 3:
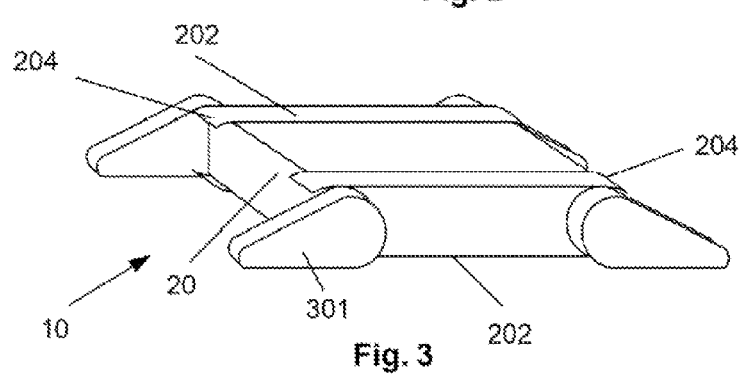
FIG. 3 illustrates a variation of the robotic system.

FIG. 3 illustrates that the mobility devices can be skids or skis 202. The skis 202 can be low friction, smooth panels. The skis 202 can define a ski plane. The skis 202 can be coated with a low friction material, such as wax, polymer (e.g., PTFE, such as Teflon® from EI DuPont de Nemours & Co., Wilmington, Del.), oil, another lubricant, or combinations thereof. The skis can be high friction, roughened panels. The skis 202 can be textured, having knurls, spikes, brads, vanes, fins, or combinations thereof extending outwardly from the plane of the ski 202.

Figure 4B:
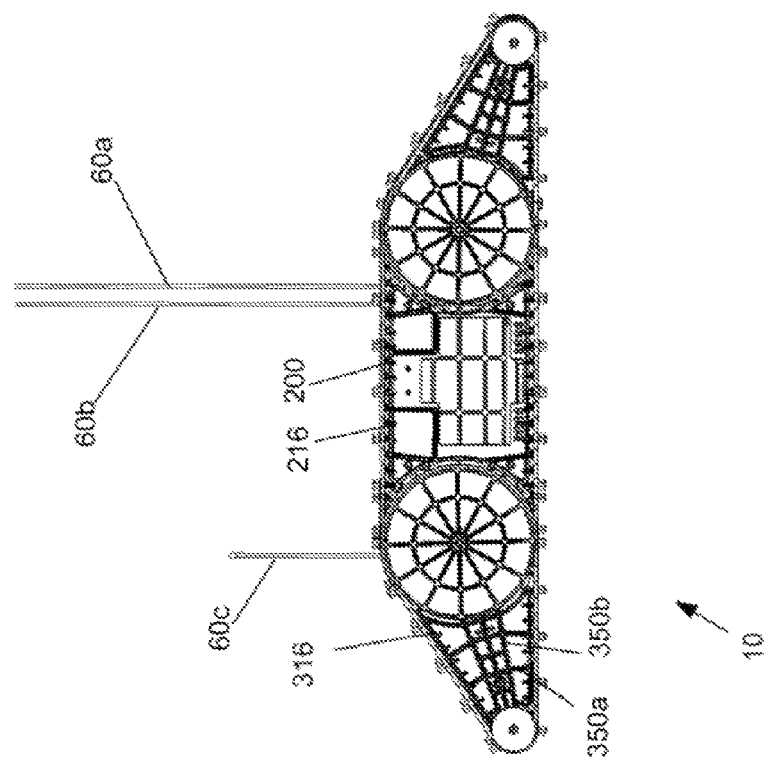
FIGS. 4a and 4b are left and right side views, respectively, of a variation of the robotic system with the flippers in an extended configuration.
Figure 4A:
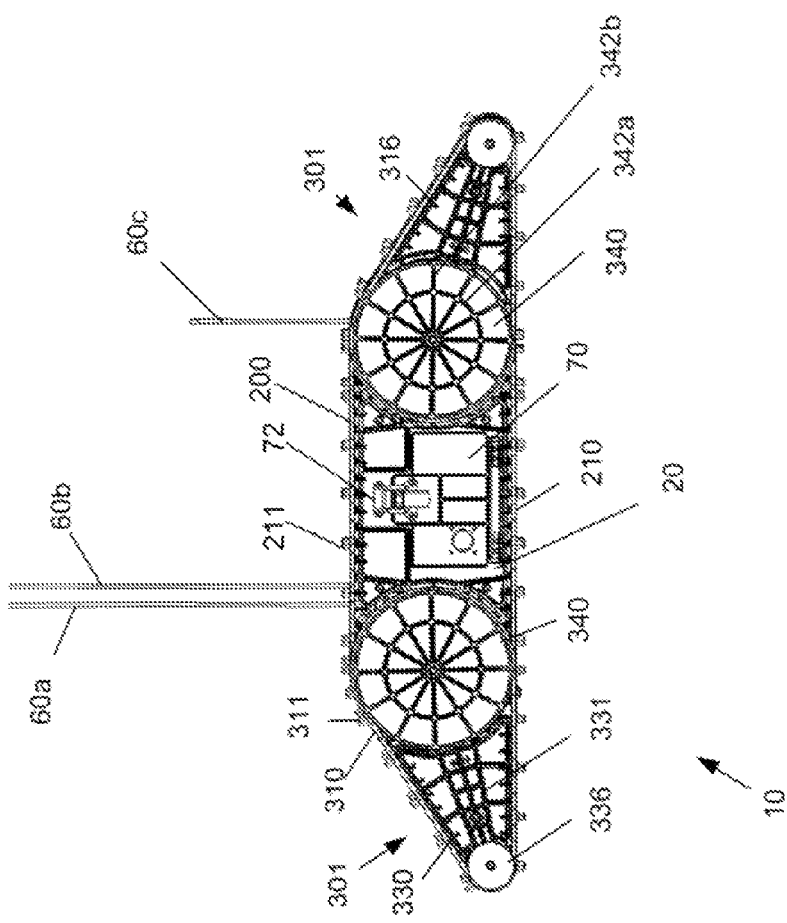

The skis 202 can have ski tips 204 that can extend from one or both of the longitudinal ends of each ski 202. The ski tips 204 can extend longitudinally past the longitudinal terminus of the body 20. The ski tips 204 can be in plane with the skis 202 or curve, bend, or angle out of plane with the ski 202. For example, the ski tips 204 can curve toward the center of the body 20, as shown in FIG. 3. The ski tips 204 can curve away from the center of the body 20. FIGS. 4a and 4b illustrate that the robotic system can have a first, second, and third robotic system antennas 60a, 60b, and 60c. The antennas 60a, 60b, and 60c can be fixed to or removable from plugs on the top surface of the body 20. The antennas can be attached to electronic hardware inside of the body 20, but exit the body 20 through ports through panels on the top of the body 20. The antennas can be straight, as shown, curved, triangular, smart antenna arrays, springs, or combinations thereof. The antennas 60a, 60b, and 60c can extend from about 0 cm (0 in.) to about 1 m (3 ft.), more narrowly from about 2 cm (0.8 in.) to about 60 cm (20 in.), for example about 20 cm (8 in.) up from the body 20. The antennas 60a, 60b and 60c can be rigid, flexible, or combinations thereof.

The antennas 60a, 60b, and 60c can receive and send signals for data and/or power to and from a remote operator control module, a central operations command, a second robotic system, or combinations thereof. One or more of the antennas 60a, 60b, and 60c can alternatively or additionally be a cord extending to the destination and/or source of the signal and/or power.

The antennas 60 can have a removable interface (e.g., BNC, TNC, SMA), for example, for quick assembly and disassembly to the body 20. The antennas 60 can be located inside the body 20. For example, the body 20 and/or side plates can be made of a material (e.g., plastic) that does not shield internal antennas 60 from incoming RF signals and block outgoing signals. The antennas 60 can be mounted on a flexible mount. The antennas 60 can be attached to the body 20 by or articulatable or folding mounts. The flippers 301 can extend from the front and back of the body 20. The bottoms of the flippers 301 can be substantially coplanar with the other flippers 301 and/or with the bottom surface of the body 20.

The body 20 can have one, two, or more mobility device tracks 210. The mobility device tracks 210 can be powered or driven to deliver force against the ground surface in contact with the bottom or top of the mobility device track 210.

Figure 5A:
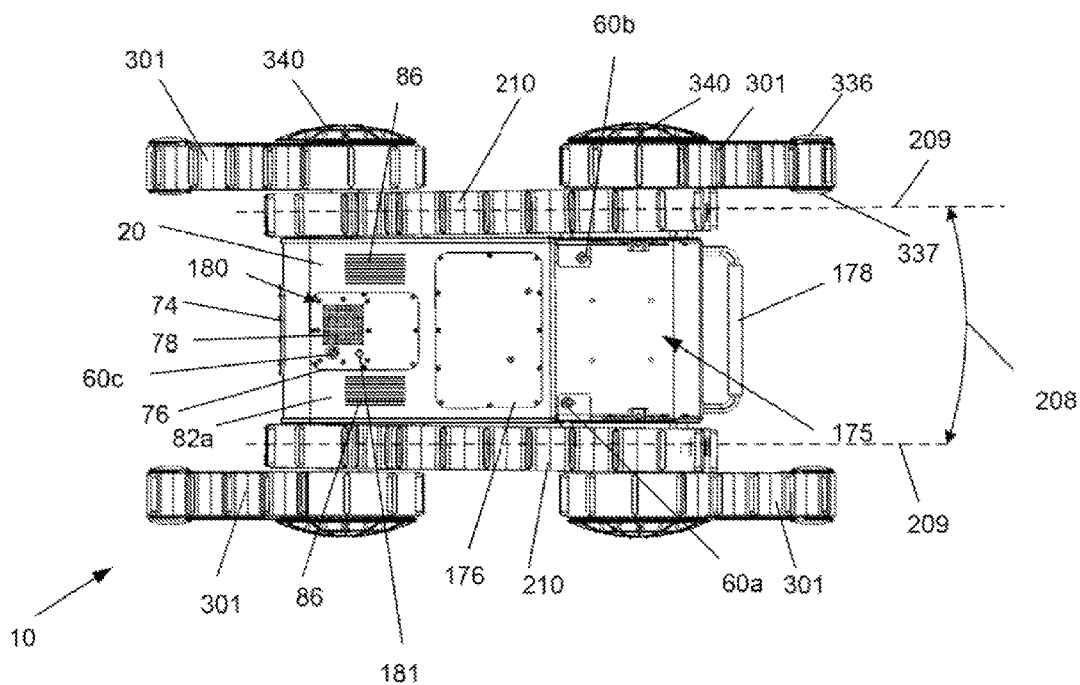
FIGS. 5a and 5b are top and bottom views, respectively, of a variation of the robotic system with the flippers in an extended configuration.
Figure 10A:
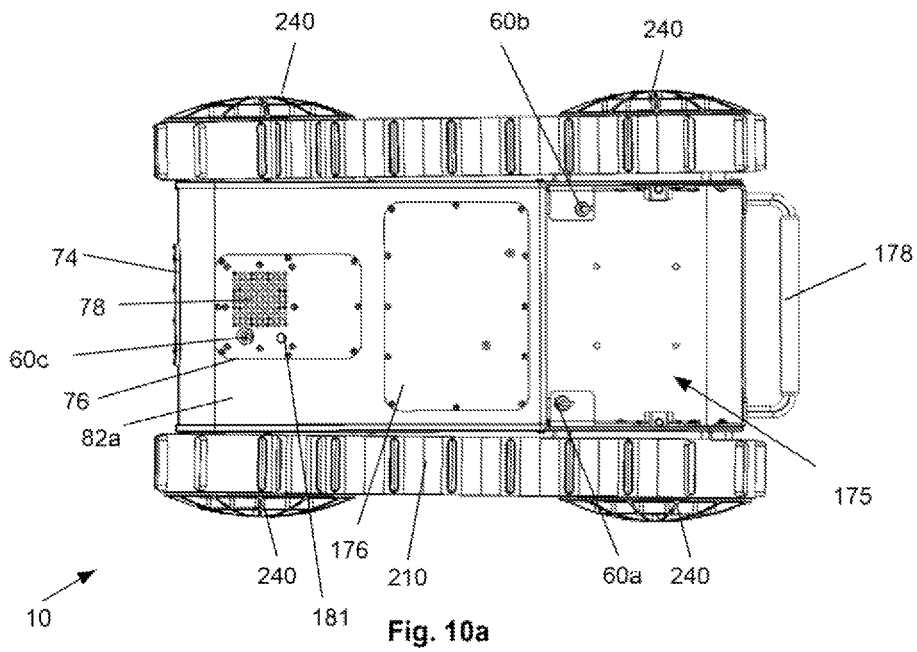
FIGS. 10a and 10b are top and bottom views, respectively, of a variation of the robotic system.
Figure 10B:
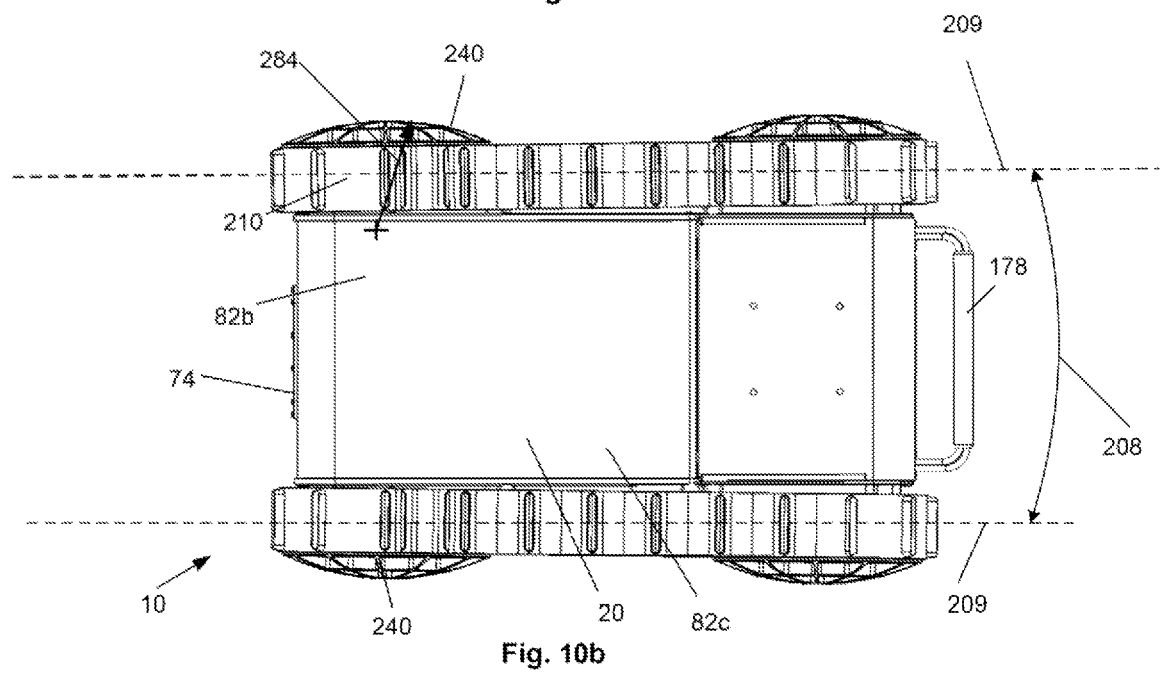

As shown in FIGS. 5a and 10b, the mobility device tracks 210 can have mobility device track axes 209. The track axes 209 can be parallel with each other, or at positive or negative mobility track angles 208 with respect to each other. For example, the mobility device tracks 210 can have adjustable toe-in (i.e., a positive mobility track angle 208) or toe-out (i.e., a negative mobility track angle). The toe-in can add stability to the steering and straight line stability at low and high speeds. The mobility track angle can be from about −10° to about +10°, for example about 0°. For toe-in configurations, the mobility track angle 208 can be from about 0.5° to about 10°, more narrowly from about 1° to about 5°, for example about 3°. The mobility track angle 208 can be adjustable, for example by adjusting an alignment bolt on one or both mobility devices 200 and/or by controlling servo motors or solenoids attached to one or both mobility devices 200.

The mobility device tracks 210 can have mobility device track outside nubs 211 (and 212, shown infra) and/or mobility device track inside nubs 216 (217 and 218). The outside nubs 211 can be on the outside surface of the device tracks 210. The inside nubs 216 can be on the inside surface of the mobility device tracks 210. The inside nubs 216 (217 and 218) can, for example, retain the track 210 on the pulley 220, track guide and rollers. The outside nubs 211 (and 212) can, for example, increase the traction between the track 210 and the ground surface. The mobility device inside nubs 216 and/or mobility device outside nubs 211 can be studs, spikes, brads, cleats, anchors, rails, or combinations thereof. The inside nubs 216 and/or outside nubs 211 can be integral with and/or removably attached to the mobility device tracks 210.

The inside nubs 216 and/or outside nubs 211 can be separated, individual nubs, as shown, and/or one or more rails extending along part or all of the length of the track. For example, the rail can have nublets extending toward (e.g., medially) or away from (e.g., laterally) the center of the width of the track. The inside nubs 216 (or 316) or nublets can hold the track 210 (or 310) on the pulleys 220 (or 320) and/or track guides and/or rollers, and/or extend into and engage with a track interface, such as the radially extending vanes 345, of the pulley caps 240 and 340. The inside nubs 216 (or 316) or nublets can mate, engage and disengage the radially extending vanes 345 as the pulley caps 240 and 340 rotate attached to and synchronized with the pulleys 220 (or 320) and the track 210 (or 310) moves along the pulleys 220 (or 320). Radially extending vanes can be on the pulley 220 (or 320) to engage the inside nubs 216 (or 316).

The inside nubs 216 and/or outside nubs 211 can be spaced apart from the adjacent, respective, nubs 216 and/or 211 by from about 1 cm (0.4 in.) to about 5 cm (2 in.). For example, the outside nubs 211 can be spaced apart by about 42 mm (1.6 in.). Also for example, the inside nubs 216 can be spaced apart by about 14 mm (0.55 in.). The inside nubs 216 and/or outside nubs 211 can extend laterally across the part or all of the width of the mobility device track 210. For example, the outside nubs 211 can be located in longitudinally equal pairs with one nub of each pair located on the lateral inside of the mobility device track and the other nub of the pair located on the lateral outside of the mobility device track 210. The outside nubs 211 can increase the traction or friction between the tracks 210 and the ground surface adjacent to the tracks 210.

One, two, three, four or more of the flippers 310 can have mobility assistance device tracks 310. The mobility device tracks 310 can encompass the outer perimeter of the flippers along a vertical plane parallel with the plane of the flipper 301. The flippers 310 (e.g., the non-tracked flippers) can have no track, skids, skis, tires, or combinations thereof.

The mobility assistance device 300 can have a mobility assistance device pulley or flipper pulley 320. The flipper pulley 320 can receive power from a power source, such as a motor, and deliver it to the mobility assistance device track 310. The outer lateral side of the flipper pulley 320 can be attached to and covered by a mobility assistance device pulley cap 340. The mobility assistance device pulley cap 340 can have one, two or more angular (e.g., about) 360° vanes and/or one or more (e.g., from about 3 to about 30, for example about 12) radial mobility assistance device vanes 342b and recessions.

The flipper 301 can have a mobility assistance track guide 330. The flipper 301 can have a mobility assistance track guide arm 331. The mobility assistance track guide arm 331 can be vertically inside of or contained by the mobility assistance track guide 330. The mobility assistance track guide arm 331 can be attached to and/or integral with and/or interference fit within the mobility assistance track guide 330.

The mobility assistance track guide 330 and the mobility assistance track guide arm 331 can have angular and radial mobility assistance track guide vanes 350a and 350b, respectively, and recessions. The angular mobility assistance track guide vanes 350a can extend from a first terminal side of the mobility assistance track guide 330 or mobility assistance track guide arm 331, to a second terminal side of the mobility assistance track guide 330 or mobility assistance track guide arm 331.

The flipper 301 can have roller wheel caps 336 (and 337), for example attached to the lateral inside and outside of a roller wheel (shown infra). The roller wheel caps 337 can have a diameter larger than the roller wheel, for example interference fitting against, retaining and guiding the mobility assistance device track 310 on the flipper 310.

Figure 17:
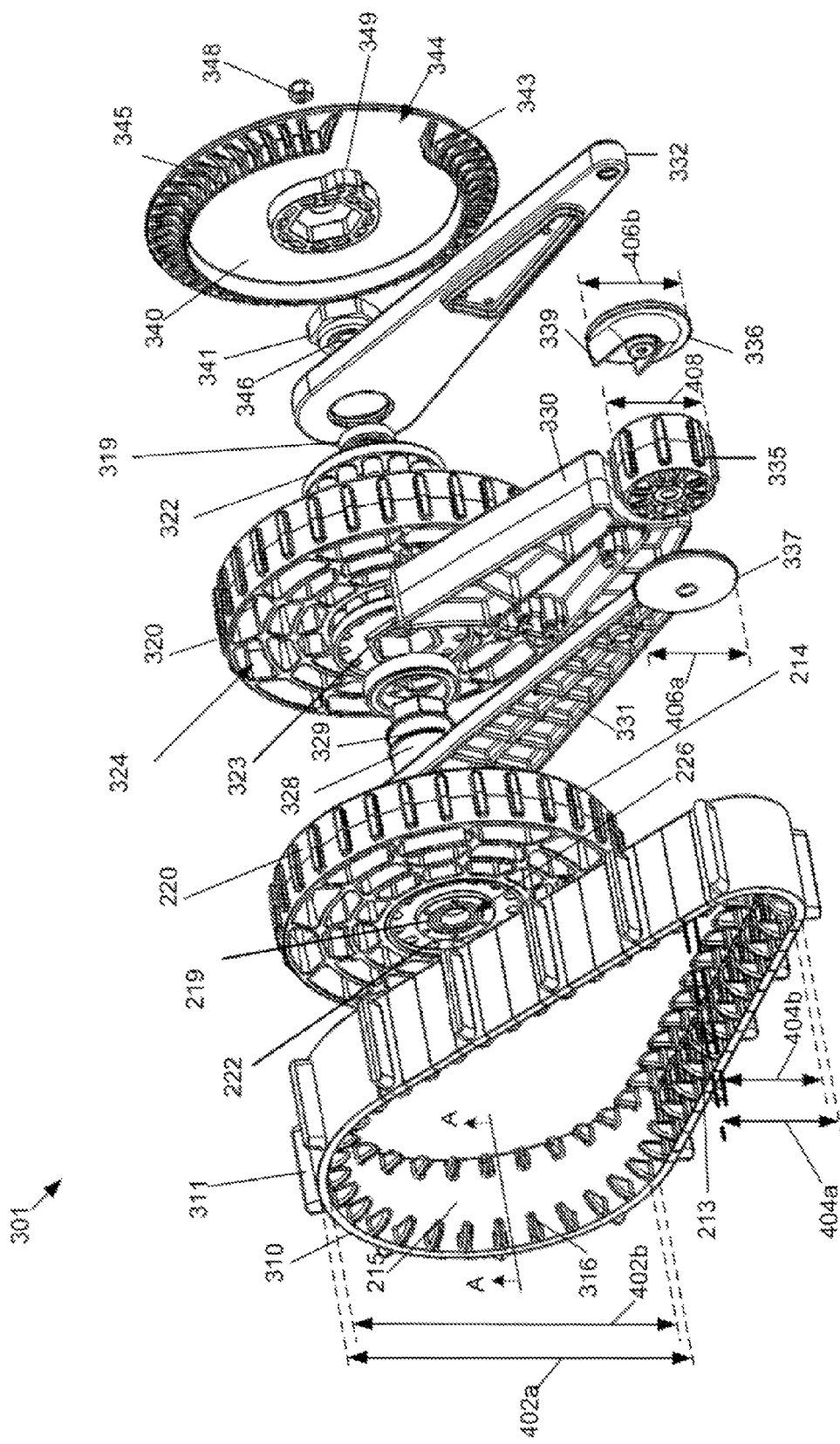

FIG. 17 illustrates that the tracks 210 and 310 can have track large outer diameters 402a and track large inner diameters 402b, for example along the pulleys 220 and 320. The track large outer diameters 402a can be from about 5 cm to about 35 cm, for example, about 15 cm.

The track large inner diameters 402b can be from about 4 cm to about 34 cm, for example, about 14 cm.

The mobility assistance device tracks 310 can have track small outer diameters 404a and track small inner diameters 404b, for example along the roller wheels 335. The track small outer diameters 404a can be from about 2 cm to about 20 cm, for example, about 4 cm.

The track small inner diameters 404b can be from about 2 cm to about 19 cm, for example, about 3 cm.

The track guide caps 337 and 336 can have inner and outer track guide cap diameters 406a and 406b, respectively. The track guide cap diameters 406a and 406b can be from about 2.1 cm to about 19.1 cm, for example, about 3.5 cm.

Figure 18:
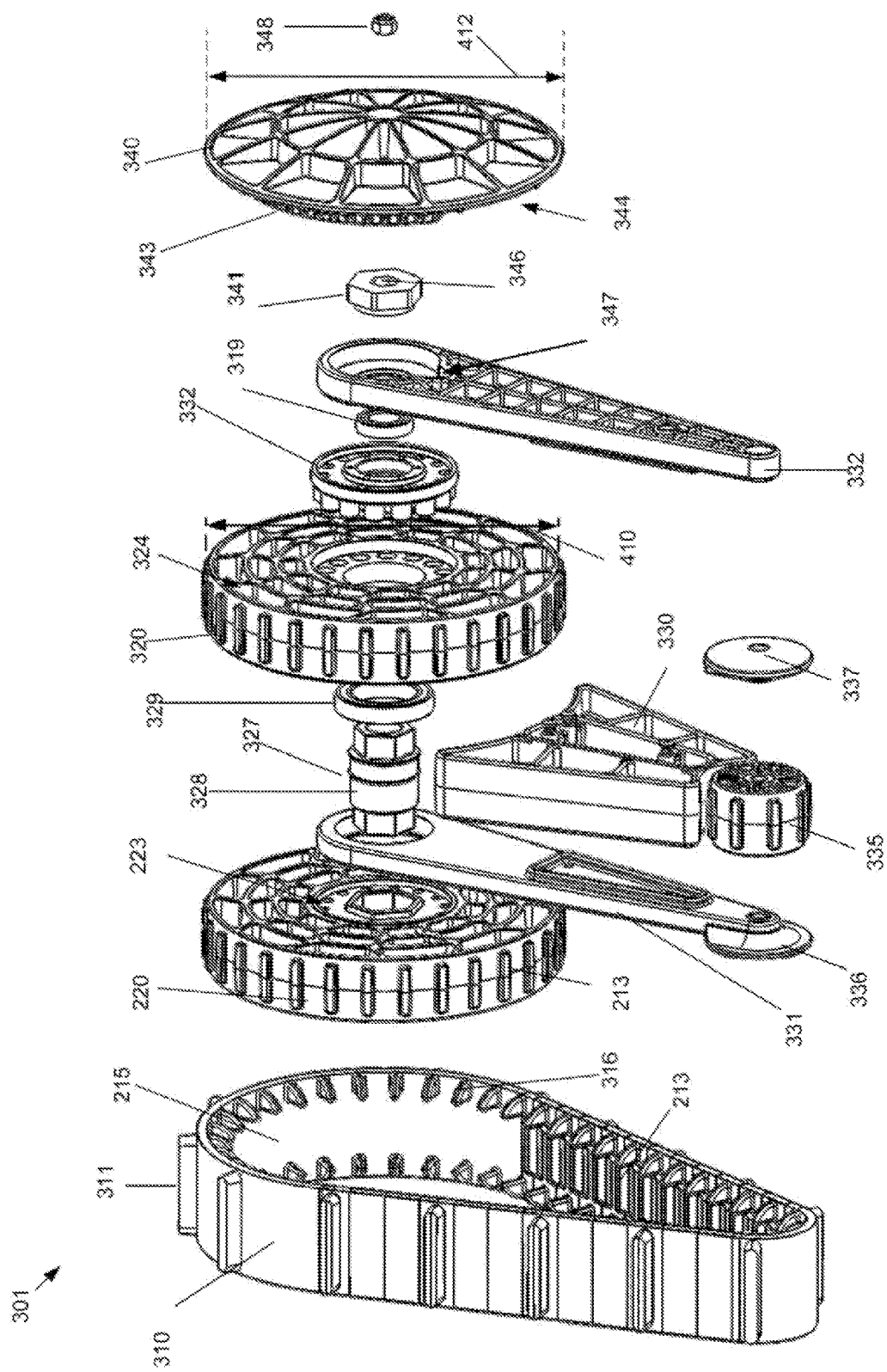

FIG. 18 illustrates that the pulleys 220 and 320 can have pulley diameters 410. The pulley diameters 410 can be from about 4 cm to about 34 cm, for example, about 14 cm.

The pulley end caps, mobility device pulley caps 240 or mobility assistance device pulley caps 340 can have pulley cap diameters 412. The pulley cap diameters 412 can be from about 4.1 cm to about 34.1 cm, for example, about 14.1 cm.

Figure 14:
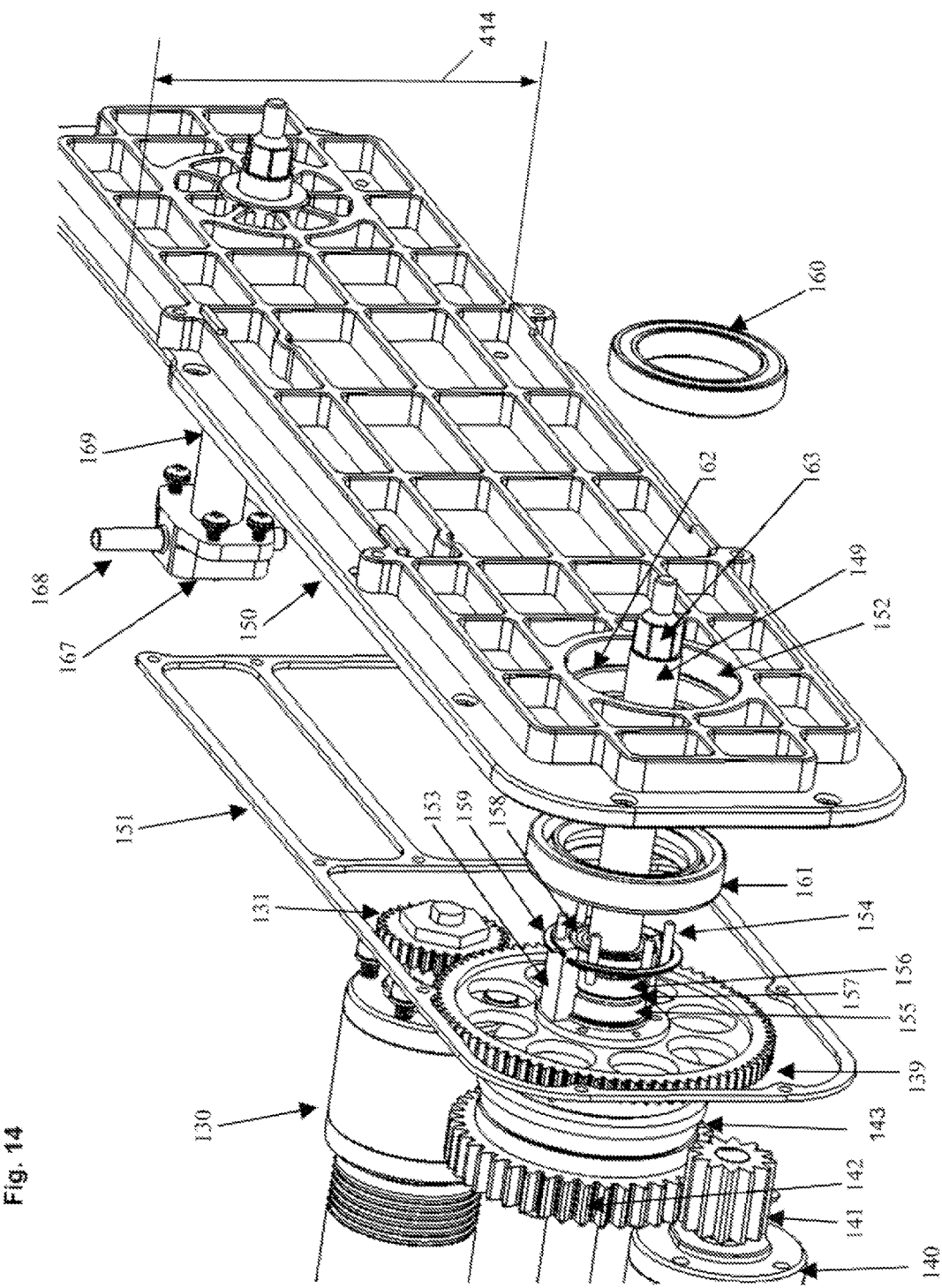

FIG. 14 illustrates that the side plates 150 can have sideplate heights 414. The sideplate heights 414 can be from about 4.1 cm to about 34.1 cm, for example, about 14.1 cm.

When the tracks 210 and/or 310 are in a cool or unexpanded state, the track large outer diameters 402a can be larger than the pulley cap diameters 412 and sideplate heights 414, for example to maintain contact between the track 210 and/or 310 and the ground surface. When the tracks 210 and/or 310 are in a warm or expanded state, the track large inner diameters 402b can be smaller than the pulley cap diameters 412 and sideplate heights 414, for example to laterally restrain the tracks 210 and/or 310 (e.g., by interference fitting) on the respective track guides and pulleys.

When the mobility assistance device tracks 310 are in a are a cool or unexpanded state, the track small outer diameters 404a can be larger than the inner and outer track guide cap diameters 406a and 406b, for example to maintain contact between the mobility assistance device tracks 310 and the ground surface. When the mobility assistance device tracks 310 are in a warm or expanded state, the track small inner diameters 404b can be less than the inner and outer track guide cap diameters 406a and 406b, for example to laterally restrain the mobility assistance device tracks 310 (e.g., by interference fitting) on the respective track guides and pulleys.

The flipper 301 can have a modulus of elasticity at 73° F. of from about 280,000 to about 420,000. The flippers 301 can be rigid enough to provide support for the mobility assistance tracks 310 between the axes of the roller wheel and the pulley. The flipper 301 can transmit torque to effectively rotate the mobility assistance device. The flipper 301 can flex on impact, or while being twisted/torqued in ways other than about the axis of rotation of the device.

The pulley wheels 220, 221, and 320 can have a modulus of elasticity at 73° F. of from about 8,000 to about 12,000. The tracks 210 and 310 can have a modulus of elasticity at 73° F. of from about 2,400 to about 5,600. The antennas can have a modulus of elasticity at 73° F. of from about 16,000 to about 24,000.

The body 20 can have one or more side doors 70 on one or both sides, and/or front and/or back, and/or top and/or bottom. For example, the side door 70 can be between the top of the mobility device track 210 and the bottom of the mobility device track 210. The side doors 70 can access the first, second, third or other compartments. Each side door 70 can access a single compartment or a single side door can access two, three or more compartments.

The body 20 can have a side door latch 72. A first part of the side door latch 72 can be fixed to the side adjacent to the seam between the side door 70 and the side plate adjacent to the side door 72. A second part of the side door latch 72 can be fixed to the side door 70. The side door latch 72 can be unlatched opened or latched closed, fixing the door closed. For example, the side door can be locked unless cleaning, replacing payloads or maintenance is required.

One (as shown) or both lateral sides, and/or one or both longitudinal ends, and/or the top and/or the bottom can have doors similar to the side door 70 with or without latches.

The mobility assistance device track 310 can have mobility assistance device track outside nubs 311 and/or mobility assistance device track inside nubs 316. The outside nubs 311 can be on the outside surface of the mobility assistance device tracks 310. The inside nubs 316 can be on the inside surface of the mobility assistance device tracks 310. The inside nubs 316 and/or outside nubs 311 can be studs, spikes, brads, cleats, anchors, rails, or combinations thereof. The inside nubs 316 and/or outside nubs 311 can be integral with and/or removably attached to the mobility assistance device tracks 310.

The inside nubs 316 and/or outside nubs 311 can be spaced apart from the adjacent, respective, nubs 316 and/or 311 by from about 1 cm (0.4 in.) to about 5 cm (2 in). For example, the inside nubs 316 can be about 14 mm (0.55 in.) apart, and the outside nubs 311 can be about 42 mm (1.7 in.) apart. The inside nubs 316 and/or outside nubs 311 can extend laterally across the part or all of the width of the mobility assistance device track 310. For example, the outside nubs can be located in longitudinally equal pairs with one nub of each pair located on the lateral inside of the mobility assistance device track 310 and the other nub of the pair located on the lateral outside of the mobility assistance device track 310. The outside nubs 316 can increase the traction or friction between the mobility assistance device tracks 310 and the ground surface adjacent to the tracks 310.

Figure 5B:
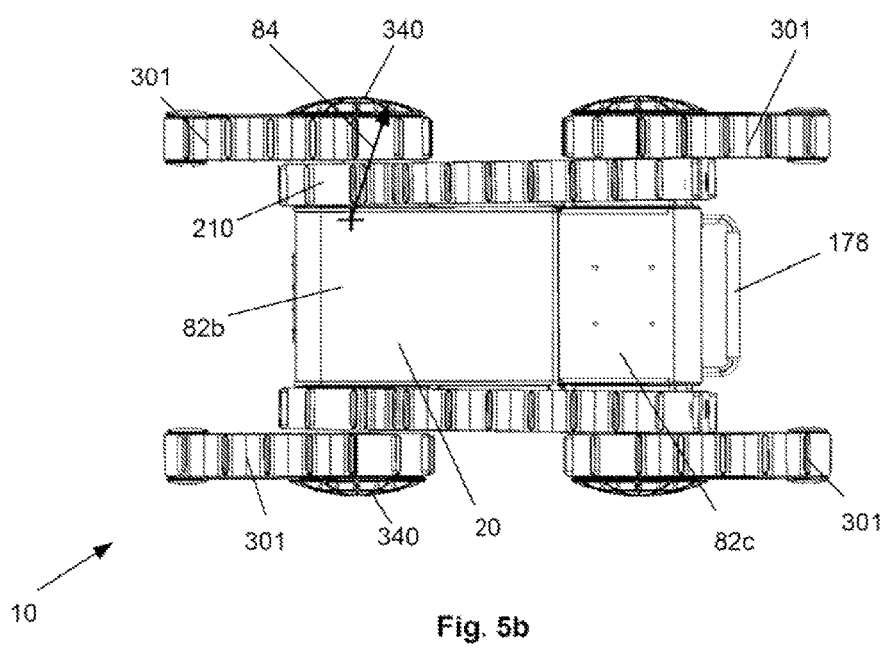

FIGS. 5a and 5b illustrate that the body 20 can have a first, second, and third compartment for holding removable payloads. The first, second and third compartments can be accessed through first, second and third interfaces, respectively. The first, second and third interfaces can be covered with first, second and third interface covers 74, 76 and 176, respectively. The interface covers 74, 76 and 176 can be attached to the body 20 with cover attachment devices 80, such as screws, bolts, fast-release (e.g., cotter) pins, snaps, latches, or combinations thereof.

One, two or three of the interface covers 74, 76 and 176 can have ventilation and/or sound openings 78, such as vents, pores, filters, holes grids, a screen-covered, fabric-covered and/or mesh-covered and/or grate-covered opening, or combinations thereof. The openings 78 can be waterproof and/or dust-proof. The robotic system 10 can have a speaker and/or microphone can be located inside of the openings 78. A ventilation fan, manifold or conduit can be located inside of the openings 78.

The body 20 can have an open or covered payload bay 175. One or more payloads can be loaded into and permanently fixed or removably attached or detachable from to the payload bay 175.

The body 20 can have one or more top body panels 80a on the top side of the body 20, one or more bottom body panels 82b on the bottom side of the body 20, one or more payload bay body panels 82c, side front and rear body panels, and combinations thereof. The body panels can be reinforced and armor plated. For example, the body panels can be made from iron, steel, aluminum, titanium, plastic, ceramic, laminated glass, polycarbonate thermoplastic, carbon fiber layers, depleted uranium, buckypaper, aluminum foam, or composites or other combinations thereof.

The body panels can be from about 2.5 mm (0.098 in.) to about 14 mm (0.55 in.) thick, for example with external and internal ribs to provide support. The ribs also act as vanes to dissipate heat. The ribbed design can create a high-strength, lightweight chassis that has extra surface area, compared with a rib-less body, for example for dissipating heat.

The body panels can be thermally conductive and sink heat away from the motors and other heat-generating electric components. The body panels can have radiative heat transfer vanes 86, for example, to dissipate heat from the electric components into the environment outside of the body 20.

The mobility assistance devices 300 can have mobility assistance device pulley caps 340 attached to the lateral outside of the mobility assistance device pulleys that can drive the mobility assistance device tracks 310. The mobility assistance device pulley caps 340 can have a rounded lateral outer surface, for example forming a mobility assistance device pulley end cap radius of curvature 84. The mobility assistance device pulley end cap radius of curvature 84 can be from about 10 cm (4 in.) to about 21 cm (8.3 in.), for example about 162 mm (6.38 in.). When the robotic system 10 is positioned or falls onto the side of the robotic system 10, the curvature of the mobility assistance device pulley end caps 340 can induce the robotic system to passively or actively (i.e., by activating the mobility assistance device 300) fall onto the top or bottom of the robotic system 10, for example enabling any of the tracks 210 and/or 310 to contact the ground surface and propel the robotic system 10.

The chassis 100 can have a handle 178 extending from one or both of the longitudinal ends of the chassis 100. The handle 178 can be configured to form an ergonomic gap between the handle 178 and the chassis 100. The handle 178 can support the hanging weight of the robotic system 10 and a full complement of payloads and other components loaded onto the chassis 100. For example, the handle 178 and chassis 100 can support from about 2 kg (5 lbs) to about 45 kg (100 lbs), more narrowly from about 5.4 kg (12 lbs.) to about 27 kg (60 lbs.), yet more narrowly from about 16 kg (35 lbs.) to about 23 kg (50 lbs.).

Figure 6A:
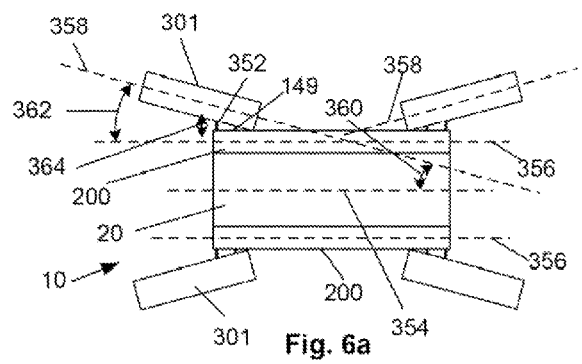
FIGS. 6a through 6f are top views of a variation of the robotic system with the flippers in extended and retracted configurations, respectively.

FIG. 6a illustrates that the body 20 can have a body longitudinal axis 354. The mobility devices 200 can have mobility device longitudinal axes 356. The mobility assistance devices 300 (e.g., flippers 301) can have mobility assistance device longitudinal axes 358.

The mobility assistance device longitudinal axes 358 can intersect the body longitudinal axis at one or more mobility assistance device-body angles 360. The mobility assistance device longitudinal axes 358 can intersect the mobility device longitudinal axes 356 at one or more mobility assistance device-mobility device angles 362.

The mobility assistance device-body angles 360 and/or the mobility assistance device-mobility device angles 362 can be zero (e.g., parallel axes) or non-zero. The mobility assistance device-mobility device angles 362 can be from about 0° to about 180°, more narrowly from about 5° to about 15°, for example about 10°. The mobility assistance device-body angles 360 can be from about 0° to about 180°, more narrowly from about 5° to about 15°, for example about 10°.

The flippers 301 can be vertically raised and lowered with respect to the body 20 and mobility devices 200, for example, to prevent the flippers from contacting the ground surface and to lift the mobility devices 200 so the drive forces from the mobility devices 200 do not conflict with the direction of the drive forces applied to the ground surface by the flippers 301. The flippers 301 and mobility devices 200 can contact and apply a driving force to the ground surface concurrently, even when the mobility assistance device-mobility device angles 362 are not about 0°.

The robotic system 10 can have one, two, three, four or more steering rods 352 that can be attached to the flippers 301. The steering rods 352 can be translatably powered and controlled by servo motors, solenoids, or combinations thereof. The steering rods 352 can extend laterally from the body 20. The steering rods 352 can translate laterally inward and outward, shown by arrows 364. The translation of the steering rods 352 can change the mobility assistance device-body angle 360 and the mobility assistance device-mobility device angles 362.

Each steering rod 352 can be synchronized or controlled independently. The mobility assistance device-body angles 360 can be adjusted to rotate or steer the robotic system 10.

The drive axles 149 can extend laterally from the body 20, for example, about perpendicular to the body longitudinal axis 354. The drive axles 149 can be laterally extendable and retractable to position the flippers 301 away from the mobility devices 200 at the location of the drive axles 149. For example, the drive axles 149 can be positioned to position the flippers 301 flush with and adjacent to the mobility devices 200 at the location of the drive axles 149 with no substantial gap between the flippers 301 and the mobility devices 200.

The mobility assistance device-mobility body angles 360 and/or the mobility assistance device-mobility device angles 362 of the flippers 301 at a first longitudinal end of the robotic system 10 can be about the negative of mobility assistance device-mobility body angles 360 and/or the mobility assistance device-mobility device angles 362 of the respective laterally corresponding flippers 301 at a second longitudinal end of the robotic system 10.

Figure 6B:
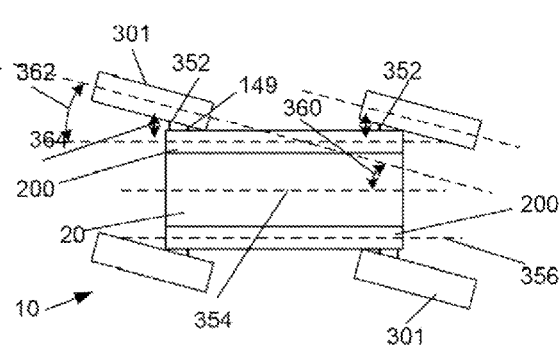

FIG. 6b illustrates that the mobility assistance device-mobility body angles 360 and/or the mobility assistance device-mobility device angles 362 of the flippers 301 at a first longitudinal end of the robotic system 10 can be about equal to the mobility assistance device-mobility body angles 360 and/or the mobility assistance device-mobility device angles 362 of the flippers 301 at a second longitudinal end of the robotic system 10.

The flippers 301 can all be parallel. The steering rods 364 for all the flippers 301 can be synchronized and/or fixed to each other.

Figure 6C:
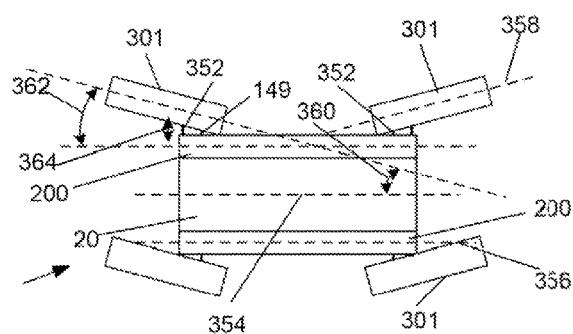

FIG. 6c illustrates that the left lateral front flipper 301 can be parallel with the right lateral front flipper 301, and the left lateral rear flipper 301 can be parallel with the right lateral rear flipper 301, for example to actively steer the robotic system 301, but the front flippers 301 can be optionally fixed to be parallel or not parallel with the rear flippers 301.

Figure 6D:
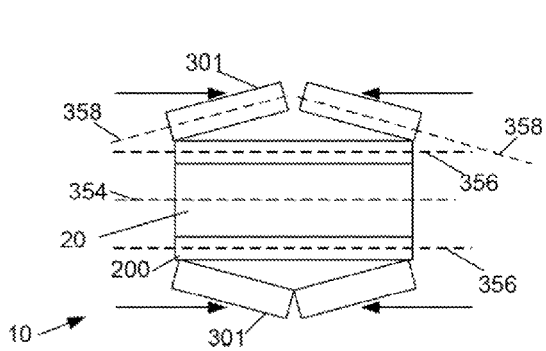

FIG. 6d illustrates that the flippers 301 can be retracted or contracted, as shown by arrows. Some or all of the flippers 301 can have non-zero mobility assistance device-mobility body angles 360 and/or the mobility assistance device-mobility device angles 362 in a retracted or contracted configuration.

Figure 6E:
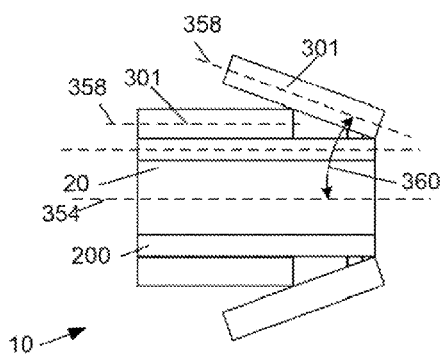

FIG. 6e illustrates that the flippers 301 at a first longitudinal end of the robotic system 10 can have mobility assistance device-mobility body angles 360 and/or the mobility assistance device-mobility device angles 362 of about 0° in a retracted or contracted configuration. The flippers 301 at the second longitudinal end of the robotic system 10 can have non-zero mobility assistance device-mobility body angles 360 and/or the mobility assistance device-mobility device angles 362 in a retracted or contracted configuration, for example not interference fitting against the flippers 301 at the first longitudinal end and compacting into a laterally symmetric footprint (when viewed from the top or bottom).

Figure 6F:
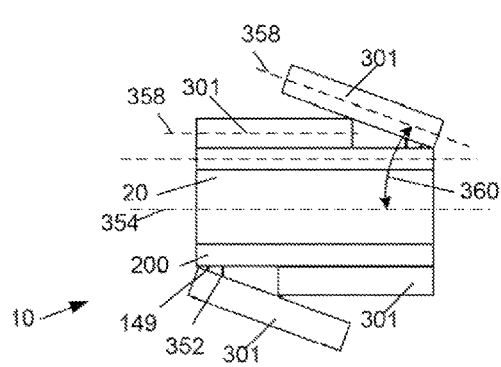

FIG. 6f illustrates that flippers 301 at first diametrically opposite corners of the robotic system 10 can have mobility assistance device-mobility body angles 360 and/or the mobility assistance device-mobility device angles 362 of about 0° in a retracted or contracted configuration. The flippers 301 at second diametrically opposite corners of the robotic system can have non-zero mobility assistance device-mobility body angles 360 and/or the mobility assistance device-mobility device angles 362 in a retracted or contracted configuration, for example not interference fitting against the flippers 301 at the first longitudinal end and compacting into a diagonally symmetric footprint (when viewed from the top or bottom).

Figure 7A:
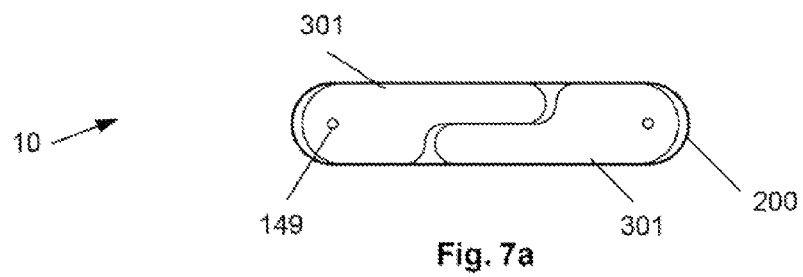
FIGS. 7a and 7b are side views of a variation of the robotic system with the flippers in retracted and extended configurations, respectively.

FIG. 7a illustrates that the mobility assistance devices 301 on a lateral side of the robotic system 10 can have complimentary shapes in a contracted and/or retracted configuration. The shapes of the mobility assistance devices 301 can retract (e.g., rotated inward).

For example, each flipper 301 can have more than one roller wheel 335 to form each flipper 301 to not interference fit against the other flippers 301 on the same lateral side of the robotic system 10 when the flippers 301 are in a retracted or contracted configuration, in an extended configuration or moving between different configurations.

Figure 7B:
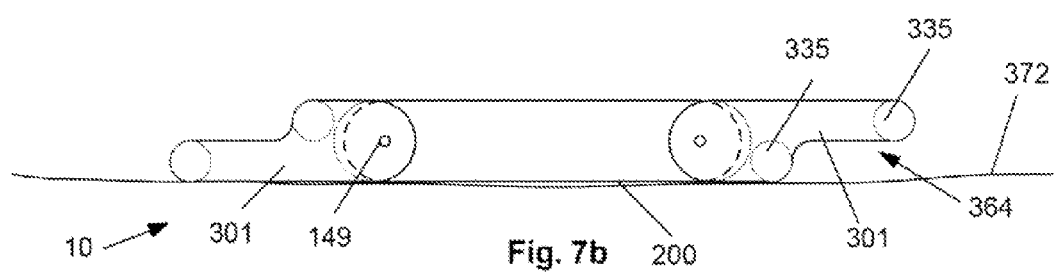
Figure 8:
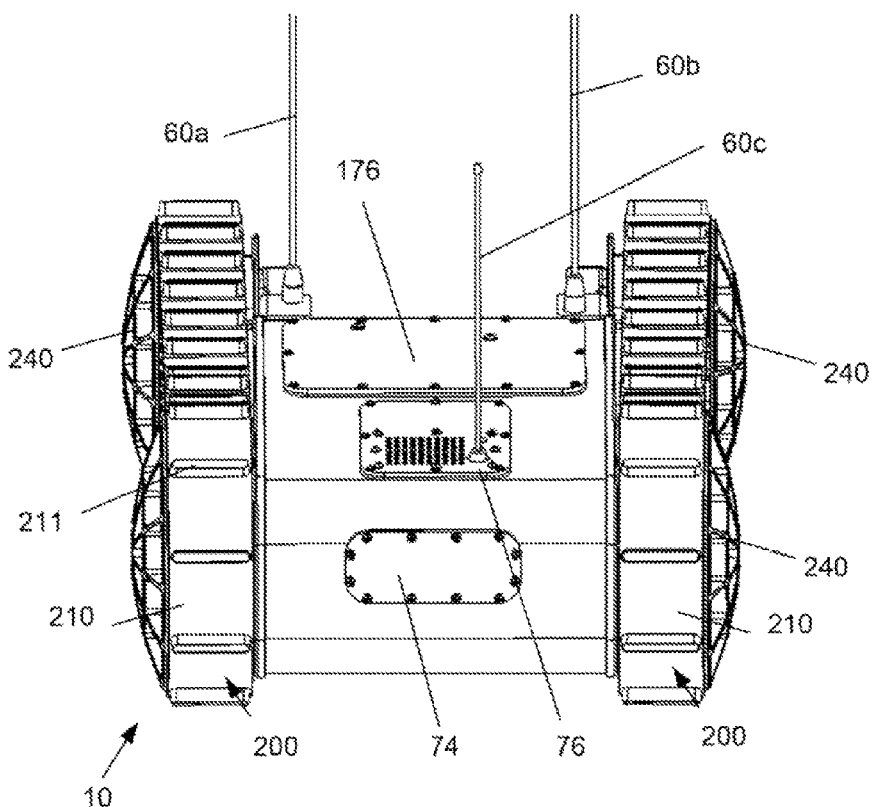
FIG. 8 is a front perspective view of a variation of the robotic system.
Figure 9A:
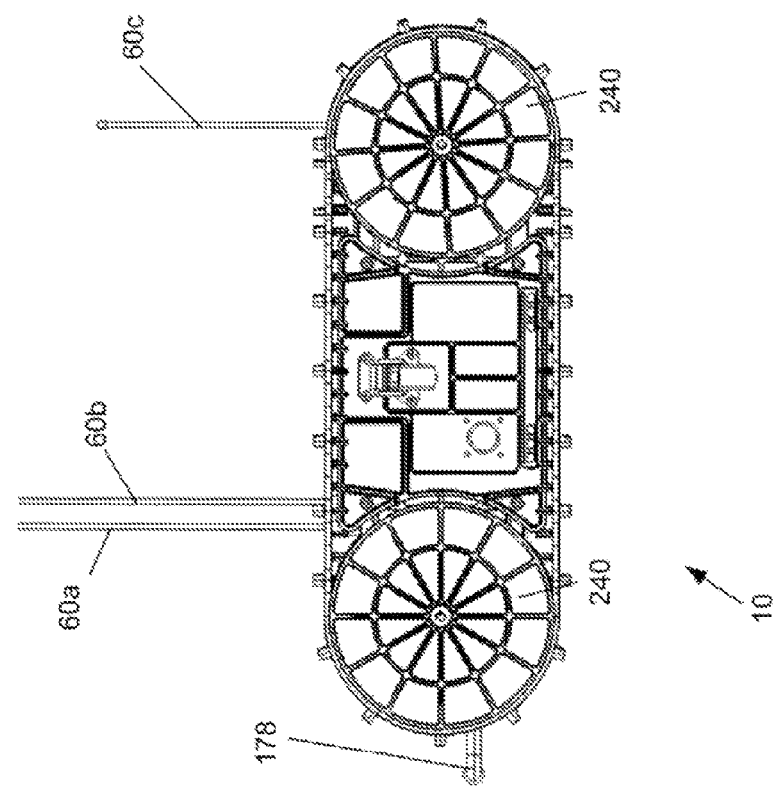
FIGS. 9a and 9b are left and right side views, respectively of a variation of the robotic system.
Figure 9B:
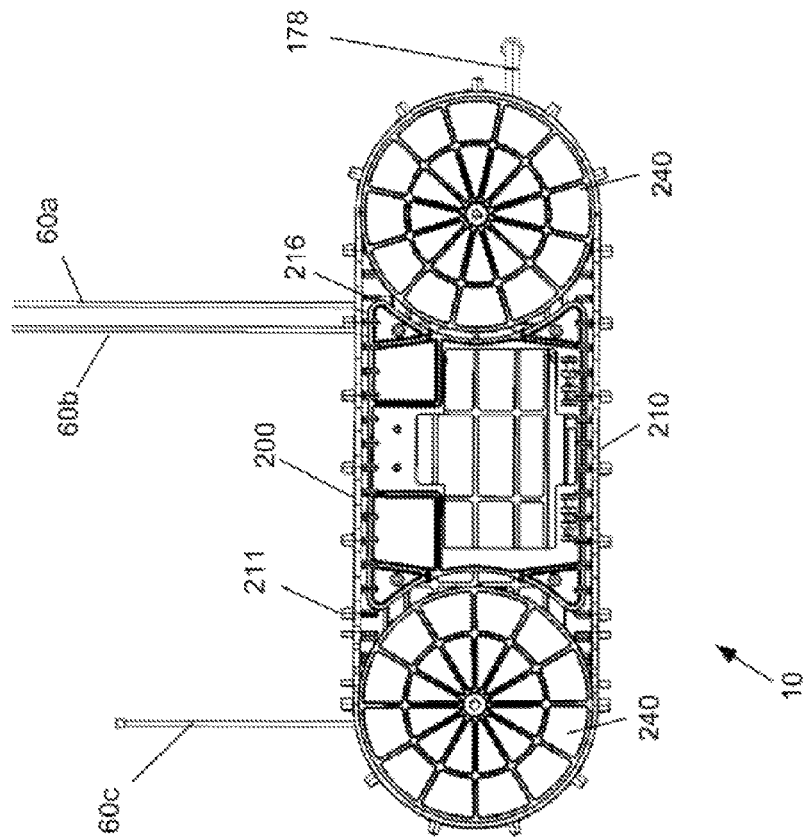

FIG. 7b illustrates that when the flipper 301 can be in an extended configuration. The flipper 301 at a first longitudinal end on a lateral side of the robotic system can contact the ground surface 372 along the substantially entire length of the flipper 301. The flipper 301 at a second longitudinal end on the same lateral side of the robotic system can contact the ground surface along about the entire length of the flipper 301, or upon less than about the entire length of the flipper 301, for example along about half of the length of the flipper 301. The flipper 301 can form a flipper rise 364. The flipper rise 364 can be the gap under a leading terminal end of the flipper 364. As the robotic system is moving in the direction of the flipper rise 364, obstacles can encounter the flipper initially in the flipper rise 364, under the flipper 301. The flipper can then be pressed upward as the flipper 301 contacts and is forced onto the obstacle.

FIGS. 8 through 10b illustrate that the robotic system 10 can have no mobility assistance devices. The mobility devices 200 can be the lateral termini of the robotic system 10.

The mobility devices 200 can have mobility device pulley end caps 240. Each mobility device pulley end cap 240 can have a mobility device pulley end cap radius of curvature 284. The mobility device pulley end cap radius of curvature 284 can be from about 10 cm (4 in.) to about 21 cm (8.3 in.), for example about 162 mm (6.38 in.). When the robotic system 10 is positioned or falls onto the side of the robotic system 10, the curvature of the mobility device pulley end caps 240 can induce the robotic system 10 to passively or actively (i.e., by activating the mobility device 200) roll onto the top or bottom of the robotic system 10, for example enabling any of the tracks 210 to contact the ground surface and propel the robotic system 10.

Figure 11:
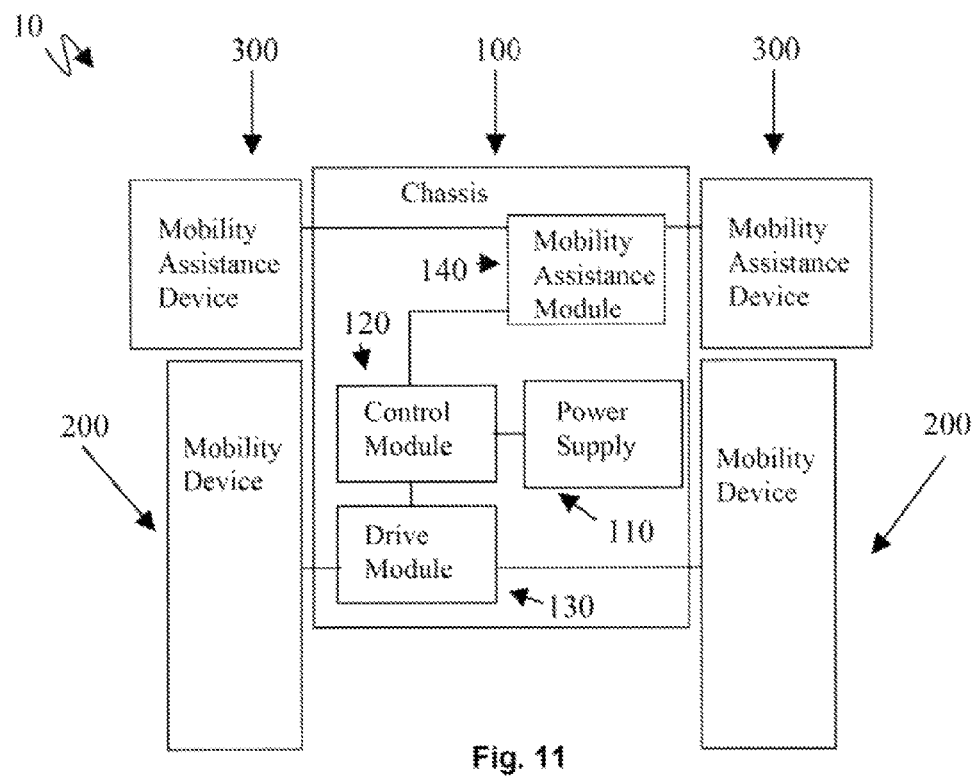
FIG. 11 is a schematic representation of a variation of the robotic system.
Figure 19:
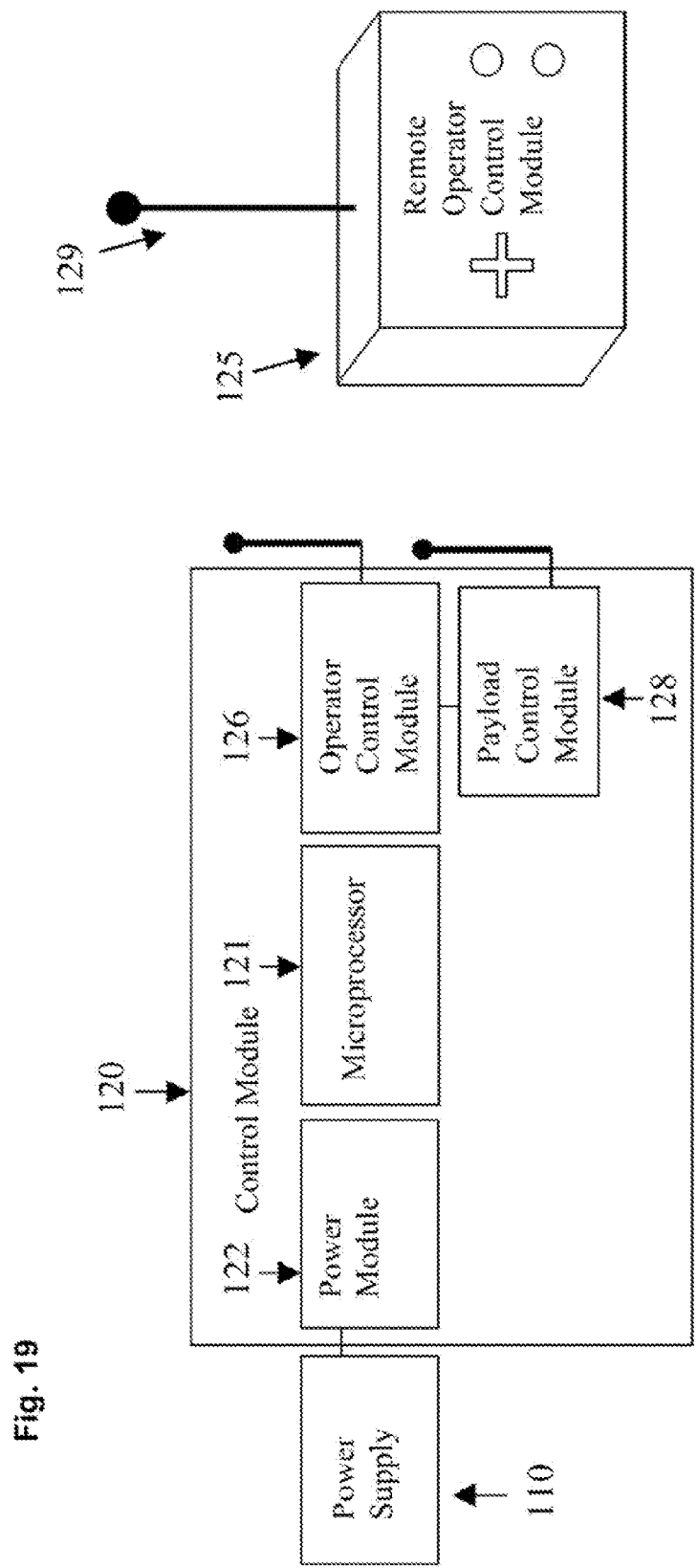
FIG. 19 is a schematic representation of a variation of a control module of the robotic system.
Figure 20:
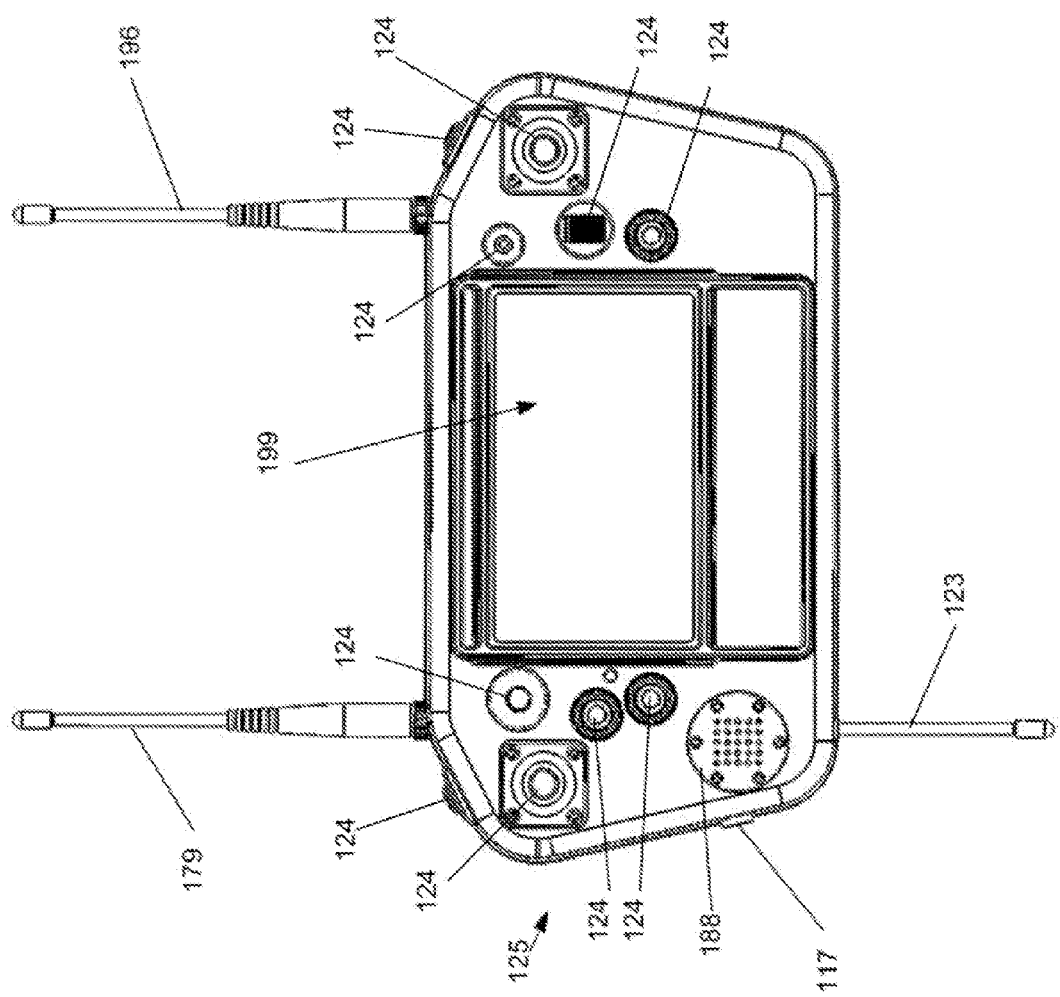
FIG. 20 is a perspective diagram of a variation of a remote user control module of the robotic system.
Figure 21:
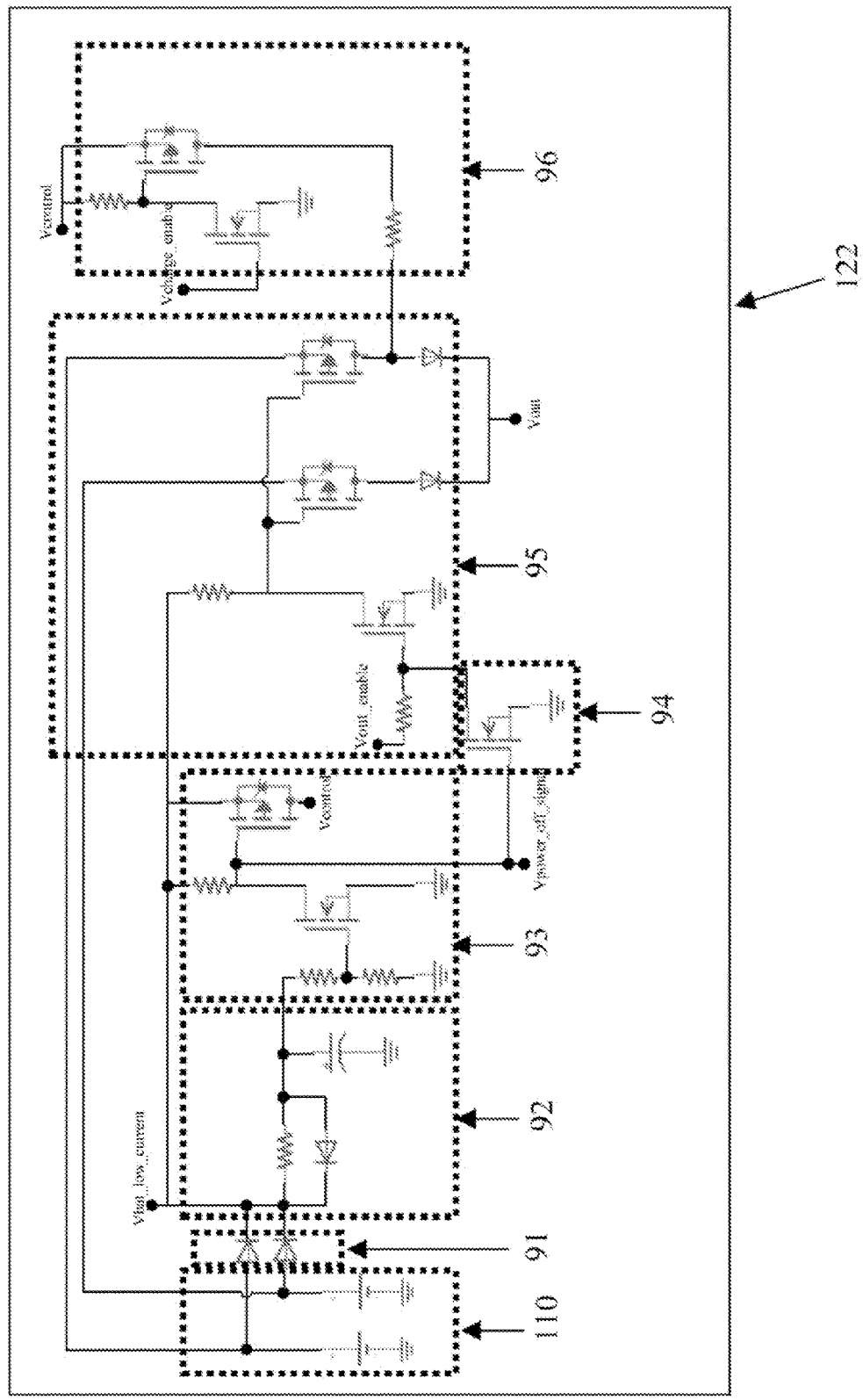
FIG. 21 is a schematic representation of a variation of a power module of the robotic system.
Figure 23:
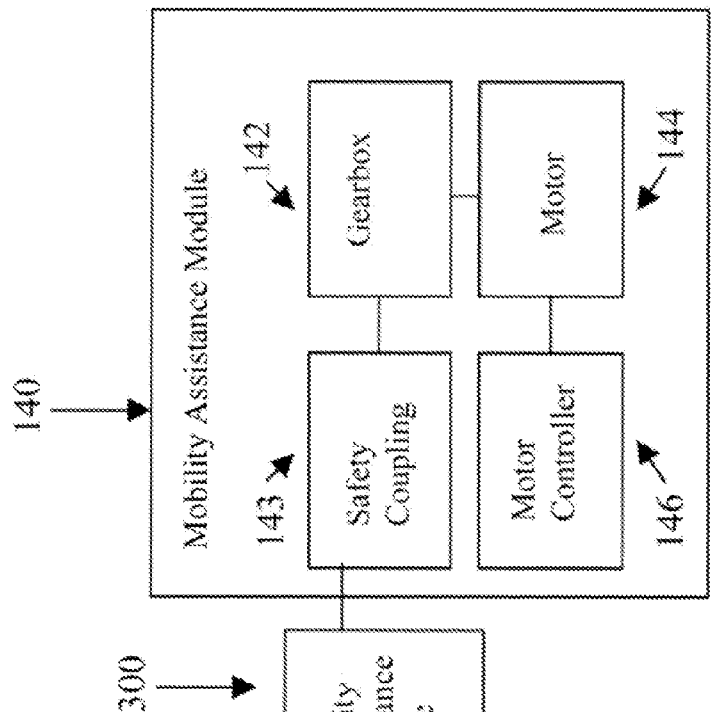
FIG. 23 is a schematic representation of a variation of a mobility assistance module of the robotic system.
Figure 22:
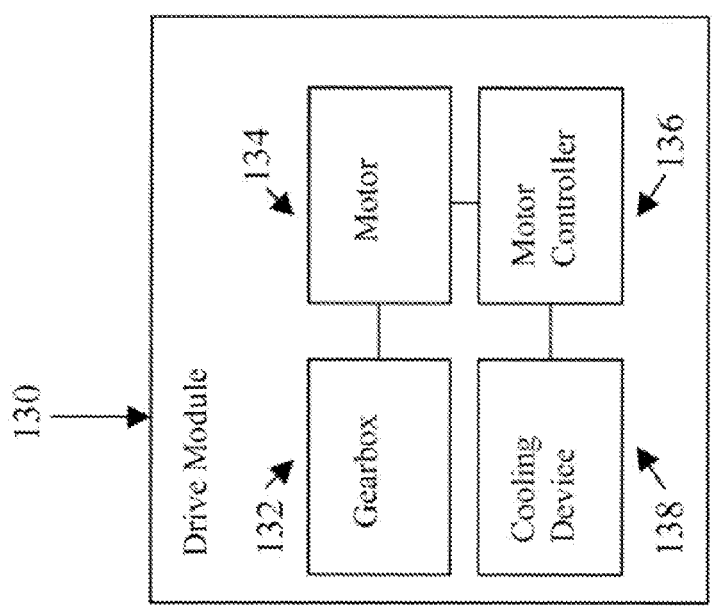
FIG. 22 is a schematic representation of a variation of a drive module of the robotic system.
Figure 24:
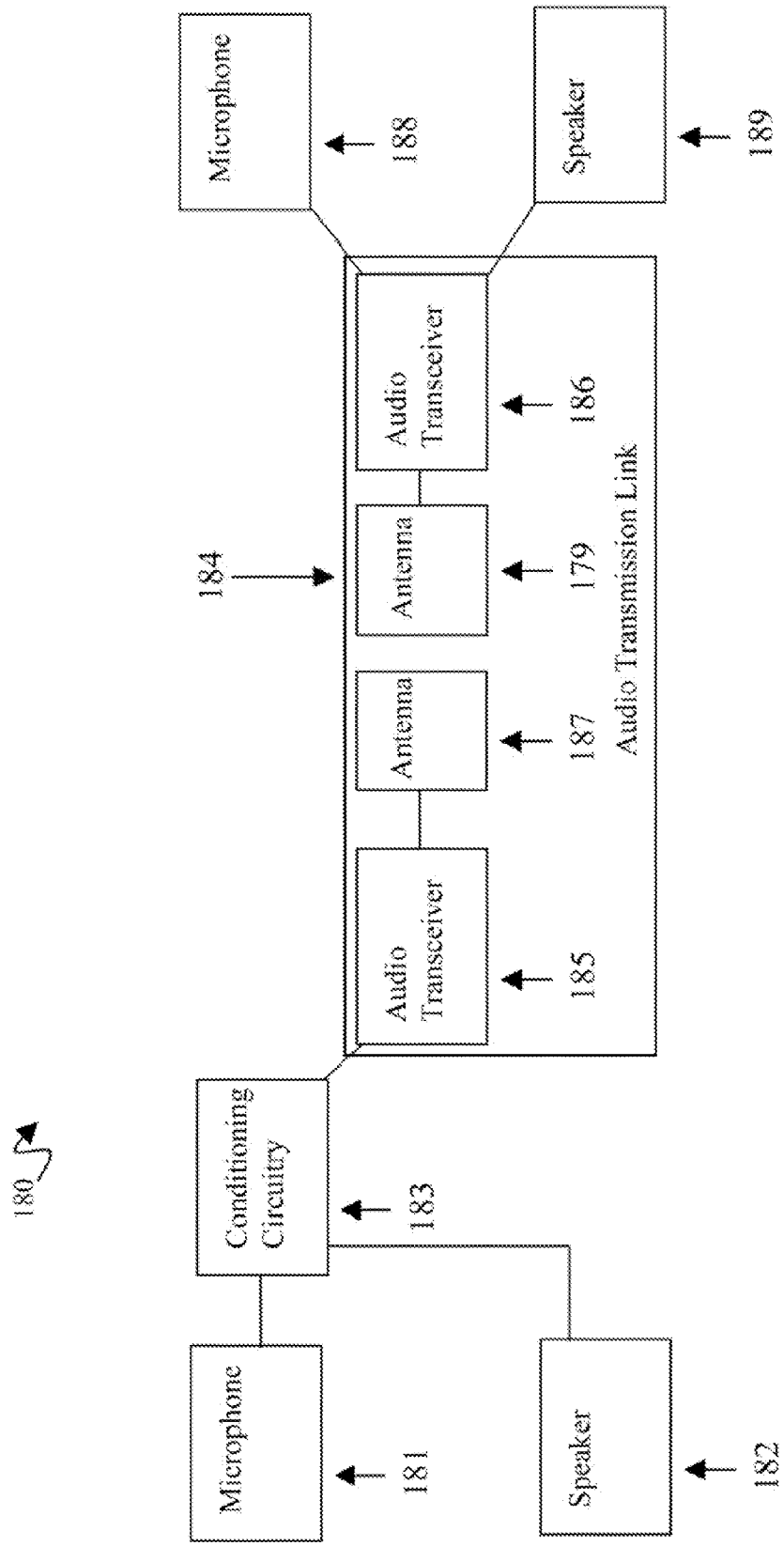
FIG. 24 is a schematic representation of a variation of an audio payload module of the robotic system.
Figure 25:
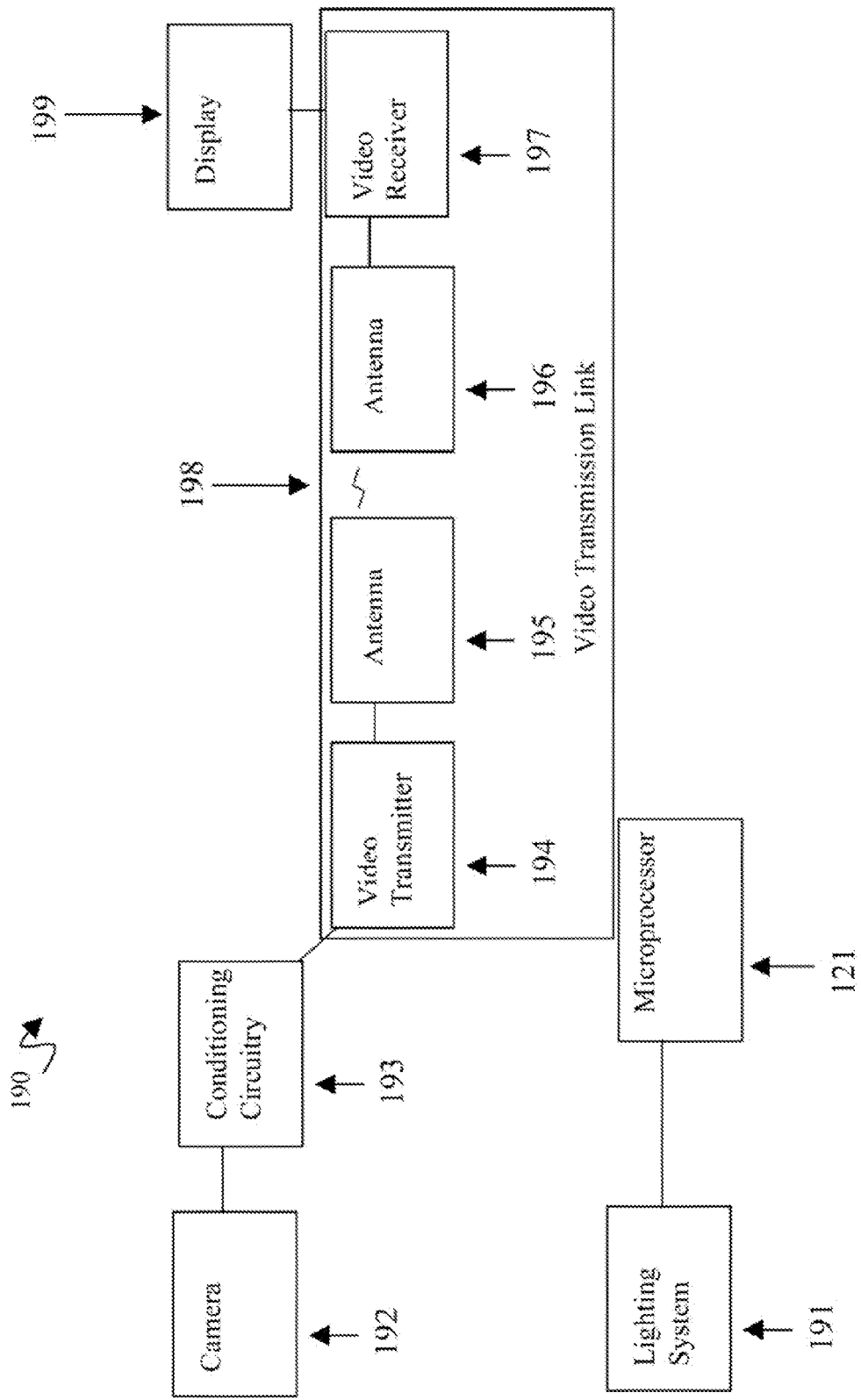
FIG. 25 is a schematic representation of a variation of a video payload module of the robotic system.

As shown in FIGS. 11 through 14, the robotic system 10 can include a chassis 100 which can house a power supply 110, a control module 120, and a drive module 130 connected to at least one mobility device 200. As shown in FIGS. 19 through 20, the control module 120 can include a remote operator control unit 127. As shown in FIG. 21, the power module can regulate and control the power to the control module 120. As shown in FIGS. 11 and 22, the drive module 130 can include at least one gearbox 132, at least one motor 134, and at least one motor controller 136. As shown in FIGS. 2 through 25 respectively, audio and video payloads may be attached to the robotic system 10. As also shown in FIGS. 11 and 23, the chassis 100 may house a mobility assistance module 140 connected to a mobility assistance device 300. As shown in FIGS. 17 and 18, the mobility assistance device 300 can be at least one flipper. The flipper can resemble a pinball machine flipper. The flipper can have a movable track 310. At least one flipper can be actuated, two flippers can be actuated, or any number of flippers may be automatically or manually actuated. As shown in FIGS. 26 through 29 the flippers may be actuated in a number of different positions depending on the application.

As shown in FIGS. 11 through 16, the chassis 100 can support all of the components of the robotic system 10.

Figure 12A:
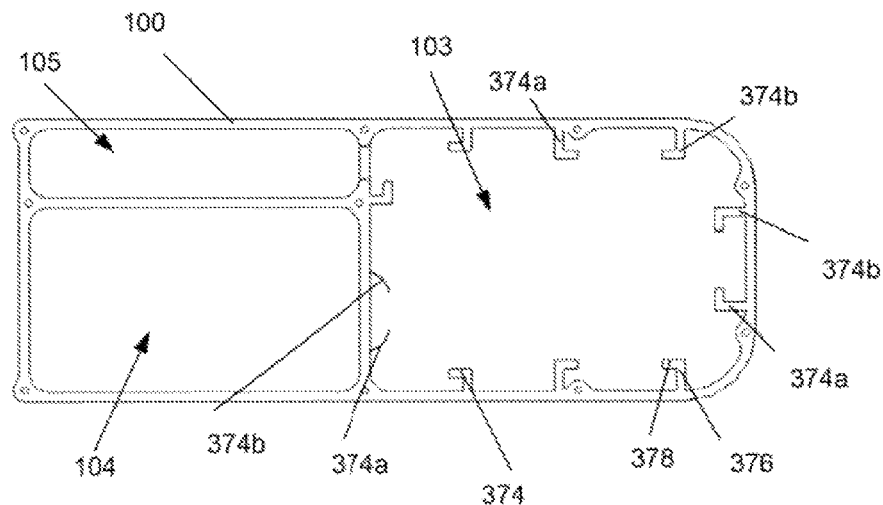
FIG. 12a is a side view of a variation of a chassis with exposed compartments.

FIG. 12a illustrates that the chassis 100 can have component-receiving chassis rails 374. The component-receiving chassis rails 374 can extend inwardly from the walls of the chassis 100. The chassis 100 can be made with an extrusion process. Any or all of the compartments 103, 104 and 105 can have one or more rails 374.

The components can have component rails and/or grooves that can be configured to be slidably received by the rails 374. The chassis rails 374 can be separate elements from the chassis 100 and/or can be extruded profiles integral with the chassis 100. The components can have snaps, clips, detents, other lockable configurations or features, or combinations thereof that can interface with the chassis rails 374. The components can be slid into the chassis 100 along one or more chassis rails 374, and locked, fixing the component against the chassis rail 374 and/or chassis wall. The components can be unlocked, detached from the chassis, and, for example, removed from the chassis 100. The components can be removed from the chassis 100 for maintenance, modification, specializing the robotic system, controlling weight, weight distribution, power usage, and combinations thereof.

The chassis rails 374 can each have one or more rail legs 376 and rail arms 378. The rail leg 376 can extend perpendicularly from the chassis wall or compartment wall. The rail arm 378 can extend perpendicularly from the rail leg 376. For example, the rail arm 378 can extend from the end of the rail leg 376 that is farthest from the wall from which the rail leg 376 extends. The chassis rails 374 can be curved. For example, the chassis rails 374 can have an arc shape.

The chassis rails 374 can be placed in pairs, such as a first chassis rail 374a and a second chassis rail 374b paired with the first chassis rail 374a. The first chassis rail 374a can be positioned in the opposite orientation as the corresponding second chassis rail 374b. A component can be configured to be slidably and/or lockably received by a first chassis rail 374a and the corresponding second chassis rail 374b.

Figure 12B:
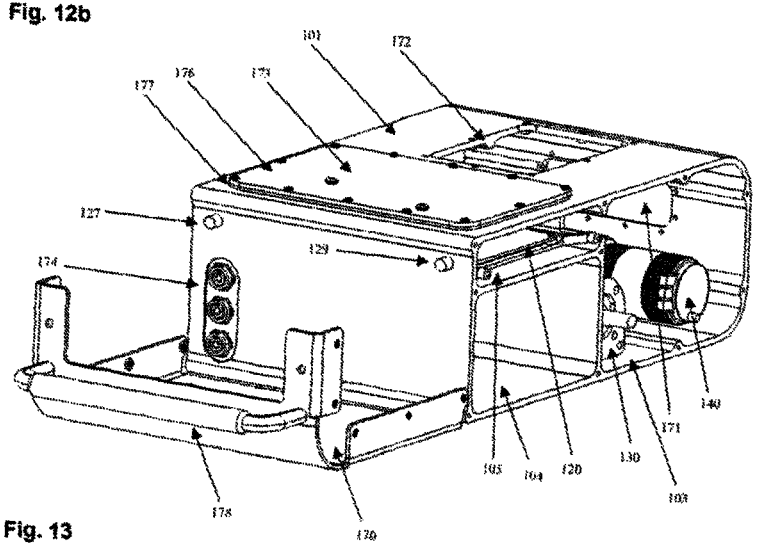
Figure 13:
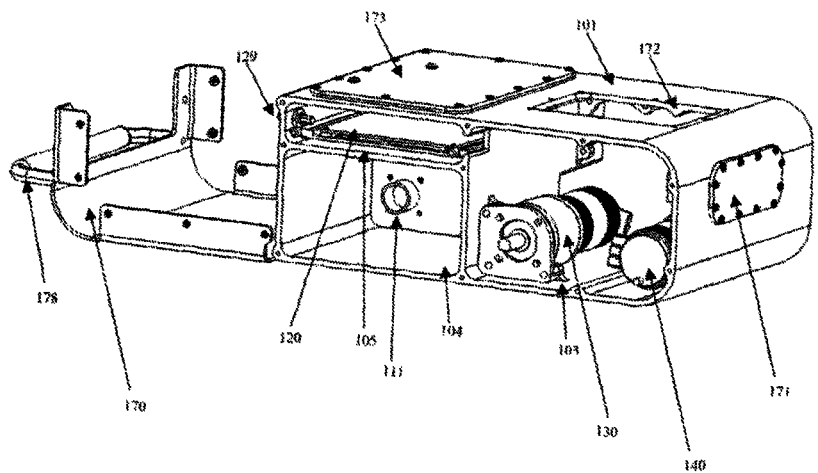
Figure 15:
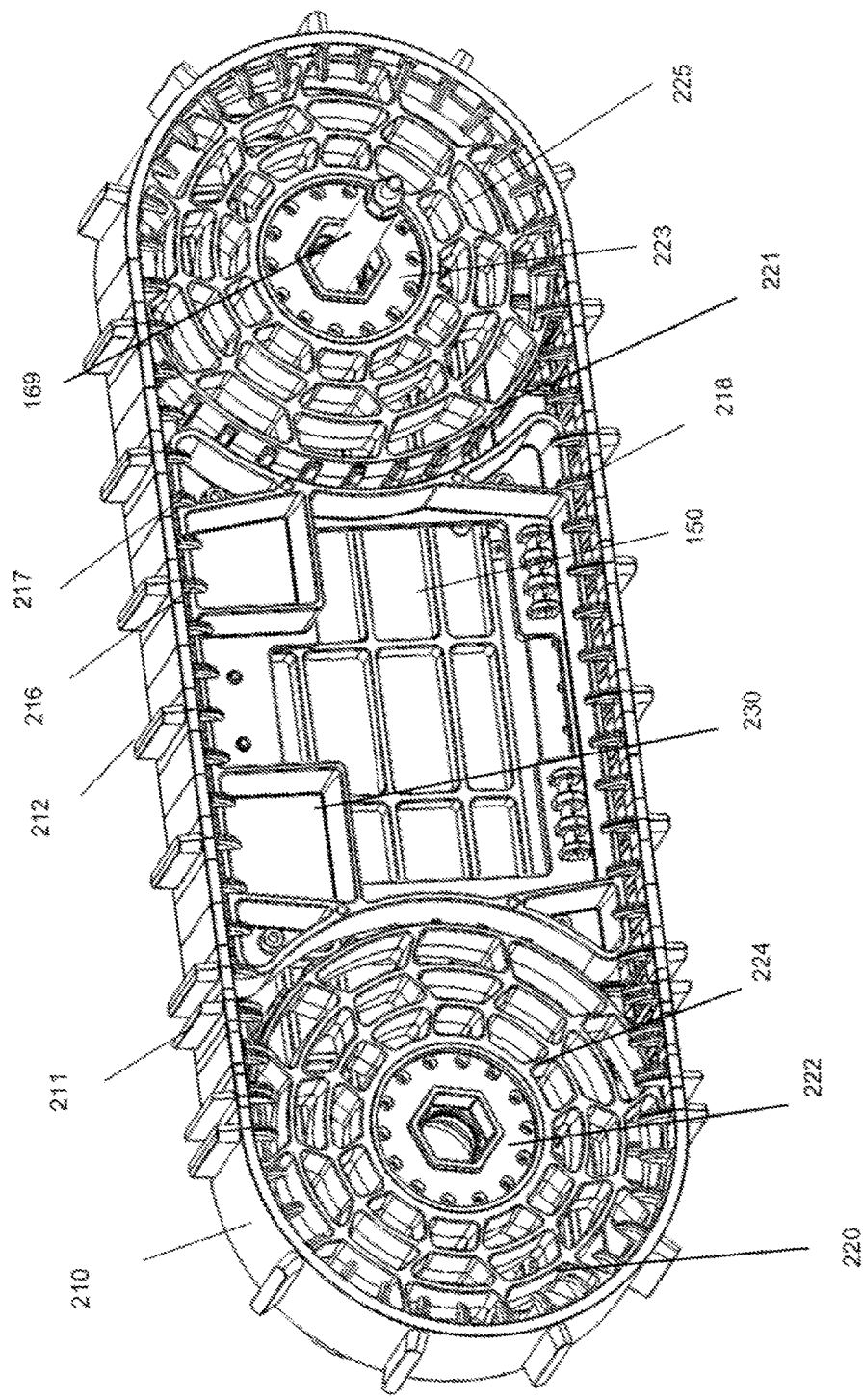
Figure 16:
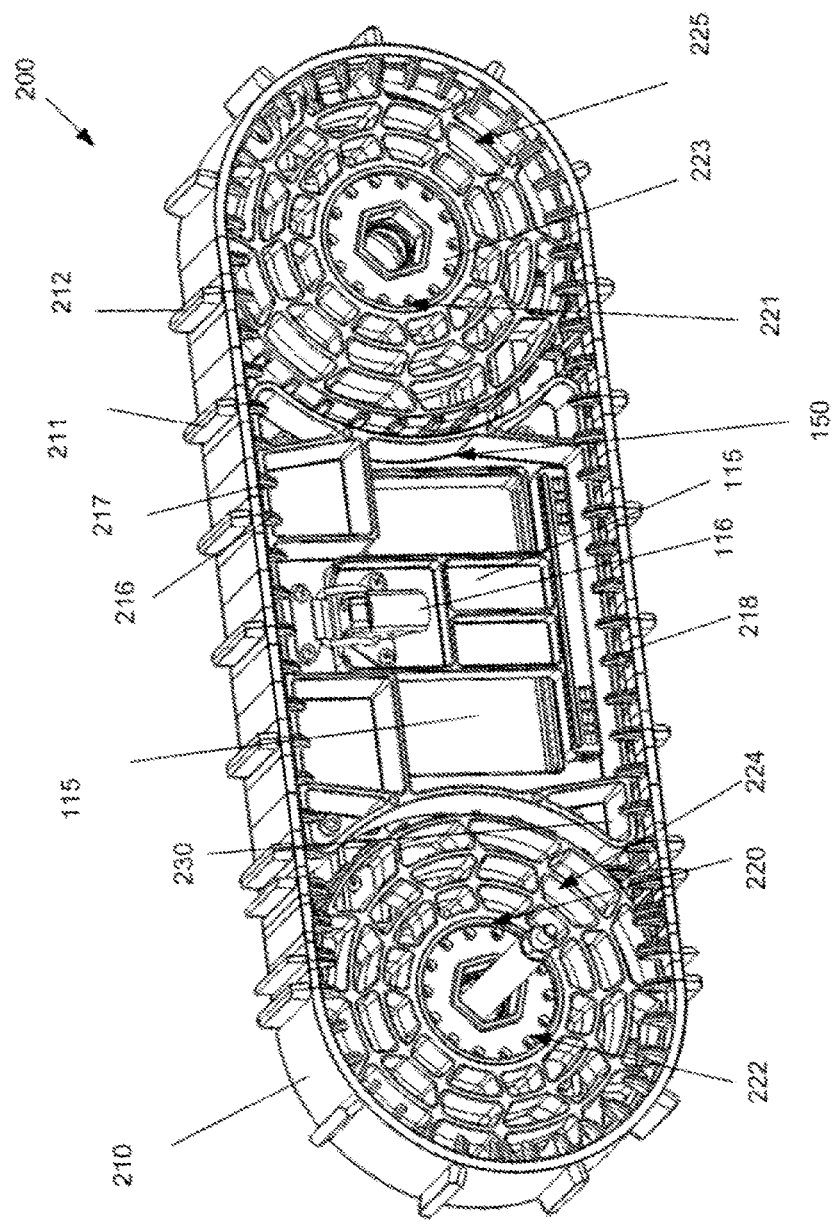

The chassis 100 can protect components of the robotic system 10 which may include electronic components, motors, power supplies, payload components, mobility assistance devices, and any other components of the robotic system 10. As shown in FIGS. 12b and 13, the chassis 100 can include a chassis frame 101. As shown in FIGS. 14 through 16, at least one side plate 150 can be configured to close the chassis frame 101. The side plate 150 may partially close the chassis frame 101. As shown in FIGS. 12b and 13, the chassis frame 101 can be divided into a first and second compartment 103, 104. The chassis frame 101 can have a third compartment. The second compartment 104 can include the third compartment 105. However, the chassis frame 101 can include one, two, three, four, five, six or more compartments, arranged in any suitable configuration for housing any number of modules and/or robotic system components.

For example, the actuator modules can be located close to the mobility devices to minimize material in the robot's design. The power source compartment can be located so that the power module can connect via a sliding-fit connector when the power source is placed in its compartment. Also, for the current configuration the power source (e.g., which can be relatively heavy) can be located close to the axis of rotation of the flippers that will be rotated to "self-right" the robotic system 10 when the robotic system 10 is upside down. This configuration can have a center of gravity close to the axis of rotation, which can help stability of the robotic system 10 for self-righting.

The chassis frame 101 can house about eight modules, for example, a control board, power board, front I/O board, audio board, two drive actuators, a flipper actuator, a safety coupling gear system, or combinations thereof. Electrical cabling can connect the modules. Gearing, axles, shafts and other mechanical components can connect the modules. The chassis frame 101 can have a desiccant, for example for removing moisture. The chassis frame 101 can have a lubricant.

The body plates can be made from machined aluminum alloys, extruded, or die-cast. The body plates can have ribs, for example, to increase strength and provide increased surface area. The ribs can be more prevalent around the high stress and/or high-heat areas of the body and plates, such as at connection points for fasteners, front, rear and top, bottom impact points, bearing journals, axes of rotation and mounting points for payloads. The materials can be plated and/or hardened with anodizing, forging or heat-treating processes.

The first compartment 103 of the chassis frame 101 can house and/or include at least one drive module 130. The first compartment 103 of the chassis frame 101 can house and/or include a mobility assistance module 140. A second compartment 104 of the chassis frame 101 can house a power supply 110 and a control module 120. The second compartment 104 can house and/or include a third compartment 105 for housing a control module 120 separately from the power supply 110. As shown in FIGS. 12b and 13, the chassis frame 101 can include at least one payload interface 171, 172, 173. The interfaces 171, 172, 173 can be holes in the body 20. The interface 172 is shown open. A speaker grill 78 and microphone 181 can be attached to or be part of an audio module payload mounted to the chassis. The audio module payload can be covered instead with a simple plate, such as shown by interface 173. The interface 173 can also be expanded with an external actuator, device, sensor, or combinations thereof. The interfaces can be adapted to attach and/or connect payload modules. The payload modules can be attached to the chassis frame 101 and/or payload connections 174 adapted to connect payload modules 170 a control module 120, power supply 110, or any other suitable robotic system component.

The chassis 100 can have payload bay 175 that can hold payloads. The bay 175 can have one or more mounting points for attaching to payloads, and/or can carry payloads or gear loose (e.g., like a flat pickup truck bed with walls). The interface 170 can be removed and some variation added, so in that sense it can be a payload.

The chassis 100 can be made of metal, for example aluminum, titanium, copper, steel, iron, brass, sheet metal, or combinations thereof. The chassis 100 may be made of a non-metal material, such as carbon fiber, polycarbonate, concrete, metal foam, wood, a polymer, or combinations thereof. The chassis 100 can be manufactured via a machining process, extruded, molded, cast, stamped, carved, welded or combinations thereof.

As shown in FIG. 14, the side plate 150 functions to close the chassis frame 101 to protect the internal components, and provide additional structural support. The side plate 150 can include a sealing device 151, which can seal the space between the chassis frame 101 and the side plate 150.

The sealing device 151 can be a gasket seal made of an elastomer, such as silicon rubber, a wax paper gasket, foam, caulk, glue, any other suitable gasket or sealing device, or The seal can be watertight and/or airtight, but may provide any suitable level of sealing, to prevent pebbles, sand, dirt, silt or any other material as the chassis frame 101, but may alternatively be made of any suitable material. The side plate 150 can be fastened to the chassis frame 101 using at least one fastener, particles from getting inside the chassis 100. The side plate 150 can be made of the same for example at least one machine screw, rivet, latch, interlocking snap-together component, glue, any other suitable fastener, or combinations thereof. The fastener fastening the side plate 150 to the chassis frame 101 can be sealed using a sealing device, for example a standard silicon rubber o-ring washer for a machine screw, another sealing device or sealant, or combinations thereof.

As shown in FIG. 14, the side plate 150 can include an interface 152 to allow a drive module 130 to transfer mechanical energy out of the chassis 100 to a mobility device 200. The interface 152 can enable a mobility assistance module 140 to transfer mechanical energy out of the chassis 100 to a mobility assistance device 300.

As shown in FIG. 14, the mechanical energy can be transferred from the drive module 130 to the mobility device 200 using a rotatable axle sleeve 153, but may alternatively be an axle. The rotatable axle sleeve 153 can be a rotating sleeve surrounding a seal around an axle 149, allowing the seal to rotate while maintaining a watertight seal around an axle 149. The seal can occlude more than water, including other liquids, gases, dirt, debris, and any other external or internal contaminants. The inside of the rotatable axle sleeve 153 can include a pair of seals 155, 156, for example single lipped o-ring seals, at least one static seal, or combinations thereof. The seals 155, 156, can be made of neoprene, any suitable elastomer or sealing material, or combinations thereof. The space 157 in between the seals 155, 156 can be filled with a lubricant, such as grease, graphite, oil, any other suitable lubricant, or combinations thereof. The watertight seal can retain a lubricant and provide a long service life. The rotatable axle sleeve 153 can be adapted to rotate with a ring gear 139 using at least one pin 154, attached in any suitable fashion, or combinations thereof. The rotatable axle sleeve 153 can include a bearing 158, for example to allow an axle 149 inside the rotatable axle sleeve 153 to rotate freely.

As shown in FIG. 14, the rotatable axle sleeve 153 can be held in position in the side plate with a bearing 160. The rotatable axle sleeve 153 can be sealed using a sealing device 161. The sealing device 161 can be a watertight double lipped o-ring seal, and a lubricant can be applied to the sealing device to provide a long service life. The seal can occlude more than water, including other liquids, gases, dirt, debris, and any other external or internal contaminants. The sealing device 161 can be made of neoprene. The sealing device 161 can be placed on the inside of a flanged divider 162 in the interface 152 of the side plate 150. The bearing 160 can be placed on the outside of the flanged divider 162 of the interface 152 of the side plate 150. The bearing 160 can be fastened in place using a fastener 159, for example a snap ring 159, but any suitable fastener may be used. The bearings 158, 160, can be a sealed ball bearing, for example a rugged sealed stainless steel ball bearing, but may alternatively be a shielded bearing, a ceramic bearing, a chrome plated steel ball bearing, a thrust bearing, a sleeve bearing, a radial bearing, or any other suitable bearing.

As shown in FIGS. 14 and 15 the side plate 150 can include an axle 169, for example a motorized axle or a dead axle, attached to a manually actuated mount 167. The manually actuated mount 167 can enable the rotation of the axle 169 and be held in a fixed position with a pin 168. The pin 168 may be removed and the rotation of the axle 169 may be adjusted manually and locked into at least one specific position with a pin 168, but any suitable number of adjustable positions may be possible. The axle 169 may be actuated by a mobility assistance module 140 or any other suitable driving mechanism. The axles 149, 169 can be keyed on the outer end, for example the key 163 can be hex shaped, square, triangular, splined, other suitable shapes, or combinations thereof. The axles 149, 169 may be splined, keyed, or combinations thereof. The outer ends of the axles 149, 169, outside the keying, can be threaded or adapted to fasten a mobility device 200 and/or a mobility assistance device 300 to the axle 149, 169.

The power supply 110 can provide power to the robotic system 10. The power supply 110 can be the BB2590 military standard battery manufactured by Bren-tronics, but BB4590 military standard battery, nuclear batteries, any other suitable battery, fuel cell, solar panel, power supply, or combinations thereof. The power supply 110 can be removable to allow repair, recharging, refueling, and/or replacement. As shown in FIGS. 12b, 13 and 16, the power supply 110 can be inserted into a second compartment 104 of the chassis frame 101, and connected to the control module 120 using a power supply connector 111, for example via a standard BB2590 connector designed to interface with a single BB2590 standard military battery, but may alternatively interface with a BB4590 standard military battery, a fuel cell, a lithium battery, a rechargeable battery, a nuclear battery, an alkaline battery pack, solar panels, power cables, multiple BB2590 batteries, or any other suitable power source or combination of power sources. The connector 111 can form a watertight connection with the power supply 110, but may also occlude more than water, including other liquids, gases, dirt, debris, and any other external or internal contaminants. The power supply 110 can be a BB2590 military battery and can be inserted into the chassis 100 through a hole in the chassis side plate 150. The power supply 110 can be secured in a second compartment 104 of the chassis frame 101 with a fastener, a door 115 closed with a draw latch 116, a clamp, thumbscrew, or other suitable latch mechanism or fastener, or combinations thereof. A toolless and quick mechanism to enable the quick change of a power supply 110 can be used.

As shown in FIGS. 11 and 19, the control module 120 can be adapted to manage power output from the power supply 110, control the drive module 130, and/or control a mobility assistance module 140, payload modules 170, or any other modules that may be attached to the robotic system 10. As shown in FIG. 18, the control module 120 can include at least one microprocessor 121, and a power module 122. In a further variation the control module 120 can include an operator control module 126, and may include at least one payload control module 128.

The microprocessor 121 can manage and control input and output from the different modules within the control module. The microprocessor 121 can be a (re)programmable microprocessor, an FPGA, an ASIC, a circuit, any other suitable control logic, or combinations thereof. The microprocessor 121 can be programmed with software logic to enable the robotic system 10 to run independent of any human operator, run a pre-configured program (e.g. secure the area, map the area, travel from point A to point B, collaborate with other robots), or any other suitable program. The microprocessor can be connected to a tilt sensor or tilt switch to detect if the robotic system 10 is inverted, and if the robotic system 10 is inverted, the microprocessor 121 may then execute a control program to flip the robotic system 10 to a non-inverted position and allow the robotic system 10 to resume normal operations.

The power module 122 can monitor the output of the power supply 110, and reset or regulate the power supply 110 when the output is either above or below a desired threshold. The power supply 110 can be a BB2590 battery. The BB2590 battery can be a multi-purpose military battery, and can have protection logic and/or circuitry that turns off the battery when a current output specification is exceeded. The control module 120 can enable a power supply 110, for example a BB2590 military battery, to continue providing normal currents after the high current protection has been triggered, enabling such a power supply to be used for applications using high currents (even momentarily), such as driving an electric motor, or when a vehicle or device using an electric motor becomes jammed, dropped or otherwise stressed. The BB2590 battery can be reset by dropping the current draw to below approximately 2 milliamps, and the BB2590 will again output current.

As shown in FIG. 21, the power module 122 can include a connection to the power supply 110, a delay circuit 92, a voltage monitor 93, a enable switch 94, and a current throughput switch 95. The power module 122 can have one cell protection circuit 91, and a charging circuit 96.

As shown in FIG. 21, the power supply 110 is shown as two batteries to each represent the two groups of four cells of the standard BB2590 battery. The cell protection circuit 91 can prevent the group of cells with the highest voltage from charging the group of cells with the lowest voltage, which could trigger the protection circuitry of the BB2590 battery. The cell protection circuit 91 can be at least one diode, for example one diode per group of four cells, but may be any suitable circuit.

A delay circuit 92 functions to reduce and or turn off the current draw for a period of time, which enables a BB2590 to reset. The delay circuit 92 can be controlled by a voltage monitor 93, which functions to monitor the voltage output from the power supply 110 and trigger a delay in the delay circuit 92 (for example, while a capacitor in the delay circuit 92 charges) to reset the power supply 110 when the power supply output drops below (or alternatively spikes above) a threshold. The delay circuit 92 can discharge (the charge from the capacitor) quickly and charge slowly, and can provide most of the delay while a capacitor charges. The power supply 110 can reset sometime after a capacitor in the delay circuit 92 has started recharging. The voltage monitor 93 can include a voltage divider, which can control an N-channel mosfet controlling a P-channel mosfet. As shown in FIG. 11, the P-channel mosfet of the voltage monitor 93 can output Vcontrol, which can power the control module 120 and may provide the voltage Vcontrol for the charging circuit 96. When the delay block is lowering the voltage across the voltage divider, the N-channel mosfet in the voltage monitor 93 turns off the P-channel mosfet, cutting off power to Vcontrol which can send a power off signal to a enable switch 94, cut off power to the control module 120, and may cut off power to the charging circuit 96, or combinations thereof. For a hard reset, the power to Vcontrol and Vout can both be reset and/or cycled simultaneously.

The enable switch 94 can be an N-channel mosfet, a P-channel mosfet, any other suitable switch, or combinations thereof. The enable switch 94 can be connected to an N-channel mosfet of a current throughput switch 95. An N-channel mosfet of the current throughput switch 95 can control at least one P-channel mosfet, for example two P-channel mosfets as shown in FIG. 21. Two P-channel mosfets, one per cell of a BB2590 battery, can be more power efficient than a single P-Channel mosfet, however, any suitable configuration of N-channel and P-channel mosfets, or any other switching mechanism and/or circuit may be used. The current throughput switch 95 can include a diode, or two diodes, for example one diode connected to each P-channel mosfet. The diodes in the current throughput switch can be high-powered schotkey diodes rated for 80-100 Amps, but can be any suitable diode. The current throughput switch 95 can include an enable signal, Vout_enable, connected to a pin of the microprocessor 121 the control board 120, enabling the microprocessor 121 to control the output of the N-channel and P-Channel mosfets and thus turn the voltage Vout on and off using an enable signal The power module 122 can include a charging circuit 96. The charging circuit 96 can include a P-channel mosfet controlled by an N-channel mosfet. Any suitable combination of N-Channel and P-channel mosfets, or any other suitable switching device may be used. The charging circuit 96 can be controlled by an enable signal, Vcharge_enable, can be connected to a pin on the microprocessor 121 on the control board 120. When the charging circuit 96 is enabled, the P-channel mosfet can allow current to flow through the resistor and the diode of the current throughput circuit 95, for example, to charge any capacitors connected to Vout, such as the capacitors of a motor controller, or an air compressor. However, capacitors connected to Vout can be charged without the charging circuit 96; the charging circuit 96 can function to limit the max current that the capacitors can draw from the power supply 110, otherwise each time the capacitors are charged, the protection circuitry of the power supply 110 (for example a BB2590 battery) may be triggered.

The power module 122 can operate as follows. The BB2590 is either inoperable, replaced, or has exceeded an output limit, is not outputting power and requires a low current draw below 2 milliamps to be reset. The voltage Vbat_low_current is low and the delay circuit 92 turns off the enable switch 94 and can turn off Vcontrol, power to the control board 120. The current throughput switch 95 and the charging circuit 96 can be not powered while the BB2590 battery is reset. Once the BB2590 battery has been reset, the delay circuit 92 is no longer providing a delay as the capacitor is recharging or has been recharged, and the voltage monitor 93 provides power to the control module 120, and disables the enable switch 94. The microprocessor 121 of the control module 120 then can enable the charging circuit 96 to charge any capacitors connected to Vout (e.g. motor controller applications require large electrolytic capacitors), but this may not be necessary if the application does not require capacitor charging. The microprocessor 121 of the control module 120 can disable the charging circuit 96 after an appropriate amount of charging time, and enable the current throughput switch 95, enabling high current flow to Vout. The entire process takes approximately 0.33 seconds, and a fast reset is potentially unnoticeable to the operation of the robotic system 10, and not substantially affect the operation of the robotic system 10 or the user experience.

The power module 122 may include a charge storage unit, which can function to maintain power to the power module 122 and/or the microprocessor 121 if the power supply 110 is not supplying power. The charge storage unit may power the entire control module 120 while the power supply 110 is not supplying power. The charge storage unit can be at least one capacitor, at least one battery, an alternative power supply, any other suitable source of power, or combinations thereof.

As shown in FIGS. 19 and 20, the operator control module 126 can receive user input to control the robotic system 10. The operator control module 126 can include a remote operator control module 125, and may include at least one payload control module 128.

The operator control module 126 may enable the selection of a pre-configured control program (e.g. secure the area, map the area, travel from point A to point B, collaborate with other robots), which may or may not require additional user input, or any other suitable program. The operator control module may include a switch to select between multiple programs. The switch may be a keypad, a selector dial, a firmware reprogramming, a sequence of button pressings, any other suitable device or method of selecting a program, or combinations thereof.

The operator control module 126 can be connected to a remote user control module 125, for example the operator control module 126 can be connected to at least one remote user control module 125 using at least one wireless link. The control circuitry may be distributed in any fashion across the remote user control module 125 and the operator control module 126. For example, the control circuits (e.g., microprocessors) can be on the operator control module 126, the robotic system 10, a payload attached to the robotic system 10, or combinations thereof. The processing can be split in any combination between the operator control module 126, the robotic system 10, a payload attached to the robotic system 10. For example, any of the operator control module 126, the robotic system 10, and a payload attached to the robotic system 10 can perform all, some or none of the processing required by the operator control module 126, the robotic system 10, and a payload attached to the robotic system 10.

The operator control module 125 can be adapted to receive user input using at least one user input device 124. The user input device 124 can be a directional joystick, but may additionally or alternatively include directional pads, trackballs, buttons, microphones (e.g., receiving input control signals via voice), mobile phone keypads, computer keyboards, a computer mouse, a touchpad, any other suitable input device, or combinations thereof. The operator control module 125 can process user input with a microcontroller, for example a programmable interface controller (PIC), a simple input processing circuit, such as a button debouncing circuit, or combinations thereof. The control signals can be transmitted from the remote operator control module 125 to the operator control module 126 on the control board 120 of the robotic system 10 using a transceiver. The transceiver can include an FM transmitter, for example transmitting at approximately 440-480 MHz, but any suitable transmitter and/or transmission carrier frequency may be used, including a digital transmission link, a wireless networking link, IEEE 1394 link, USB 1.0 2.0 3.0 link, any other suitable link, or combinations thereof. The transmitter can be connected to an antenna 123 tuned to the transmission carrier frequencies of approximately 440-480 MHz. The operator control module 126 can include a transceiver, for example having an FM receiver, and an antenna, connected to an antenna port 127 (shown in FIG. 12*b*). The control data can flow from the remote operator control unit 125 to the operator control module 126, and/or flow from the operator control module 126 to the remote operator control unit 125.

The remote operator control module 125 can be powered by a NiMH rechargeable battery, an AC adapter, a cigarette lighter adapter, a BB2590 battery, a solar cell, any other suitable power supply, or combinations thereof. The rechargeable battery can be recharged through a power port 117, which may charge the battery from an AC adapter, a cigarette lighter adapter, a BB2590 battery, a solar cell, any other suitable power supply, or combinations thereof.

The casing of the remote operator control module 125 can protect the components inside. The casing can be made of ABS (or another low moisture absorption polymer), aluminum, titanium, nylon, other metals or polymers, wood, carbon fiber, any other suitable material, or combinations thereof. The case can be sized such that the entire remote operator control module 125 will fit into a pair of standard military issued cargo pants (with the antennas removed—the antennas can be quickly detachable for storage). For example, the case can be about 280 mm by about 160 mm. The remote operator control module 125 can be small enough (e.g., about 300 mm by about 150 mm) that a user may control the robotic system 10 with one hand, for example enabling a soldier or a rescue worker to hold tools, weapons, or emergency supplies in their other hand.

As shown in FIGS. 12*b* and 13, a payload module 170 can include an interface 175 to the control module 120, to enable the control module 120 and/or the operator control unit 126 of the control module 120 to control the devices in the payload module 170. As shown in FIGS. 19, 20, 24 and 25, the operator control module 126 can include at least one payload control module 128 which can control and transmit data to and/or from any payload modules 170 attached to any payload interfaces 171, 172, 173. The payload control circuitry may be distributed in any fashion across the remote user control module 125, the payload control module 128, and the operator control module 126.

The payload could have one of more processors, or no processors. The circuitry for an external payload could either be in that payload, or in the compartments. All of the circuitry of the payload control module 128 could be contained within the robotic system 2. All of the circuitry of the payload control module 128 could be in the payload 170, or the robot system 10 could include a separate microprocessor 121 and the payload 170 could include a separate microprocessor and the two processors can be configured to communicate data and control signals with each other. A separate antenna could enable a microprocessor within a payload to communicate directly with an operator control module 126 or a remote operator control module 125. All of the processing can be handled by microprocessors on the robotic system 10, on processors on the remote control 125, on processors on a module/payload added to the robotic system 10, or the processing can be split up and handled between any of those locations in any amount.

A video payload 190 can enable a remote user to view visual information on the remote operator control module 125. The video payload 190 can have a camera 192 that can detect visible light, infrared (IR) radiation, ultraviolet (UV) radiation, or combinations thereof. The visual information can be anything within the visible, and/or IR and/or UV range of the camera 192 of the video payload 190 in the robotic system 10, status information from the robotic system 10, including video feeds, audio feeds, position, remaining battery life, system temperature, or any other suitable information, or combinations thereof. The remote operator control module 125 can include an antenna 196, a video receiver 197, and display interface 199 for displaying data received from a video payload 190. The payload control module 128 can include an antenna 195 connected to an antenna port 129 (shown in FIGS. 12*b* and 13) connected to a video transmitter 194. The payload control module 128 can include conditioning circuitry 193 for the camera 192.

An audio payload 180 can enable a remote user to communicate with two-way audio communication from the remote operator control module 125 to anyone or anything within audible range of the audio payload 180 of robotic system 10. The remote operator control module 125 can include a microphone 188 and speaker 189 for capturing audio to send to an audio payload 180 and playing back audio received from an audio payload 180. The remote operator control module 125 can include an audio transceiver 186 and an antenna 179. The payload control module 128 can include and antenna 187, an audio transceiver 185, conditioning circuitry 183, a microphone 181, and speaker 183.

As shown in FIGS. 12*b* and 13 the robotic system can include at least one payload interface 171, 172, and 173. A payload interface 171, 172, 173 can be attached to the chassis frame 101, and/or the side plate 150 of the chassis 100. The payload interfaces 171, 172, 173 can function as accessibility panels for service, maintenance, and inspection. When the payload interfaces 171, 172, 173 are not in use or are in use; they can be covered with, respectively, the first, second and third interface covers 74, 76 and 176. The interface covers 74, 76 and 176 can be made of aluminum sheet metal, a polymer with low moisture absorption properties such as ABS a clear material such as polycarbonate or combinations thereof. A cover 74, 76 or 176 and/or a payload 170 can be attached to a payload interface 171, 172, 173 using machine screws, or any suitable fastener. The space between the cover 74, 76 and 176 and/or a payload 170 and payload interfaces 171, 172, 173 can be sealed using a sealing device 177. Except for the size and shape, the sealing device 177 can be identical to the sealing device 151 as described above. The payload interfaces 171, 172, 173 may include connections 174 to the controller module 120.

A payload module may include any suitable device attached to the chassis 100. As shown in FIGS. 12*b* and 13, a primitive payload is a flat, "pickup truck style" cargo bed 170, for example including a carrying handle 178. One or more carrying handles 178 may be located on the bottom, side, or top of the chassis frame 100. The carrying handles 178 can act as a roll bar. Supplies, tools, documents other suitable item to be placed in the robotic system 10 for transport, or combinations thereof can be placed in and/or secured to the cargo bed payload 170.

As shown in FIGS. 12b, 13, 20 and 24, the payload interface 172 can house an audio payload 180. The audio payload 180 can be slid in from the top and fastened to the body frame. The audio payload 180 can be viewed in diagrams 5a, 8, and 10a. There is a noticeable speaker grill, round microphone hole, and antenna mount. The speaker is recessed in the frame.]. The audio payload 180 can transmit and/or receive audio. The audio payload 180 can include at least one microphone 181, 188, at least one speaker 182, 189 conditioning circuitry 183, and an audio transmission link 184.

The microphone 181, 188 functions as a transducer to convert audio signals into electronic signals. The microphone 181, 188 can be an electric microphone, laser microphone (e.g., for sound vibrations from smoke or fog in the air), a piezoelectric microphone, gel microphone, diaphragm microphone, a vibration detection microphone (e.g., a diaphragm microphone, a stethoscope, a gel/liquid sensor microphone (e.g., placed on the trachea to detect vocal vibrations) which can be touched to a metal or concrete surface, such as stairways, rails, or roads and detect vibrations and/or sounds), a parabolic microphone, a shotgun microphone, any other suitable microphone, or combinations thereof. The microphones 181 may be the same or a different type of microphone than the microphone 188. The microphone 181, 188 can be waterproof.

The speaker 182, 189 can function as a transducer to output audio signals received from the audio transmission link. The speaker 182, 189 can be sealed and waterproof. The speaker 182, 189 may be replaced or bypassed with a headphone jack to output to headphones, audio recording, other suitable audio output, or combinations thereof.

The conditioning circuitry 183 can function to amplify and/or filter the audio signals. The signal received from the microphone 181 can be amplified before being transmitted by the audio transmission link 184. The signal output to the speaker 182, 189 can be passed through a pre-amplifier, and then a speaker amplifier before being output by the speaker 182, 189. The conditioning circuitry 183 can be integrated into the audio payload module 180. The conditioning circuitry 183 may be integrated in the operator control unit 126, and/or in the control module 120.

The audio transmission link 184 can transmit the audio signal received from the microphone 181 to an operator control unit 126, and transmit audio received from a microphone at the operator control unit 126 to the speaker 182 in the audio payload module 180. The audio transmission link 184 can be a wireless transmission link, a wired transmission link, any other suitable transmission link, or combinations thereof. The audio transmission link 184 can be an analog FM transmission link, a digital transmission link, wireless networking link, IEEE 1394 link, USB 1.0 2.0 3.0 link, any other suitable link, or combinations thereof. The audio, transmission link 184 can include at least one audio transmitter and one audio receiver, for example two audio transceivers 185, 186, and antennas 187. The audio transmission link 184 can be integrated in the audio payload module 180 of the robotic system, integrated in the control module 120, or combinations thereof. The antenna 187 can be mounted on the audio payload module 180 The antenna 187 can be attached to a control module antenna port 127, 129. The audio transmission link 184 is not present, and the audio is recorded for later retrieval and playback.

The audio transceiver 185, 186 can transmit the audio data using approximately a 433 MHz carrier frequency. The antennas 187 can be rugged and coated in rubber. The antennas 187 can be optimized to transmit and receive data on an approximately 433 MHz carrier, and/or transmit and receive data in any suitable frequency range.

The data transmissions between the audio payload 180 and the user controller 125 may interfere with the transmission of control signals between the user controller 125 and the control module 120 due to the near overlap of carrier frequency ranges for control data and audio data. The control data may be considered to be of higher importance than the audio data transmitted between the remote user controller 125 and the audio payload 180, but alternatively the audio data may be of higher importance (for example on a surveillance mission, where the robot system is primarily stationary and listening). To avoid interference, a time division multiplexing scheme can be used, the simplest example being a half duplex communication mode; for example, the robotic system can turn off the audio data transmission partially or completely while the robot system 10 is receiving control data and/or in motion, thus removing any possibility of interference between the audio data transmission and the control signals for the robot system. Alternatively, the control data may be partially or completely disabled while the audio data transmissions are performed. Additional multiplexing schemes may be used to prevent or reduce interference between control signal transmissions, audio data transmissions, video data transmissions, other payload data transmissions, and other (possibly external) sources of interference.

Figure 26:
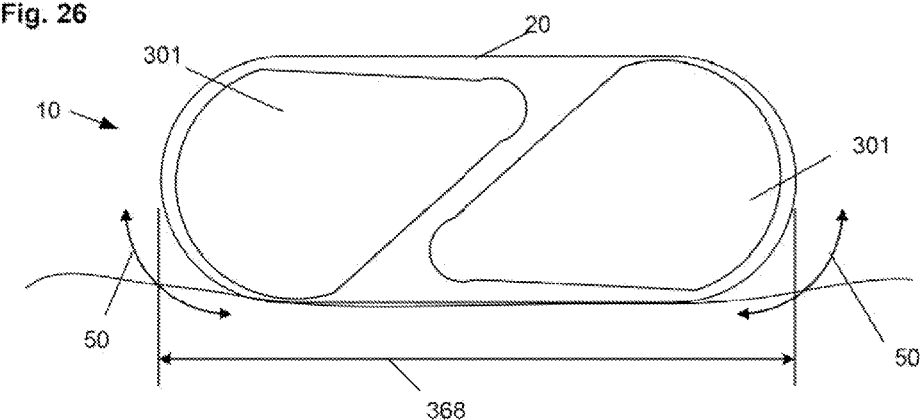

As shown in FIGS. 13 and 26, the payload interface 171 can house a video payload module 190 that can include a camera 192, a lighting system 191, conditioning circuitry 193, a video transmission link 198, and a display 199. The payload interface 171 can be protected with a clear Polycarbonate panel cover 176, and sealed with a sealing device 177 to seal the payload interface 171 and make the payload interface 171 waterproof and/or dustproof, while simultaneously allowing a video payload to capture video. The payload interface 171 may be uncovered, shuttered, covered with mesh, or any other suitable protection.

The lighting 191 of the video payload module 190 can be both visible and infrared light, for example visible and infrared Light Emitting Diodes (LEDs), any suitable LEDs, any incandescent, fluorescent, phosphorescent (glow in the dark), chemical, combustion, laser, or other light source, or combinations thereof. The lighting 191 can be controlled via the microprocessor 121 of the control module 120, controlled by an additional microprocessor, or combinations thereof. The microprocessor 121 of the control module 120 can generates on, off, or variable dimming level signals for the lighting system 191. The control signals for the lighting 191 may be transmitted from the operator control unit 126 to the microprocessor 121. The lighting 191 may be automatically turned on and off by the microprocessor 121 in response to ambient light levels detected by an ambient light sensor.

The camera 192 can capture image data. The camera 192 can be one, two or more cameras, for example an analog video camera capable of detecting both infrared and visible light, a digital video camera, a still camera, a film camera, a forward looking infrared (FLIR) camera, any other suitable camera, or combinations thereof. The camera 192 can be adapted to feed a video signal into conditioning circuitry 193.

The conditioning circuitry 193 can provide signal processing and/or signal switching, and/or filtering to the video signal. The conditioning circuitry 193 can include video feed switching and/or video feed overlay functionality, for example the conditioning circuitry 193 can have a video feed overlay chip that can be configured to switch and/or overlay video feed. The video feed overlay functions to combine display text and/or images in an overlay in the video feed signal, for example identifying the camera view, identifying the video feed, displaying battery life, sensor output data, positioning data, or any other suitable application. The conditioning circuitry 193 can include a video feed switch, which can be controlled by the microprocessor 121 of the main control module 120. The conditioning circuitry 193 may include filtering or amplifying circuitry to improve the quality of the video feed. The conditioning circuitry 193 can be integrated in the payload module, but may alternatively be integrated in the operator control unit 126, or anywhere in the control module 120.

The video transmission link 198 can transmit the video signal to an operator control unit 126. The video transmission link 198 can be a wireless transmission link, a wired transmission link, other suitable transmission link, or combinations thereof. The video transmission link 198 can include a video transmitter 194, antennas 195 196, and a video receiver 197. The video transmission link 198 can be integrated in the control module 120 of the robotic system, and can be integrated in the payload module 190. The video transmission link 198 can be an analog FM transmission link, a digital transmission link, wireless networking link, IEEE 1394 link, USB 1.0 2.0 3.0 link, other suitable link, or combinations thereof.

The video feed may be recorded and/or transmitted via a video transmission link. The video transmitter 194 can convert a video signal into a communications signal and transmit the communications signal to a video receiver 197 using an antenna 195. The video receiver 197 can receive a communications signal from the video transmitter 194 via an antenna 196, and convert the communications signal into a video feed and output the video feed to a display 199.

The antennas 195, 196 can be adapted to receive signals in the 900-1100 MHz range. The antennas 195, 196 can be coated with rubber and ruggedized. The antennas can be rubber duck antennas. The antennas can be shear resistant. The antennas can be joined to the body 20 at a hinged or otherwise articulatable mount. The antenna 195 for the video transmitter 194 can be connected to one of the antenna ports 127, 129 as shown in FIGS. 12*b* and 13.

The display 199 can display the video feed from the camera 192 and any overlaid information that may be included in the video feed from the conditioning circuitry 193. The display can be an LCD screen, an LED screen, an OLED screen, a TFT screen, other suitable screen, or combinations thereof.

The transmission frequencies of the video data, audio data, and control data can be approximately 900-1100 MHz, 433 MHZ, and 480 MHz, respectively. These ranges for the three separate data channels can minimize or prevent interference. The video signal can be transmitted at a high enough frequency to sustain a high data rate and avoid any interference with the audio and control signals. In certain operating conditions, the control data and the audio data may interfere with each other. The control module 120 can turn off the audio payload 180 while control signals can be received in the user control module 126.

Additional payload modules may include any number of sensors, input and/or output devices, tools, equipment and/or supplies, including still cameras, film based cameras, forward looking infrared cameras, boom cameras, fisheye cameras, pan-tilt-zoom camera systems, light intensity sensors, electromagnetic radiation sensors, sound recorders, laser range finders, navigation systems, Global Positioning System (GPS) sensors, depth sensors, pressure sensors, radiation sensors, chemical sensors, pathological sensors, biological sensors, fire extinguishers, chemical decontamination systems, medical equipment, medical supplies, food supplies, water supplies, construction supplies, defibrillators, lethal and non-lethal weapons or munitions, tasers, explosive disruptors, robotic arms, equipment carriers, equipment actuators, a precision turret system, a robotic hook, an actuated poker, a pressurized blower, compressed gas (e.g., air, carbon dioxide, nitrogen), a blower fan, a vacuum device, additional batteries, biometric devices any other suitable device, or combinations thereof. NOTE: more payloads: marsupial, marsupial water vessels, UGV's or UAV's, toys, construction equipment, farming equipment, high voltage repair equipment, personal assistance devices, 3-dimension camera, information transmission systems (e.g., RF modules with additional antennas), disruptors such as signal jammers or shape charges, x-ray systems, manipulator arm, 360-degree camera, offloaded processors for data processing (e.g., to supplement the processor(s) on board the such as video processing and/or used for tiered processing, data storage such as hard drives or flash memory, or combinations thereof.

As shown in FIGS. 11, 14 and 22, the drive module 130 functions to provide mechanical energy to the mobility device 200. The drive module 130 can be mechanically linked to the mobility device 200, for example the drive module can be linked to the mobility device 200 using a pinion 131 adapted to rotate a ring gear 155, and the ring gear 155 can be adapted to rotate a rotatable axle sleeve 153 connected to a mobility device 200. As shown in FIG. 22, the drive module 130 can include at least one gearbox 132, at least one motor 134, and at least one motor controller 136. As shown in FIG. 22, the drive module 130 can include a cooling device 138. The drive module 130 can be located near the center of the chassis frame 101, for example in an inner wall of a chassis frame compartment 103, which improves stability. The chassis 101 can be made of a heat absorbing material, such as a metal, the drive module 130 can be in contact or close proximity with a wall of the chassis frame 101, which can allow the chassis frame 101 to provide passive cooling functionality, functioning as a heat sink and transferring heat away from the drive module 130. Additional passive cooling may be integrated into the drive module mount, either on the drive module 130 or in the chassis frame 101.

The motor controller 136 functions to provide power and control signals to the motor 134. The motor controller 136 can be adapted to receive power from a power supply 110 and control signals from a control module 120. In an alternative variation, the motor controller 136 may also be adapted to control a cooling system 138. The motor controller 136 can be a brushless motor controller, for example a brushless motor controller with a digital control interface, an open loop (or non-feedback) motor controller or combinations thereof.

The motor 134 functions to provide mechanical power to the gearbox 132. The motor 134 can be adapted to receive control signals and power from the motor controller 136. The motor 134 can be an electric motor; a fuel powered engine, or any other suitable type of motor 134, or combinations thereof. The motor 134 can be a brushless motor, for example a brushless motor with Hall effect sensors, an open loop controlled motor, a brushless motor, any other suitable motor or combinations thereof. The Hall effect sensors can provide good low speed control and are more energy efficient, the open loop mode (without using hall effect sensors) requires more power.

The gearbox 132 can adapt the mechanical output of the motor 134 to a higher or lower output for the mobility device 200. The gearbox 132 can be an interchangeable gearbox, and may be adjusted for different mobility devices (e.g. different sized wheels), different power/torque requirements, or any other suitable application. The gearbox 132 can be connected to a pinion 131 adapted to rotate other gears connected to a mobility device 200, and/or be connected to a mobility device 200 directly.

The drive module 130 can include a cooling device 138. The cooling device 138 can regulate the temperature of the components in the drive module 130, and may also function to regulate the temperature of other components within the chassis 100. The cooling device 138 can be a cooling fan, for example an electric cooling fan, a heatsink, a water-cooling system, a refrigeration system, any other suitable cooling device, or combinations thereof. At least one cooling fan can be mounted on the motor, such that the airflow generated can flow over and around the motor to regulate the temperature and provide targeted cooling. Fans may also provide general system cooling, and/or cooling to other elements in the chassis 100.

A mobility assistance module 140 can transfer mechanical energy to a mobility assistance device 300. As shown in FIG. 23, the mobility assistance module 140 can include a motor controller 146, a motor 144, a safety coupling 143, a gearbox 142, or combinations thereof.

Except as noted herein, the motor controller 146, the motor 144 and the gearbox 142 can be identical to the motor controller 136, the motor 134, and the gearbox 132 of the drive module 130. The gearbox 142 can be attached to a pinion 141, and the pinion 141 is adapted to rotate a ring gear 142 adapted to rotate an axle 149.

The safety coupling 143, functions to decouple the axle shaft 149 from the actuation of the motor 144 in the event of an impact or shock to the mobility assistance device 300. As shown in FIGS. 17 and 18, the mobility assistance device 300 can be a flipper 301, and the flipper 301 may be popped, as shown by arrow 400 in FIG. 28, for example with a torque from about 15 Nm (11 lb.-ft.) to about 145 Nm (107 lb.-ft.), more narrowly from about 45 Nm (33 lb.-ft.) to about 125 Nm (92.2 lb.-ft.), for example about 100 Nm (74 lb.-ft.) or about 45 Nm (33 lb.-ft.) of torque at the axis of rotation. The flipper 301 can be popped, slammed, or hit against a hard surface or object in order to cause the safety coupling to decouple and allow the flippers to be folded into a compact configuration for storage. The safety coupling 143 can be a ball detent, a torque limiter, an override coupling, any other suitable mechanism that can be decoupled, or combinations thereof. The safety coupling 143 can include an automatic-re-engage functionality, an actuated and/or manual re-engage function, which may use a solenoid or other suitable actuator to re-engage the safety coupling 143, or combinations thereof.

The device can have a clutch, or no clutch, in mechanical communication between the engine and the axles 149 and/or 169. A continuous amount of force can be required to fold the flipper into a storage configuration (e.g., with a clutch), or a single sharp impact can cause a release of the axle 149 from the actuation of the motor 144 (e.g., with a safety coupling). The manually actuated and electronically actuated mobility assistance devices can disconnect the mobility device to go from a ready position to a stowed position, using a mechanical release (such as a pin or a ball detent, brake or clutch, tensioner). This can remove the need for position feedback and autonomous rotation to a stowed position. The release can be electronically activated. The release may be activated by motion, impact, impulse, the press of a button, pulling a lever, actuation by a motor, or any combination thereof. The sensitivity of the activations can be adjusted, as can the number of activations needed to release.

As shown in FIG. 11, the mobility device 200 can enable the robotic system 10 to move in the environment, which may include land, air, water, underground, underwater, outer space, asteroids, comets, other planets, other galaxies and moons. As shown in FIGS. 15 and 16, the mobility device 200 can be a track 210 driven by at least one track drive pulley 220 and guided by at least one track guide 230. The mobility device 200 may be a set of wheels, skis, skates, propellers, wings, sails, blades, balloons, floats, paddles, oars, flippers, corkscrews, winches, pressure tanks, rockets, a hover system, the tracks described above, any other suitable mobility device, or combinations thereof.

As shown in FIGS. 15 and 16, the mobility device 200 can include two track drive pulleys 220, 221 and at least one-track guide 230 for each track 210. The robotic system 10 can include two mobility devices 200, for example two tracks 210, one on each side of the chassis 100, or a single track 210, or any other suitable number of tracks 210. The mobility device 200 can include a drive pulley track cap 240.

The track 210 can link together the motion of the track drive pulleys 220, 221. The track may provide great mobility over a wide variety of terrains. The tracks can be replaced with wheels alone. The track 210 can be made of a polymer, for example a Thermo Plastic Urethane (TPU), other suitable polymers, elastomers, metal mesh, carbon fiber based materials, metal links, metal-banded rubber, leather, any other suitable material, or combinations thereof.

The track 210 can be manufactured using at least one fixed length of injection molded track and then bonding the ends of at least one length together using a solvent, to create a continuous track 210 at a low cost. Any alternative suitable solvent may be used for bonding polymer track bands or any other polymer suitable for manufacturing track bands. Bonding the track bands may include using glue, a fastener such as a staple, rivet, or snap, or using a thermal process to melt the ends of at least one band together. The track 210 also be molded as a single piece of continuous connected track.

As shown in FIGS. 15 and 16, the outside of the track band 210 can include outside nubs 211, 212. The outside nubs 211 and 212 can improve traction on a variety of surfaces, for example when climbing over obstacles. The outside nubs 211, 212 can be substantially the width of the track, arranged perpendicular to motion vector of the track 210. The outside nubs can be any suitable width, and arranged in any suitable track pattern. The outside nubs 211, 212 can be uniformly or non-uniformly spaced on the track band 210.

The track 210 may be modified or adapted for special purposes instead of the regularly spaced outside nubs. The track 210 can have application-enhancing elements such as suction cups for climbing walls, spikes to improve traction on ice, or any other suitable modification or addition to the track 210 for any other suitable purpose, or combinations thereof.

As shown in FIGS. 15 and 18, the inside of the track 210 can include inside nubs 216, 217, 218 that can keep the track 210 aligned on the track drive pulleys 220, 221 and the track guide 230. The outside edge of the inside nubs 216, 217, 218 can be rounded from the outer edge of the track 210 toward the inside of the track 210. The outside edge of the inside nubs 216, 217, 218 can be squares, triangles, cylinders, or any other suitable shape. The inside nubs 216, 217, 218 can be uniformly spaced around the inside edge of the track 210, can be spaced in any suitable fashion. As shown in FIG. 17, the inside nubs 216, 217, 218 can be spaced a fixed distance from the outer edge of the track 210 along an axis perpendicular to the motion vector of the track 210. The spacing between inside nubs 216, 217, 218 along an axis perpendicular to the motion vector of the track 210 can be the width of the track drive pulley 220, and the track guide 230. The inside of the track 210 can include a depression 213. The depression 213 can increase the grip of ridges 214 on a track drive pulley 220. The insides of the track 210 can have a smooth area 215, for example having no depressions 213. The inside of the tracks can be entirely smooth, have repeated depressions along the entire length, or combinations thereof The track drive pulley 220 can turn the track 210. At least one track drive pulley 220 on the track 210 can be adapted to be actuated by a rotatable axle sleeve 153 through a hole in the side plate 150 of the chassis 100 connected to the drive module 130 either directly or through a series of gears inside the chassis 100. The track drive pulley can have nubs which can interface with divots on the inside of the track. The track drive pulley can be configured to grab the track and/or keep the track aligned on the track drive pulleys.

As shown in FIG. 15, the pins 154 can be used to mechanically link or fix the rotatable axle sleeve 153 and the track drive pulley 220, 221, but other interfaces, techniques or parts may be used to mechanically link the rotatable axle sleeve 153 and the track drive pulley 220, 221. For example, glue, fastener, clips, or combinations thereof can be used to link the rotatable axle sleeve 153 and the track drive pulley 220, 221.

The track drive pulley 220 can be assembled from two components, an inner wheel hub 222, 223, and an outer wheel 224, 225. The track drive pulley 220 may be manufactured as a single, integrated component, or assembled from any number of components. The inner wheel hub 222, 223 can be made of nylon, other polymers, metal, carbon fiber, concrete, cardboard, wood, any other suitable material, or combinations thereof. The outer wheel 224, 225 can be made from TPU, Santoprene, any other suitable polymer, elastomer, or elastomer/polymer blend, metal, any other suitable material, or combinations thereof. The inner wheel hub 222, 223 can be manufactured using a molding process, machined, cast, extruded, stamped, any other suitable method of manufacture, or combinations thereof. The outer wheel 224, 225 can be manufactured using an injection molding process, machined, cast, extruded, stamped, any other suitable method of manufacture, or combinations thereof.

Torquing a softer polymer with an axle made of a harder material, such as a metal, may tear the polymer at higher torque levels. The combination of a metal rotatable axle sleeve 153 (or a metal axle 149) adapted to rotate a rigid polymer inner wheel hub 222, 223 attached to a polymer (e.g., a polymer softer than the rigid polymer inner wheel hub) outer wheel hub 224, 225, can enable a high torque mechanical output to be distributed to a softer polymer outer wheel with shock and/or impact absorption, and improve durability at the interface between the metal and polymer. For example, the modulus of elasticity of the inner wheel hubs 222 and 223 can be about 280,000 to 420,000. The modulus of elasticity of the outer wheel hubs 224 and 225 can be about 8,000 to 20,000. The modulus of elasticity of the axles 149, 169 can be about 800,000 to 8,000,000. The ratio of the modulus of elasticity of the inner wheel hub 222 and 223 to the axle 149, 169 can be from about 0.5 to about 100, more narrowly from about 1 to about 29, yet more narrowly from about 1.9 to about 11, for example about 10. The ratio of the modulus of elasticity of the outer wheel hub 224 and 225 to the inner wheel hub 222 and 223 can be from about 0.5 to about 100, more narrowly from about 1 to about 50, yet more narrowly from about 1.9 to about 11, for example about 10. The surface area of contact between the axle and the inner wheel hubs 222 and 223 can be greater than or less than the surface area of contact between the inner wheel hubs 222 and 223 and the outer wheel hubs 224 and 225.

The inner wheel hub 222, 223 can be assembled from two components fastened together. The components of the inner wheel hub 222, 223 can be wheel hub plates 222, 223 fastened together with self tapping screws, nuts and bolts, interlocking snaps, rivets, glue, any other suitable fastener, or combinations thereof. As shown in FIGS. 17 and 18, the wheel hub plates 222, 223 can be fastened together in such a manner that they interlock (forming an interlocking hub) around a portion of the outer wheel 224, 225, such that the inner wheel 222, 223, and the outer wheel 224, 225 can rotate together.

As shown in FIGS. 15 and 18, in a variation of the invention, one of the wheel hub plates 223 can include a keyed interface, for example a hex-shaped keyed interface, adapted to rotate a shaft connected to a mobility assistance device 300. The other inner wheel hub plate 222 can include a bearing to interface between an axle 149 and the inside of the track drive pulley 220, The inner wheel hub plate 222 can include an interface 226 for the rotating axle sleeve 153. The inner wheel hub plate can be connected to the rotating axle sleeve 153 using pins 154, a connection to an axle 149, any other suitable actuator, or combinations thereof. The inner wheel hub plate 222 can include a ball bearing 219 located between the center of the inner wheel hub plate 222 and the axle 149.

As shown in FIGS. 5-6, the outer wheel 224, 225 can include at least one tier of supporting members arranged radially or substantially radially, from the inner wheel hub 222, 223 to the outer rim of the outer wheel 224, 225. The outer wheel 224, 225 can include 2 tiers of supporting members arranged radially, where the first tier of supporting members 222 connects the inner wheel hub 222, 223 to an intermediate rim, and the second tier of supporting members connects the intermediate rim with the outer rim of the outer wheel 224, 225. The supporting members can be spaced evenly around the outer wheel 224, 225, or be spaced unevenly or in any suitable fashion. The supporting members can be of the same or substantially similar thickness to the outer rim of the outer wheel 224, 225, and/or any suitable thickness. Each outer wheel 224, 225 can have one, two, three or more tiers of supporting members 221, 222. The supporting members (e.g., two or three) can reduce the weight, material and cost of the outer wheel 224, 225 of the track drive pulley 220, 221 and increase flexibility and shock absorption, while creating larger spaces within the outer wheel 224, 225 to improve the tolerance of the track drive pulley 220, 221 to foreign objects such as rocks, grass, twigs, which may get caught in the spaces between the supporting members of the outer wheel 224, 225, and improve the ability of the track drive pulley 220, 221 to flex if a foreign object (e.g., a pebble and/or a twig) is introduced in between the outer wheel 224, 225 of a track drive pulley 220, 221 and the track 210. When a foreign object is caught between the track 210 and the track drive pulley 220, 221, the pressure from both the outer wheel 224, 225 of the track drive pulley 220, 221 flexing and the track 210 flexing and pressing on the foreign object between the track 210 and the outer wheel 224, 225 can be large enough to, squeeze and throw the foreign object out from between the track 210 and the outer wheel 224, 225 of the track drive pulley 220, 221 and can be a self-cleaning functionality for the track 210, which can reduce or eliminate the need for manual track cleaning and a track cleaning system. The track and/or track drive pulley or other elements can be made from a non-reinforced TPU or Santroprene flexible material The self-cleaning function can allow the tracks 210 to be run looser against the track drive pulleys 220, 221. The tension of the track (which may vary with temperature) can be evaluated relative to the track's position with respect to the wheel cap. The outside edge of the track at the most contracted state of the track (i.e., highest tension) can be outside the radius of the wheel cap (e.g., to prevent the wheel cap from rolling against the ground instead of the track rolling against the ground), for example including the nubs on the track. At the expanded state of the track (i.e., lowest tension), the cap and sideplate body can be no larger than the inside of the track (e.g., enough to hold the track on the track drive pulley)] The track 210 can have a track tension from about 0.4 N (0.1 lb$_f$) to about 534 (120 lb$_f$). The outer wheel 224, 225 can include at least one ridge 214. The ridge 214 can interface with the depression 213 in the track 210 and improve traction of the track drive pulley 220 on the track 210. The ridge 214 can be substantially uniformly spaced around the outer wheel 224, 225, and parallel to the axis of rotation of the outer wheel 224, 225, but any suitable pattern of ridges may be used. The ridge 214 can be mated to at least one depression 213 in the track 210, but may alternatively be any suitable shape.

During extreme operating conditions or rough terrain, for example, one or more tracks 210 may be dislodged from or thrown off the track drive pulleys 220, the track drive pulley 220. The track guide 230 can keep the track 210 aligned on the track drive pulley 220 and realign the track 210, for example, if the track 210 is off of the track drive pulley 220 or the track's alignment with the track drive pulley 220 is maladjusted. The track guide 230 can be attached to the side plate 150 of the chassis 100, for example the track guide 230 can be mounted on the side plate 150 with machine screws, fastened to the side plate 150 with rivets, glue, interlocking parts or other suitable fastener, or combinations thereof. The track guide 230 may be integrated into the side plate 150 as a single piece for manufacture. The track guide 230 may be fused with the side plate 150. The track guide 230 can guide the track 210 as the track 210 passes above and/or below the track guide 230. The track guide 230 can guide the track 210 as the track 210 passes above and/or below the track guide 230. The track guide 230 can be made of lubricated nylon, another polymers, metal, carbon fiber, concrete, cardboard, wood, any other suitable material, or combinations thereof. The track guide 230 can be injection molded, cast, extruded, machined, stamped, cut, any other suitable method of manufacture, or combinations thereof.

As shown in FIGS. 14 and 16, the side plate 150 of the chassis 100 can assist the track guide 230 or act independently in maintaining the alignment of the track 210 on the track drive pulleys 220. The side plate 150 can be slightly larger than the inside diameter of the track 210 when the track 210 can be stretched over the track guide 230 and the robot drive pulleys 220. The flanging of the side plate 150 relative the track 210 can interference fit against the track 210 prevent the track 210 from being thrown or otherwise moved onto the chassis 100 and, for example, getting stuck between the drive pulleys 220 and the chassis 100. The side plate 150 can be slightly larger than the inside diameter of the track 210, and smaller than the outside diameter of the track 210. The sideplate can protrude from about 1 mm (0.04 in.) to about 2 mm (0.08 in.) beyond the inside diameter of the track. The sideplate 150 can provide additional track guidance. The robotic system 10 may operate while inverted.

As shown in FIGS. 11, 17, 18, and 26 through 29, the mobility assistance device 300 can assist the robotic system 10 in particular situations and/or special terrain, for example climbing over objects, climbing up stairs, or navigating snow. The mobility assistance device 300 can be at least one flipper 301 for each mobility device 200, and may alternatively or additively have one or more skis, skates, propellers, wings, sails, blades, balloons, floats, paddles, oars, flippers, corkscrews, winches, pressure tanks, rockets, a hover system, other suitable mobility assistance device, or combinations thereof. As shown in FIGS. 17 and 18, a flipper 301, so named for its shape resembling a flipper in a pinball machine, can include a track 310, a flipper pulley 320, a track guide 330, and a pulley cap 340.

The track 310 of the flipper 301 can be identical to the track 210 of the mobility device 200. The same materials and manufacturing processes can be used for the track 210 and the track 310 (e.g., which can improve manufacturability scalability and lower cost). The track 310 on the flipper 301 can be shorter than the track 210 of the mobility device 200.

The flipper pulley 320 of the flipper 301 can be identical to the track drive pulley 220 of the mobility device 200. For example, the flipper pulley 320 can have an outer wheel 324 and inner wheel hub 323. As shown in FIGS. 17 and 18, the flipper 301 can include one flipper pulley 320. The flipper 301 can include additional pulleys. The flipper pulley 320 can be adapted to rotate in tandem with the track drive pulley 220. The flipper track 310 can move simultaneously with the track 210 of the mobility device 200. The outside flipper track nubs 311 can be identical to the outside main track nubs 211. The flipper pulley 320 and the track drive pulley can be linked via a rotatable axle sleeve 328. One end of the rotatable axle sleeve 328 can be inserted in a mated interface (e.g., a hex interface as shown in FIGS. 17 and 18) of the inner wheel hub 323 of the flipper pulley 320. The ball bearing 319 and inner wheel hub plate 322 can be identical to the ball bearing 219 and the inner wheel hub plate 222, respectively. The other end of the rotatable axle sleeve 328 can be inserted in a mated interface of the inner wheel hub 223 of the track drive pulley 220. The rotatable axle sleeve 328 can rotate about the axle 149 for example with lubrication, a ball bearing, or other suitable bearing, or combinations thereof. The rotatable axle sleeve 328 can be molded from a rigid polymer or machined from aluminum, alternatively be nylon, polymer, metal, other suitable material, or combinations thereof.

As shown in FIGS. 17 and 18, the flipper track guide 330 can keep the flipper track 310 centered on the flipper pulley 320 and realign the track 310 if the alignment is maladjusted. The track guide 330 can be made of lubricated nylon, other polymers, metal, carbon fiber, concrete, cardboard, wood, any other suitable material, or combinations thereof. The track 310 can slide over the track guide 330. The track guide 330 can be lubricated, as shown. The track guide 330 can be injection molded, cast, extruded, machined, stamped, cut, any other suitable method of manufacture, or combinations thereof. The flipper track guide 330 can include additional support structures to improve the strength and shock absorbing capabilities of the flipper track guide, for example a reinforced ribbing pattern machined or molded along the internal wall of the flipper track guide 330, any suitable support structure, or combinations thereof. The flipper track guide 330 can be attached to at least one track guide arm 331, for example two track guide arms 331, and 332.

The track guide arms 331, 332 can be made of nylon, other polymers, metal, any other suitable material, or combinations thereof. The track guide arms 331, 332, can be reinforced with a ribbing pattern or any other suitable reinforcement structure along their length, which can improve strength and enable lighter weight, flexibility, torque and shock absorption of the track guide arms 331, 332. One of the track guide arms 331 can be attached to the rotatable axle sleeve 328. The rotatable axle sleeve 328 can rotate inside of a ball bearing 329 located inside the track guide arm 331. The ball bearing 329 can be held in place inside the track guide arm 331 by a snap ring 327 in a groove in the rotatable axle sleeve 328.

As shown in FIGS. 17 and 18, the mobility assistance device 300 can include a pulley cap 340. The pulley cap 340 can hold the second track guide arm 332 in place and rotate the guide arm 332 about the axle 149 when the axle 149 rotates the pulley cap 340, thus actuating the entire flipper 301. The pulley cap 340 can assist the track guide 330 and the flipper pulley 320 in keeping the track 310 aligned on the flipper pulley 320.

As shown in FIGS. 14 through 18, the keyed inside 346 of the axle cap 341 can be mated to the keying 163 of the axle 149, such that the axle cap 341 can rotate with the axle 149, and the pulley cap 340 can be keyed to interface and rotate with the axle cap 341. A hex, square, or triangular keying shape can be used for the keying of the inside 346 of the axle cap 341. The outside of the hex cap 341 can be keyed to fit into a keyed interface in a pulley cap 340. The pulley cap 340 can include a gap 344 having dimensions to hold the second track guide arm 332 in place, for example the pulley cap 340 can include a keying on the inside edge 343 of the pulley cap 349 mated to a keying 347 on the second track guide arm 332 such that when the pulley cap 340 rotates, the track guide arm 332 also rotates, which actuates the flipper 301 when the mobility assistance module 140 rotates the axle 149. The gap 344 can be from about 10 mm (0.4 in.) to about 60 mm (2.4 in.), for example about 38 mm (1.5 in.). The pulley cap 340 can be fastened to the axle 149 using a nut 348 over the threaded end of the axle 149. The outward facing portion of the pulley cap 340, can be convex, or alternatively a set of convex ridges arranged radially outward from the center of the pulley cap, such that if the robot system 10, were somehow positioned on a side, the convexity will cause the robotic system 10 to roll to either side and allow the tracks 310 to contact a surface and regain mobility. The pulley cap 340 can be made of nylon, but may alternatively be made of other polymers, metal, carbon fiber, concrete, cardboard, wood, or any other suitable material. The pulley cap 340 can be manufactured using a machining process, injection molded, cast, extruded, stamped, any other suitable method of manufacture, or combinations thereof.

The inside edge 343 of the pulley cap 340 can be mated with the rounded edge of the inside nubs 316 of the track 310, for example, to guide the alignment of the track 210, and prevent the inside nubs 316 from carrying foreign objects in between the track 310 and the flipper pulley 320. The pulley cap 340 can have ribs, vanes, fins, or combinations thereof, that can mate with the nubs on the track.

The actuation granularity of the flipper may be tuned by changing the gearbox 142 in the drive assistance module 140. The mobility assistance module 140 can be adapted to rotate the flipper 301 more than 360°, about 360° (i.e., a revolution), or less than 360° (e.g., less than an entire revolution), for example about 345°. The rotation of the flipper 301 can be limited by the control software, and/or electronically, and/or mechanically limited, for example by a shear pin.

The mobility assistance module 140 can be omitted from the device. The position of some or all of the flippers can be manually actuated by removing a pin 168 in manually actuated mount 167, manually actuating the axles 169, and replacing the pin 168. The flipper positions may be selected using a multiple, discrete position interface with a ball detent or friction clamp design, any other suitable fastening device or method, or combinations thereof.

The flipper track 310 can be guided by a roller wheel 335. The roller wheel 335 can be capped on each side by roller wheel caps 336, 337 any or each of which can be attached to the track guide arms 332 and 331 respectively, and adapted to enable the roller wheel 335 to rotate freely. As shown in FIGS. 17 and 18, the inner edge 339 of the track guide cap can be mated to the inside nubs 316 of the flipper track 310. The track guide caps or roller wheel caps 336 and 337 can be made of nylon, another polymer, a metal, or combinations thereof.

As shown in FIG. 26, the flippers 301 can be retracted, contracted, or rotationally folded, as shown by arrows 50, into a compact shape for storage or carrying. The robotic system 10 can have a compact length 368 of about 43 cm (17 in.).

The flippers 301 at one or both ends of the system 10 can have a safety release coupling that can release the flippers 301 so the flippers 301 can be rotated, as shown by arrow 50, with respect to the body 20. The safety release couplings can have mechanical, electro-mechanical, magnetic couplings, or combinations thereof. The safety release couplings can have detents and/or ball bearings. The safety releasing coupling can release the flippers 301 when the torque, as shown by arrow 400 in FIG. 28, applied to the flippers 301 exceeds from about 15 Nm (11 lb-ft.) to about 145 Nm (107 lb-ft.), more narrowly from about 45 Nm (33 lb-ft.) to about 125 Nm (92.2 lb-ft.), for example about 100 Nm (74 lb-ft.) of torque at the axis of rotation. For example, the system 10 can be dropped or slammed against the ground or a wall to release the flippers 301 so the flippers 301 can rotate freely with respect to the body 20.

Figure 27:
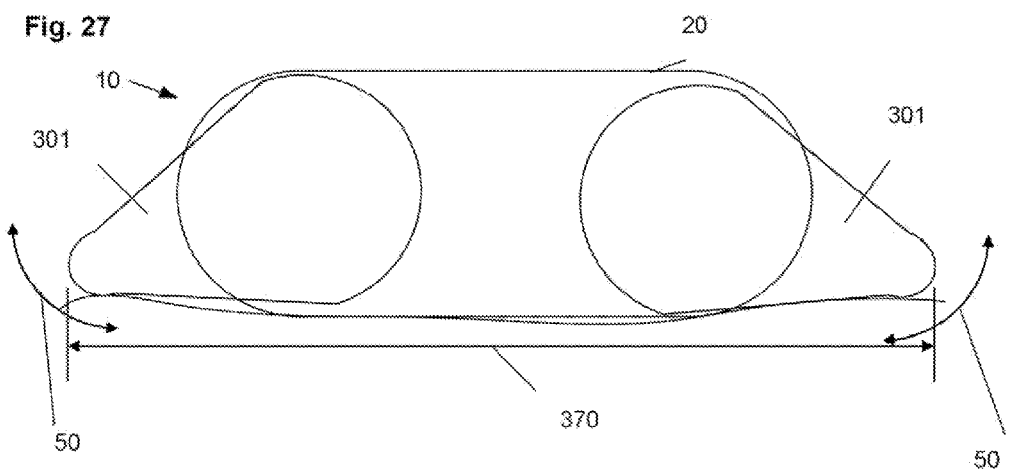
Figure 28:
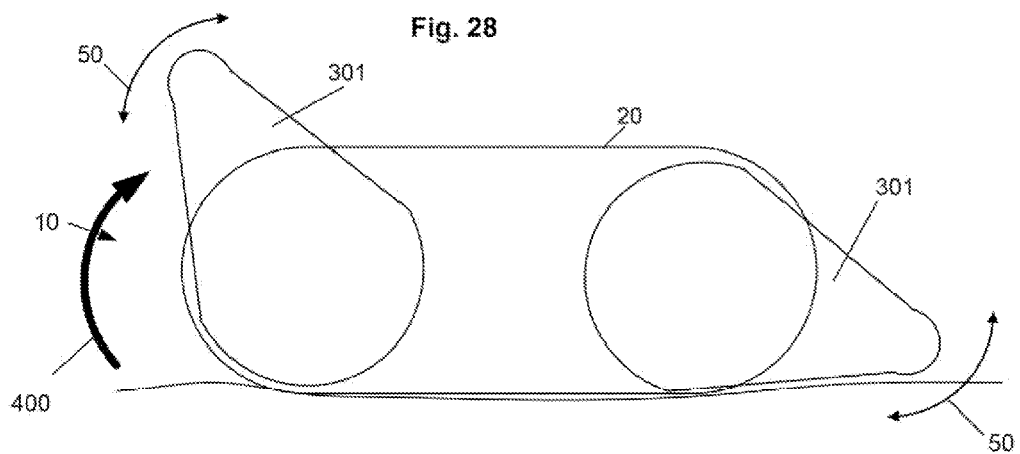

As shown in FIG. 27, both flippers 301 can be extended, as shown by arrows 50, to achieve the maximum length of the device. The extended length 370 of the robotic system 10 with both flippers 301 extended can be equal to or more than about 69 cm (27 in.). For example, the robotic system 10 can be equal to or greater than about 40%, 50%, 60%, 80%, 100%, 150% or 175% longer from the contracted configuration to the expanded configurations of the robotic system 10. As shown by FIGS. 6e and 6f, if the length of the mobility assistance devices 300 is long enough, the robotic system 10 can be equal to or greater than about 200% longer from the contracted configuration to the expanded configurations of the robotic system 10. The extended length of both flippers 301 can enable the robotic system 10 to climb stairs. As shown in FIG. 28, at least one, or a pair of the (e.g., front) flippers 301 may be rotated, as shown by arrows 50, to a higher angle to enable the robotic system 10 to climb an obstacle while the other (e.g., rear) flippers may be folded or extended. As shown in FIG. 29, the robotic system 10, may be elevated off of a surface 372 when both flippers 301 are rotated to point down. This functionality may be useful for navigating terrains with pressure sensitive or hostile conditions, such as chemical spills, minefields, or any other hazardous terrain, or to raise the chassis of the system 10 above the surface, such as when passing through water obstacles (e.g., ponds, puddles, moats, streams, rivers).

FIG. 30a illustrates that the outer wheel 224, 225, or 324 (shown as outer wheel 224 for illustrative purposes) can have a scaffold or honeycomb structure. The outer wheel 224 can have a wheel outer wall 388. The wheel outer wall 388 can engage and drive or be driven by the mobility device track 210.

The outer wheel 224 can have one, two, three, four, or more concentric wheel angular walls 380. The wheel angular walls 380 can have a constant radius and form a partial or complete circle and/or cylinder around the center of the pulley 220.

The outer wheel 224 can have from about 3 to about 50, for example about 16 wheel radial walls 382. The wheel radial walls 382 can extend substantially radially from the inner wheel 222 to the wheel outer wall 388. The wheel radial walls 382 can extend from each wheel angular wall 380 at the same or opposite (e.g., negative instead of positive) angles.

The wheel radial walls 382 and wheel angular walls 380 can define wheel cells 384.

The track drive pulley 220 can rotate as shown by arrows 390. The track drive pulley 220 can be actively driven by an axle or shaft, or be passively driven by the mobility device track 210. The mobility device track 210 can move as shown by arrows 392. The mobility device track 210 can be driven by the first track drive pulley 220 (shown), and/or by the track drive pulley 221 (not shown).

FIG. 30*b* illustrates that a piece of debris 386 can move, as shown by arrow 394, as pushed by the mobility device track 210 (as shown) and/or the track drive pulley 220, toward the space between the mobility device track 210 and the track drive pulley 220. The debris 386 can have a diameter or maximum width up to about 5 cm (2 in.), for example greater than about 0.2 cm (0.08 in.), or as large as about 2 cm (1 in.), without causing any damage or untracking the track 210 or 310.

FIG. 30*c* illustrates that the debris 386 can be pinched between the wheel outer wall 388 and the mobility device track 210. If the piece of debris 386 is slippery enough or properly shaped, the pressure on the debris 386 between the wheel outer wall 388 and the mobility device track 210 can force the piece of debris 386 back out of the space between the track 210 and the wheel outer wall 388, in the direction from which the debris 386 entered the space between the track 210 and the wheel outer wall 388.

If the debris 386 passes between the mobility device track 210 and the wheel outer wall 388, the wheel outer wall 388 can deform to accommodate the shape of the debris 386. The wheel outer wall 388 can deform along a length of the single wheel cell 384 impacted by the debris 386. The deformation resulting from accommodating the debris 386 can be limited to the wheel outer wall 388 along the length of the impacted wheel cell 384. For example, the wheel angular wall forming the radially inner wall of the wheel cell 384 can remain substantially undeformed. The deformation can be isolated to the wheel cell 384.

The depression 213 on the inner side of the mobility device track 210 can partially or completely accommodate the debris 386. The wheel cell 384 can also partially or completely accommodate the debris 386 inside the wheel cell 384, and the debris 386 may be forced out of the wheel cell 384 by an impact or stress on the outer wheel 224.

FIG. 30*d* illustrates that the mobility device track 210 and the wheel outer wall 388 can compress and contain the debris 386. The debris 386 can travel around the track drive pulley 220. The mobility device track 210 can deform along a deformed track length 396 adjacent to the debris 386. For example, the deformed track length 396 can extend about the length of the deformed wheel cell 384. The pocket formed to hold the debris 386 can have the same size as the debris 386, for example a diameter or maximum width up to about 5 cm (2 in.), for example greater than about 0.2 cm (0.08 in.), or as large as about 2 cm (1 in.), without causing any damage or untracking the track 210 or 310.

FIG. 30*e* illustrates that when the debris 386 exits from the gap between the track drive pulley 220 and the mobility device track 210, the debris 386 can fall out from the mobility device 200 or be shot away, as shown by arrow 394, from the mobility device 200 by the pressure squeezing the debris 386 between the mobility device track 210 and the wheel outer wall 388. The deformed portion of the wheel cell 384 can return to a non-deformed configuration.

FIG. 31*a* illustrates that the track can be made from a track first material 398*a* and a track second material 398*b*. The track first material 398*a* can be softer, less rigid, harder, more rigid, have a lower or higher coefficient of friction than the track second material 398*b*, or combinations thereof. The track materials 398 can be selected from any of the materials described herein and combinations thereof. The first track material 398*a* can be on the outside (i.e., ground surface-facing side) of the track. The second track material 398*b* can be on the inside (i.e., pulley-facing side) of the track. The first material 298*a* can be bonded, fused, welded, melted, glued, coated, or otherwise fixed to the second material 298*b*.

FIG. 31*b* illustrates that the track can be made from the first material 398*a* on one or both lateral sides of the track. The track can be made from the second material 398*b* between the lateral side of the track (e.g., laterally medial), or otherwise laterally adjacent to the first material 298*a*.

FIG. 31*c* illustrates that the track can have a core made from the second material 398*b*. The core can be partially or completely surrounded by a coating or layer of the first material 398*a*. The nubs can be made from the first and/or second material 398*a* and/or 398*b*.

The tracks 210 and/or 310 can be removed from any of the flippers 301 and/or any of the mobility devices 200. The robotic system 10 can be operated with one, two, three or four flippers 310 and/or one or two mobility devices 200 operating without tracks 310 and 210.

As a person skilled in the art will recognize from the previous detailed description and from the figures and claims, modifications and changes can be made to the variations of the invention without departing from the scope of this invention defined in the following claims. More than one range or example of quantities can be provided for a characteristic as alternative contemplated ranges and examples. Elements, characteristics and configurations of the various variations of the disclosure can be combined with one another and/or used in plural when described in singular or used in plural when described singularly.

We claim:

1. A robotic vehicle system comprising:
a chassis; and
a track drive system configured to move the chassis, wherein the track drive system comprises a pulley, a pulley cap having a larger diameter than the pulley, and a track;
wherein the pulley cap is rotationally fixed to the pulley wherein the track is configured to be engagable with the pulley cap and disengagable with the pulley cap, and wherein when a first length of the track engages the pulley cap, the pulley cap and the first length of the track are mechanically mated.

2. The system of claim 1, wherein the track is configured to be engagable with the pulley and disengagable with the pulley, and wherein when a first length of the track engages the pulley, the pulley and the first length of the track are mechanically mated.

3. The system of claim 2, wherein the track comprises a pulley cap interface, and wherein pulley cap comprises a track interface, and wherein the pulley cap interface is configured to mechanically mate and mechanically disengage the track interface.

4. The system of claim 3, wherein the pulley cap interface comprises a first nub.

5. The system of claim, wherein the track interface comprises a vane, and/or rib, and/or fin.

6. The system of claim 2, wherein the track comprises a pulley interface.

7. The system of claim 2, wherein the track is tensioned on the pulley at more than 0.4 N.

8. A robotic vehicle system comprising:
a chassis; and
a track drive system configured to move the chassis, wherein the track drive system comprises a pulley, a pulley cap having a larger diameter than the pulley, and a track;
wherein the pulley cap is rotationally fixed to the pulley wherein the track is engagable with the pulley and disengagable with the pulley, and wherein when a first length of the track engages the pulley, the pulley and the first length of the track are mechanically mated.

9. A robotic vehicle system comprising:
a chassis;
a shaft configured to rotate with respect to the chassis; and
a first track drive system comprising a pulley, a pulley cap, and a track;
wherein the pulley cap is rotationally fixed to the shaft, and wherein the pulley is configured to rotate with respect to the pulley cap
wherein the shaft comprises a first elongated element radially inside of a second elongated element, and wherein the first elongated element and second elongated element are configured to rotate with respect to the chassis, and wherein the first elongated element is configured to rotate independently of rotation of the second elongated element.

10. The system of claim 9, wherein the first elongate element comprises an axle, and wherein the axle is rotationally fixed to the pulley cap.

11. The system of claim 10, wherein the second elongated element comprises an axle sleeve, and wherein the axle sleeve is rotationally fixed to the pulley.

12. The system of claim 11, wherein the pulley has a pulley interface, and wherein the axle sleeve is fixed to the pulley interface.

13. The system of claim 12, wherein the pulley interface comprises a keyed interface at the terminal end of the axle sleeve.

14. The system of claim 12, wherein the pulley interface comprises a hexagonal port.

15. The system of claim 12, wherein the pulley interface comprises a pin hole.

16. A robotic vehicle system comprising:
a chassis;
a shaft comprising a first elongated element and a second elongated element; wherein the first elongated element and the second elongated element are configured to rotate with respect to the chassis; and
a track drive system configured to move the chassis, wherein the track drive system comprises a pulley, a pulley cap, and a track;
wherein the pulley cap is fixed to the shaft, and wherein the pulley is fixed to the shaft, and wherein the shaft is configured to rotate the pulley cap and the pulley with respect to the chassis.

17. The system of claim 16, wherein the pulley is fixed to the first elongated element.

18. The system of claim 17, wherein the pulley cap is fixed to the second elongated element.

19. The system of claim 18, wherein the first elongated element comprises an axle.

20. The system of claim 19, wherein the second elongated element comprises an axle sleeve.

21. The system of claim 20, wherein the axle is radially inside of the axle sleeve.

22. The system of claim 20, wherein the axle is configured to rotate independently of rotation of the axle sleeve.

23. The system of claim 18, wherein the second elongated element comprises an axle sleeve.

* * * * *